United States Patent
Ishii

(10) Patent No.: US 8,432,883 B2
(45) Date of Patent: *Apr. 30, 2013

(54) BASE STATION APPARATUS AND COMMUNICATION CONTROL METHOD

(75) Inventor: Hiroyuki Ishii, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 825 days.

This patent is subject to a terminal disclaimer.

(21) Appl. No.: 12/529,293

(22) PCT Filed: Feb. 26, 2008

(86) PCT No.: PCT/JP2008/053302
§ 371 (c)(1),
(2), (4) Date: Nov. 10, 2009

(87) PCT Pub. No.: WO2008/108222
PCT Pub. Date: Sep. 12, 2008

(65) Prior Publication Data
US 2010/0091725 A1    Apr. 15, 2010

(30) Foreign Application Priority Data

Mar. 1, 2007  (JP) ................................. 2007-052111
Jun. 19, 2007 (JP) ................................. 2007-161940
Dec. 20, 2007 (JP) ................................. 2007-329028

(51) Int. Cl.
*H04J 1/00*   (2006.01)
*H04W 4/00*   (2009.01)
*H04W 72/00*  (2009.01)

(52) U.S. Cl.
USPC ............................ 370/343; 370/329; 455/450

(58) Field of Classification Search ................... 370/343
See application file for complete search history.

(56) References Cited

U.S. PATENT DOCUMENTS

| | | | |
|---|---|---|---|
| 7,672,292 B2 | 3/2010 | Uchida et al. | |
| 2002/0111163 A1 | 8/2002 | Hamabe | |
| 2004/0214602 A1* | 10/2004 | Aoyama | ...................... 455/561 |

(Continued)

FOREIGN PATENT DOCUMENTS

| | | |
|---|---|---|
| CN | 1856148 A | 11/2006 |
| EP | 1 006 745 A1 | 6/2000 |

(Continued)

OTHER PUBLICATIONS

Patent Abstracts of Japan, Publication No. 2006-311359, dated Nov. 9, 2006, 1 page.

(Continued)

*Primary Examiner* — Brandon Renner
*Assistant Examiner* — Shaq Taha
(74) *Attorney, Agent, or Firm* — Osha Liang LLP

(57) ABSTRACT

A base station apparatus capable of communicating with user equipment terminals using an uplink shared channel includes a selection unit configured to select a user equipment terminal to which the base station apparatus allocates the shared channel among the user equipment terminals other than a user equipment terminal where a time frame in which a control channel for the shared channel is transmitted in downlink, a time frame in which the shared channel is received, or a time frame in which acknowledgement information for the shared channel is transmitted overlaps a time interval for measuring a cell with a different frequency; and an allocation unit configured to allocate the shared channel to the user equipment terminal selected by the selection unit.

13 Claims, 21 Drawing Sheets

U.S. PATENT DOCUMENTS

| | | | |
|---|---|---|---|
| 2006/0209669 | A1 | 9/2006 | Nishio |
| 2007/0293257 | A1 | 12/2007 | Usuda et al. |
| 2008/0043657 | A1 | 2/2008 | Ishii et al. |
| 2008/0170557 | A1* | 7/2008 | Yin .............................. 370/343 |
| 2008/0293423 | A1* | 11/2008 | Park et al. ..................... 455/450 |

FOREIGN PATENT DOCUMENTS

| | | |
|---|---|---|
| EP | 1 865 638 A1 | 12/2007 |
| EP | 1 871 030 A1 | 12/2007 |
| JP | 8-172405 A | 7/1996 |
| JP | 11-341555 A | 12/1999 |
| JP | 2002-10329 A | 1/2002 |
| JP | 2002-077984 A | 3/2002 |
| JP | 2003-46437 A | 2/2003 |
| JP | 2003-504954 A | 2/2003 |
| JP | 2003-163667 A | 6/2003 |
| JP | 2003-163962 A | 6/2003 |
| JP | 2004-072379 A | 3/2004 |
| JP | 2004-096268 A | 3/2004 |
| JP | 2004-128967 A | 4/2004 |
| JP | 2004-135180 A | 4/2004 |
| JP | 2004-511950 A | 4/2004 |
| JP | 2004-247950 A | 9/2004 |
| JP | 2004-533178 A | 10/2004 |
| JP | 2004-533731 A | 11/2004 |
| JP | 2005-244513 A | 9/2005 |
| JP | 2006-520558 A | 9/2006 |
| JP | 2006-303699 A | 11/2006 |
| JP | 2006-311359 A | 11/2006 |
| JP | 2006-311440 A | 11/2006 |
| JP | 2006-311490 A | 11/2006 |
| JP | 2007-500988 A | 1/2007 |
| JP | 2007-28568 A | 2/2007 |
| JP | 2007-28637 A | 2/2007 |
| JP | 2007-503156 A | 2/2007 |
| WO | 99/59362 A1 | 11/1999 |
| WO | 01/05080 A1 | 1/2001 |
| WO | 02/32009 A1 | 4/2002 |
| WO | 02/39760 A2 | 5/2002 |
| WO | 02/098161 A1 | 12/2002 |
| WO | 2004/075470 A2 | 9/2004 |
| WO | 2004/103009 A1 | 11/2004 |
| WO | 2005/018115 A1 | 2/2005 |
| WO | 2005/020488 A1 | 3/2005 |
| WO | 2005/034444 A1 | 4/2005 |
| WO | 2005/091833 A2 | 10/2005 |
| WO | 2005115041 A1 | 12/2005 |
| WO | 2006/006000 A1 | 1/2006 |
| WO | 2006/019287 A1 | 2/2006 |
| WO | 2006/030914 A1 | 3/2006 |
| WO | 2006/041182 A1 | 4/2006 |
| WO | 2006/109492 A1 | 10/2006 |
| WO | 2006/112359 A1 | 10/2006 |
| WO | 2006/135486 A1 | 12/2006 |

OTHER PUBLICATIONS

Patent Abstracts of Japan, Publication No. 2006-311490, dated Nov. 9, 2006, 1 page.
3GPP TR 25.814 V7.0.0, Jun. 2006, "Physical layer aspects for evolved Universal Terrestrial Radio Access (UTRA)," 126 pages.
International Search Report issued in PCT/JP2008/053302, mailed on Jun. 10, 2008, with translation, 9 pages.
Written Opinion issued in PCT/JP2008/053302, mailed on Jun. 10, 2008, 3 pages.
International Search Report w/translation from PCT/JP2008/053303 dated Jun. 10, 2008 (7 pages).
Written Opinion from PCT/JP2008/053303 dated Jun. 10, 2008 (4 pages).
Patent Abstracts of Japan; Publication No. 2004-247950 dated Sep. 2, 2004; NTT DoCoMo, Inc. (1 page).
Patent Abstracts of Japan; Publication No. 2004-072379 dated Mar. 4, 2004; Fujitsu Ltd. (1 page).
Patent Abstracts of Japan; Publication No. 2003-163667 dated Jun. 6, 2003; NTT DoCoMo, Inc. (1 page).
Patent Abstracts of Japan; Publication No. 2003-163962 dated Jun. 6, 2003; NTT DoCoMo, Inc. (1 page).
Patent Abstracts of Japan; Publication No. 2002-010329 dated Jan. 11, 2002; NEC Corp. (1 page).
International Search Report w/translation from PCT/JP2008/053308 dated Jun. 10, 2008 (4 pages).
Written Opinion from PCT/JP2008/053308 datd Jun. 10, 2008 (4 pages).
Patent Abstracts of Japan; Publication No. 2007-028637 dated Feb. 1, 2007; Samsung Electronics Co. Ltd. (1 page).
Patent Abstracts of Japan; Publication No. 2007-028568 dated Feb. 1, 2007; NTT DoCoMo, Inc. (1 page).
Patent Abstracts of Japan; Publication No. 2004-135180 dated Apr. 30, 2004; Matsushita Electric Industrial Co., Ltd. (1 page).
Patent Abstracts of Japan, Publication No. 2003-046437, dated Feb. 14, 2003, 1 page.
International Search Report issued in PCT/JP2008/053307, mailed on Jun. 10, 2008, with translation, 9 pages.
Written Opinion issued in PCT/JP2008/053307, mailed on Jun. 10, 2008, 5 pages.
3GPP TSG-RAN WG2 #55, T-doc R2-062788, "Persistent scheduling and dynamic allocation," Seoul, Korea; Oct. 9-13, 2006, 6 pages.
International Search Report issued in PCT/JP2008/053306, mailed on Jun. 10, 2008, with translation, 9 pages.
Written Opinion issued in PCT/JP2008/053306, mailed on Jun. 10, 2008, 3 pages.
International Search Report w/translation from PCT/JP2008/053305 dated Jun. 10, 2008 (4 pages).
Written Opinion from PCT/JP2008/053305 dated Jun. 10, 2008 (3 pages).
Patent Abstracts of Japan; Publication No. 11-341555 dated Dec. 10, 1999; NEC Corp. (1 page).
Patent Abstracts of Japan; Publication No. 2004-128967 dated Apr. 22, 2004; NTT DoCoMo, Inc. (1 page).
Patent Abstracts of Japan, Publication No. 2004-096268, dated Mar. 25, 2004, 1 page.
Patent Abstracts of Japan, Publication No. 2005-244513, dated Sep. 8, 2005, 1 page.
Patent Abstracts of Japan, Publication No. 2006-303699, dated Nov. 2, 2006, 1 page.
Patent Abstracts of Japan, Publication No. 2006-311440, dated Nov. 9, 2006, 1 page.
Patent Abstracts of Japan, Publication No. 2002-077984, dated Mar. 15, 2002, 1 page.
Patent Abstracts of Japan, Publication No. 08-172405, dated Jul. 2, 1996, 1 page.
International Search Report issued in PCT/JP2008/053304, mailed on Jun. 10, 2008, with translation, 12 pages.
Written Opinion issued in PCT/JP2008/053304, mailed on Jun. 10, 2008, 5 pages.
Chinese Office Action for Application No. 200880014001.4, mailed on Nov. 23, 2011 (9 pages).
Qualcomm Europe, "Scheduling of Measurements in LTE", 3GPP TSG-RAN2 Meeting #52, R2-060987, Athens, Greece, Mar. 27-31, 2006.
Chinese Office Action for Application No. 200880013955.3, mailed on Jan. 6, 2012 (8 pages).
Japanese Office Action for Application No. 2009-502525, mailed on Apr. 17, 2012 (4 pages).
esp@cenet Patent Abstract for WO 2005/115041, publication date Dec. 1, 2005. (1 page).
Chinese Office Action for Application No. 200880014011.8, mailed on Jun. 19, 2012 (9 pages).
NEC, "Persistent Scheduling and Dynamic Allocation", 3GPP TSG-RAN WG2 #54, R2-062326, Tallinn (Estonia), Aug. 28-Sep. 1, 2006.
Chinese Office Action for Application No. 200880013996.2, mailed on Mar. 26, 2012 (9 pages).
esp@cenet Patent Abstract for Chinese Publication No. 1856148, publication date Nov. 1, 2006. (1 page).

* cited by examiner

FIG.5

UL TF RELATED TABLE(FOR CQI=1)

| NUMBER OF RB | UL TABLE TF SIZE | UL TABLE TF MOD |
|---|---|---|
| 1 | | QPSK |
| 2 | | QPSK |
| 3 | | QPSK |
| 4 | | QPSK |
| 5 | | QPSK |
| 6 | | QPSK |
| ⋮ | | |
| 100 | | |

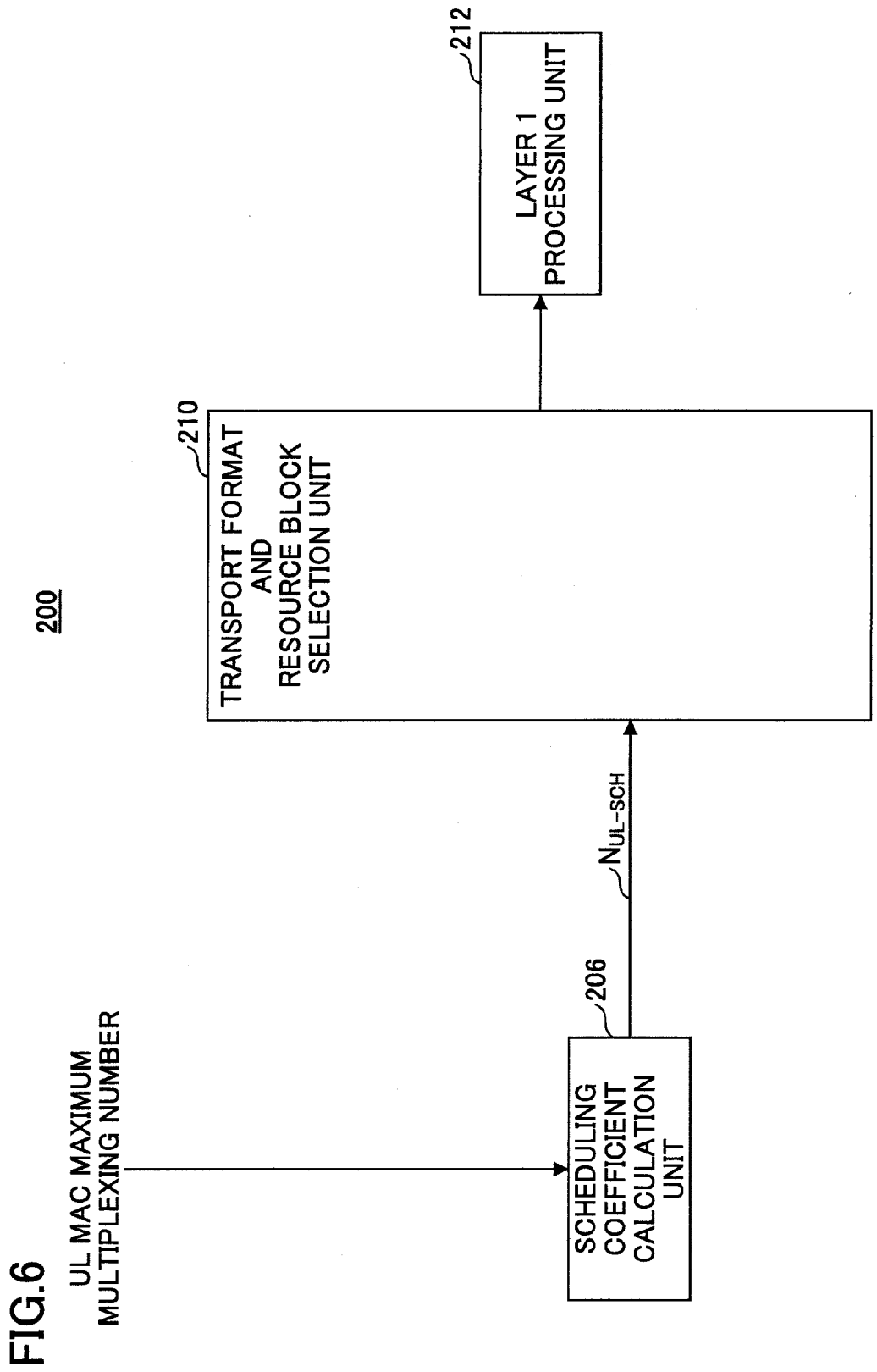

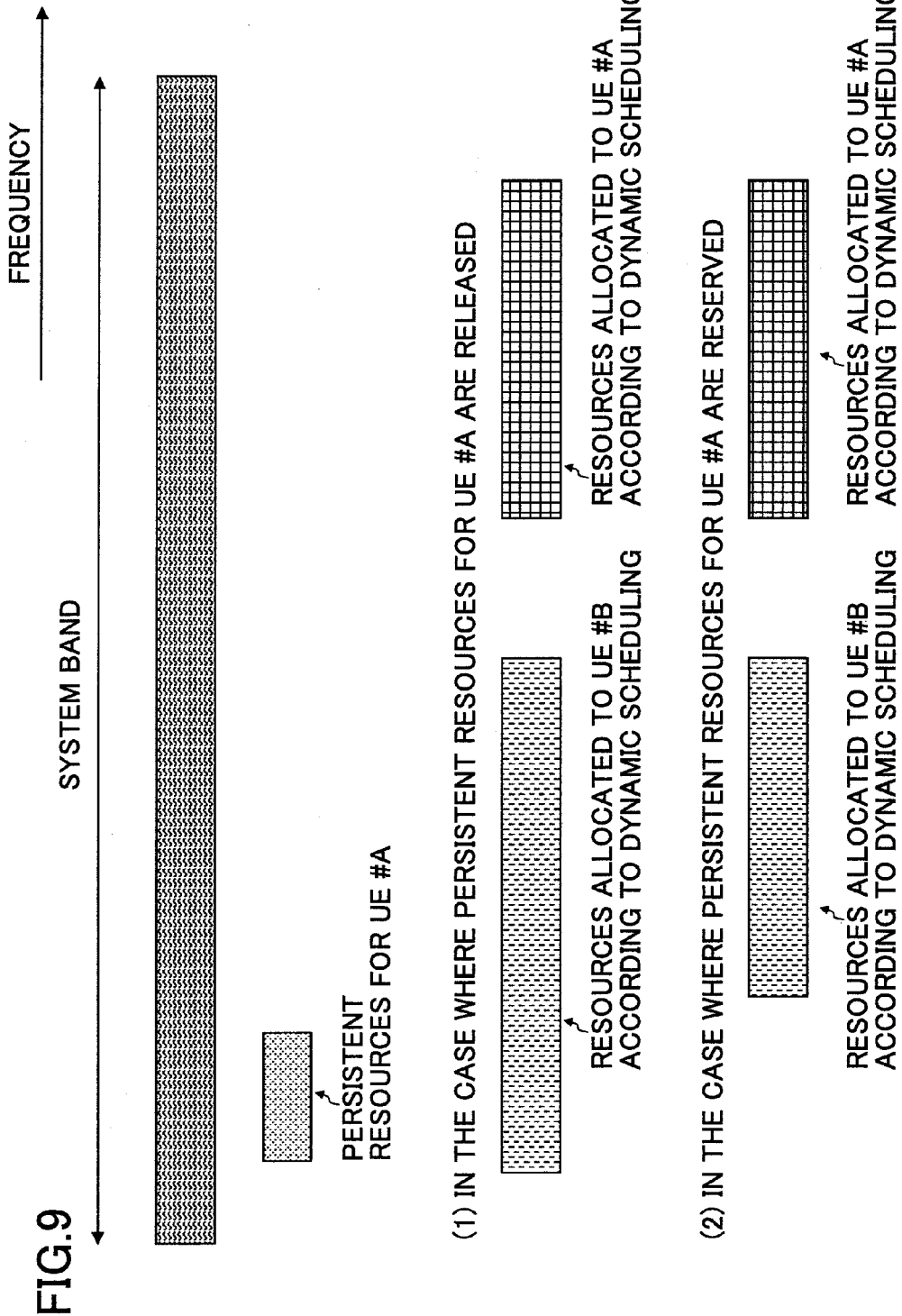

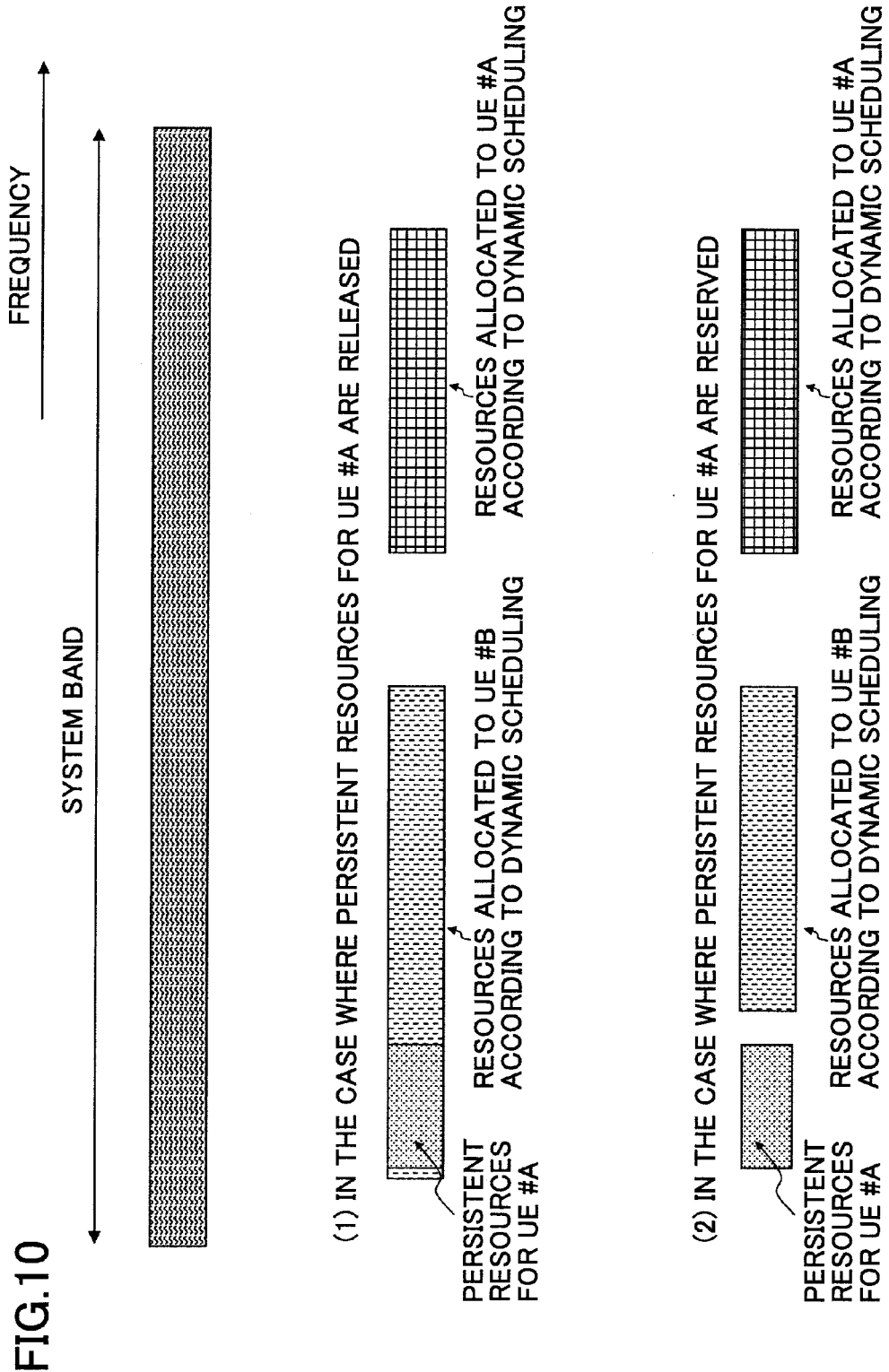

FIG.11C

| PATH LOSS (dB) | $P_{OFFSET}$ (dB) |
|---|---|
| GREATER THAN 140 | 0 |
| GREATER THAN OR EQUAL TO 130; LESS THAN 140 | −1 |
| GREATER THAN OR EQUAL TO 120; LESS THAN 130 | −2 |
| : | : |
| GREATER THAN OR EQUAL TO 70; LESS THAN 80 | −7 |
| LESS THAN 70 | −8 |

FIG.12A

NUMBER OF RB = 1

| SIR VALUE | DATA SIZE | MODULATION SCHEME |
|---|---|---|
| 1 | 137 | QPSK |
| 2 | 173 | QPSK |
| 3 | 233 | QPSK |
| 4 | 317 | QPSK |
| 5 | 377 | QPSK |
| 6 | 461 | QPSK |
| 7 | 650 | QPSK |
| 8 | 792 | QPSK |
| 9 | 931 | QPSK |
| 10 | 1262 | QPSK |
| 11 | 1483 | QPSK |
| 12 | 1742 | 16-QAM |
| 13 | 2279 | 16-QAM |
| 14 | 2583 | 16-QAM |
| 15 | 3319 | 16-QAM |
| 16 | 3565 | 16-QAM |
| 17 | 4189 | 16-QAM |
| 18 | 4664 | 16-QAM |
| 19 | 5287 | 16-QAM |
| 20 | 5887 | 64-QAM |
| 21 | 6554 | 64-QAM |
| 22 | 7168 | 64-QAM |
| 23 | 9719 | 64-QAM |
| 24 | 11418 | 64-QAM |
| 25 | 14411 | 64-QAM |

FIG.12B

NUMBER OF RB = 2

| SIR VALUE | DATA SIZE | MODULATION SCHEME |
|---|---|---|
| 1 | 200 | QPSK |
| 2 | 340 | QPSK |
| 3 | 460 | QPSK |
| 4 | 600 | QPSK |
| 5 | 730 | QPSK |
| 6 | 900 | QPSK |
| 7 | 1300 | QPSK |
| 8 | 1500 | QPSK |
| 9 | 1800 | QPSK |
| 10 | 2400 | QPSK |
| 11 | 2800 | QPSK |
| 12 | 3400 | 16-QAM |
| 13 | 4400 | 16-QAM |
| 14 | 5000 | 16-QAM |
| 15 | 6600 | 16-QAM |
| 16 | 7000 | 16-QAM |
| 17 | 8200 | 16-QAM |
| 18 | 9200 | 16-QAM |
| 19 | 10500 | 16-QAM |
| 20 | 11600 | 64-QAM |
| 21 | 13000 | 64-QAM |
| 22 | 14300 | 64-QAM |
| 23 | 19900 | 64-QAM |
| 24 | 22800 | 64-QAM |
| 25 | 28880 | 64-QAM |

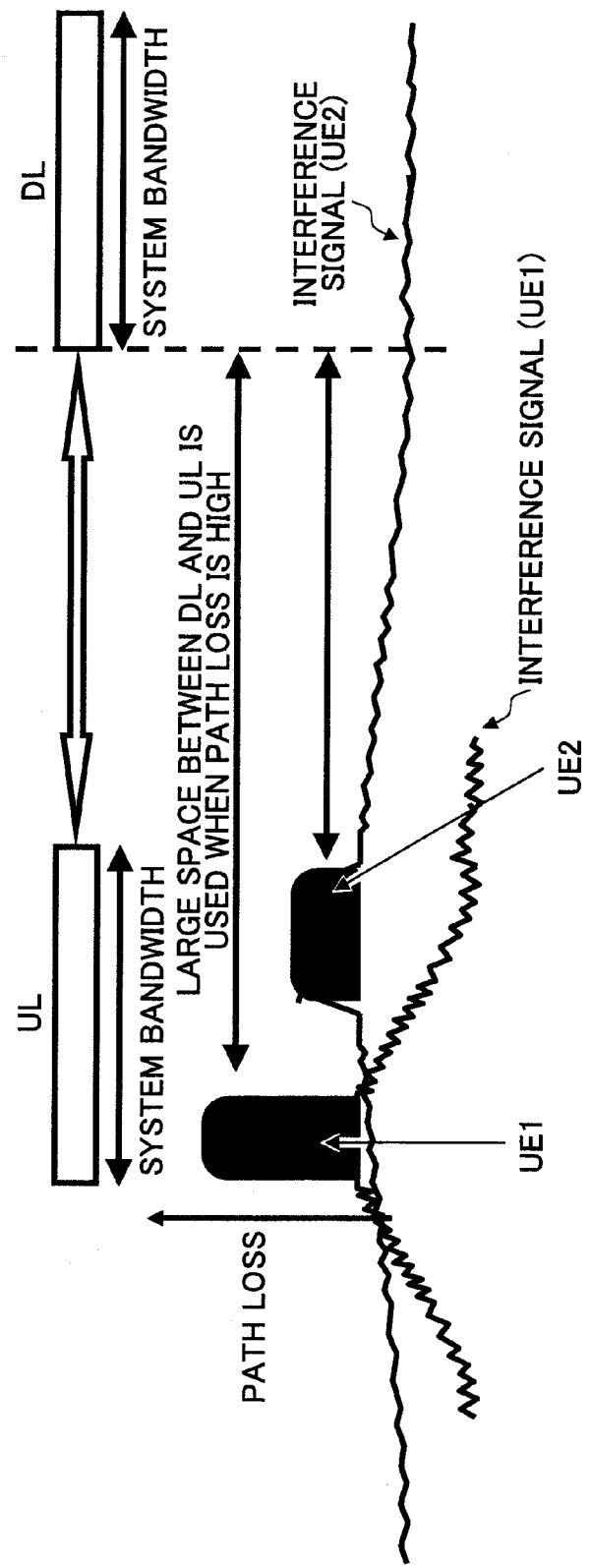

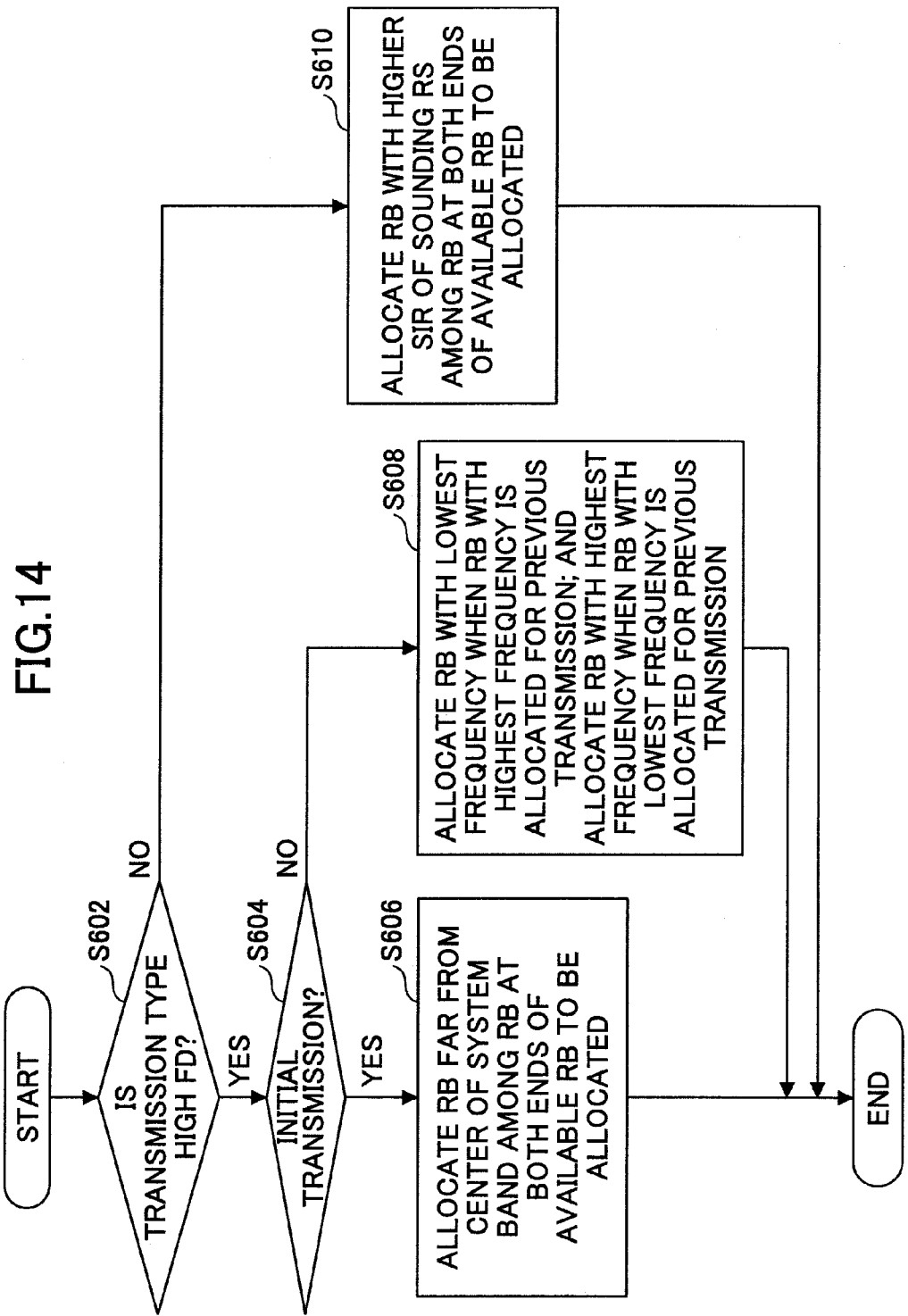

FIG.15

| PATH LOSS | MCS |
|---|---|
| GREATER THAN 140 | #1 |
| GREATER THAN OR EQUAL TO 130; LESS THAN 140 | #2 |
| GREATER THAN OR EQUAL TO 120; LESS THAN 130 | #3 |
| : | : |
| GREATER THAN OR EQUAL TO 70; LESS THAN 80 | #8 |
| LESS THAN 70 | #9 |

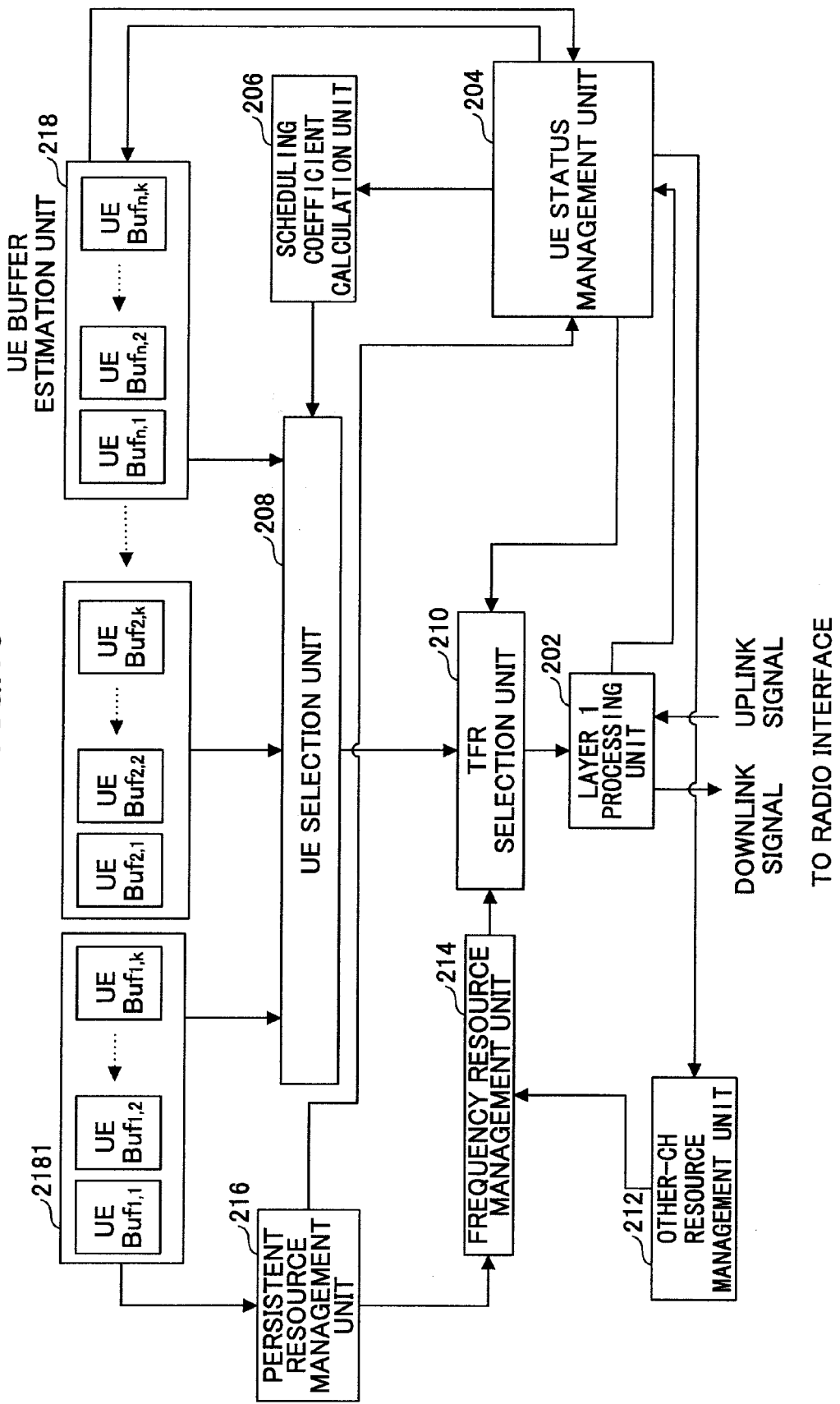

… …

BASE STATION APPARATUS AND COMMUNICATION CONTROL METHOD

TECHNICAL FIELD

The present invention generally relates to a mobile communication system employing an Orthogonal Frequency Division Multiplexing (OFDM) scheme, and more particularly to a base station apparatus and a communication control method.

BACKGROUND ART

As a next-generation system of the W-CDMA (Wideband Code Division Multiple Access) and the HSDPA (High Speed Downlink Packet Access), an LTE system has been studied by 3GPP ($3^{rd}$ Generation Partnership Project) which is a standards body of the W-CDMA. In the LTE system as a radio access system, an OFDM (Orthogonal Frequency Division Multiplexing) scheme and an SC-FDMA (Single-Carrier Frequency Division Multiple Access) scheme have been studied to be applied to the downlink communication system and the uplink communication system, respectively (see, 3GPP TR 25.814 (V7.0.0), "Physical Layer Aspects for Evolved UTRA", June 2006, for example).

In the OFDM scheme, a frequency band is divided into plural sub-carriers having narrower frequency bands, and data are transmitted on each sub frequency band (sub-carrier) and the sub-carriers are closely arranged so as not to interfere with each other, so that fast data transmission can be achieved and an efficiency use of the frequency band can be improved.

In the SC-FDMA scheme, a frequency band is divided in a manner so that different frequencies can be separately used among plural terminals (user equipment terminals) and as a result, interference between terminals can be reduced. Further, in the SC-FDMA scheme, a range of transmission power fluctuation can be made smaller; therefore lower energy consumption of terminals can be achieved and a wider coverage area can be obtained.

The LTE system is a communication system using shared channels in both downlink and uplink. For example, in uplink, a base station apparatus selects a user equipment terminal to communicate using the shared channel in each sub-frame (each 1 ms) and instructs, using the downlink control channel, the selected user equipment terminal to communicate using the shared channel in a predetermined sub-frame. The user equipment terminal transmits the shared channel based on the downlink control channel. The base station apparatus receives and decodes the shared channel transmitted from the user equipment terminal. In this case, a process of selecting the user equipment terminal to communicate using the shared channel as described above is called a scheduling process.

Further, in the LTE system, so-called Adaptive Modulation and Coding (AMC) is applied; therefore, transmission formats of the shared channels may vary among different sub-frames. As used herein, the transmission format includes various information items indicating such as allocation information about resource blocks (frequency resources), a modulation scheme, a payload size, information about transmission power, HARQ (Hybrid Automatic Repeat reQuest) information (a Redundancy version parameter, a process number, etc.), and MIMO (Multiple Input Multiple Output) information (a reference signal sequence for MIMO transmission, etc.). The transmission format of the shared channel and identification information of the user equipment terminal which communicates using the shared channel in the corresponding sub-frame are collectively called an Uplink Scheduling Grant.

In the LTE system, the transmission format of the shared channel and identification information of the user equipment terminal which communicates using the shared channel in the corresponding sub-frame are reported using a Physical Downlink Control Channel (PDCCH). The Physical Downlink Control Channel (PDCCH) may also be called a DL L1/L2 Control Channel.

DISCLOSURE OF INVENTION

Problem(s) to be Solved by the Invention

When the scheduling process or a process of determining the transmission format in the AMC (Adaptive Modulation and Coding) scheme is not adequately controlled, the transmission characteristics or radio capacity of the system may be impaired.

The present invention is made in light of the problems and may provide a base station apparatus and a communication control method capable of, in LTE uplink, adequately performing the scheduling process and the determination process of the transmission formats in the AMC scheme.

Means for Solving the Problem(s)

In one aspect of the present invention, there is provided a base station apparatus capable of communicating with user equipment terminals using an uplink shared channel, including:

a selection unit configured to select a user equipment terminal to which the base station apparatus allocates the shared channel among the user equipment terminals other than a user equipment terminal where a time frame in which a control channel for the shared channel is transmitted in downlink, a time frame in which the shared channel is received, or a time frame in which acknowledgement information for the shared channel is transmitted overlaps a time interval for measuring a cell with a different frequency; and an allocation unit configured to allocate the shared channel to the user equipment terminal selected by the selection unit.

In another aspect of the present invention, there is provided a communication control method in a base station apparatus capable of communicating with user equipment terminals using an uplink shared channel, including the steps of:

selecting a user equipment terminal to which the base station apparatus allocates the shared channel among the user equipment terminals other than a user equipment terminal where a time frame in which a control channel for the shared channel is transmitted in downlink, a time frame in which the shared channel is received, or a time frame in which acknowledgement information for the shared channel is transmitted overlaps a time interval for measuring a cell with a different frequency;

a user equipment terminal in a discontinuous reception state;

a user equipment terminal in an out-of-synchronization state;

a user equipment terminal from which the base station apparatus does not receive a reference signal; and a user equipment terminal which does not have data to be transmitted; and allocating the shared channel to the selected user equipment terminal.

In another aspect of the present invention, there is provided a base station apparatus capable of communicating with user equipment terminals using an uplink shared channel, including:

a selection unit configured to select a user equipment terminal which transmits the uplink shared channel among the user equipment terminals other than a user equipment terminal where a time frame in which the uplink shared channel is transmitted overlaps a time frame in which a downlink common channel is transmitted;

a user equipment terminal where the time frame in which the uplink shared channel is transmitted overlaps a time frame in which acknowledgement information for the uplink shared channel is transmitted;

a user equipment terminal where the time frame in which the uplink shared channel is transmitted overlaps a time frame in which control information for downlink or uplink persistent scheduling is transmitted;

a user equipment terminal where a time frame in which control information for the uplink shared channel is transmitted overlaps the time frame in which the uplink shared channel is transmitted;

a user equipment terminal where the time frame in which control information for the uplink shared channel is transmitted overlaps a time frame in which a sounding reference signal, downlink radio quality information, a scheduling request signal, or a random access channel is transmitted in uplink; and a user equipment terminal where the time frame in which control information for the uplink shared channel is transmitted overlaps a time frame in which acknowledgement information (ACK/NACK) for the downlink shared channel is transmitted; and an allocation unit configured to allocate the shared channel to the user equipment terminal selected by the selection unit.

Advantageous Effect of the Invention

According to an embodiment of the present invention, there may be provided a base station apparatus and a communication control method capable of, in LTE uplink, adequately performing the scheduling process and the determination process of the transmission formats in the AMC.

BRIEF DESCRIPTION OF THE DRAWINGS

FIG. 5 shows an UL_TF_Related_Table.

FIG. 6 is a partial block diagram of a base station apparatus according to an embodiment of the present invention.

FIG. 9 is a schematic diagram showing an effect of reserving persistent resources when radio resources are to be allocated according to dynamic scheduling to a user equipment terminal (UE) to which the persistent resources are allocated.

FIG. 10 is a schematic diagram showing an effect of reserving persistent resources when radio resources are to be allocated according to dynamic scheduling to a user equipment terminal (UE) to which the persistent resources are allocated.

FIG. 11C shows an example of a relationship between path loss (Pathloss) and $P_{OFFSET}$.

FIG. 12A shows an example of a TF_Related_table.

FIG. 12B shows an example of a TF_Related_table.

FIG. 13B is a schematic diagram showing interference of an uplink transmission signal with a downlink reception signal.

FIG. 14 is a flowchart of a process of determining a Temporary RB group.

FIG. 15 shows an example of a relationship between path loss (Pathloss) and MCS.

FIG. 16 is a partial block diagram of a base station apparatus according to an embodiment of the present invention.

DETAILED DESCRIPTION OF THE PREFERRED EMBODIMENTS

Figure 1:
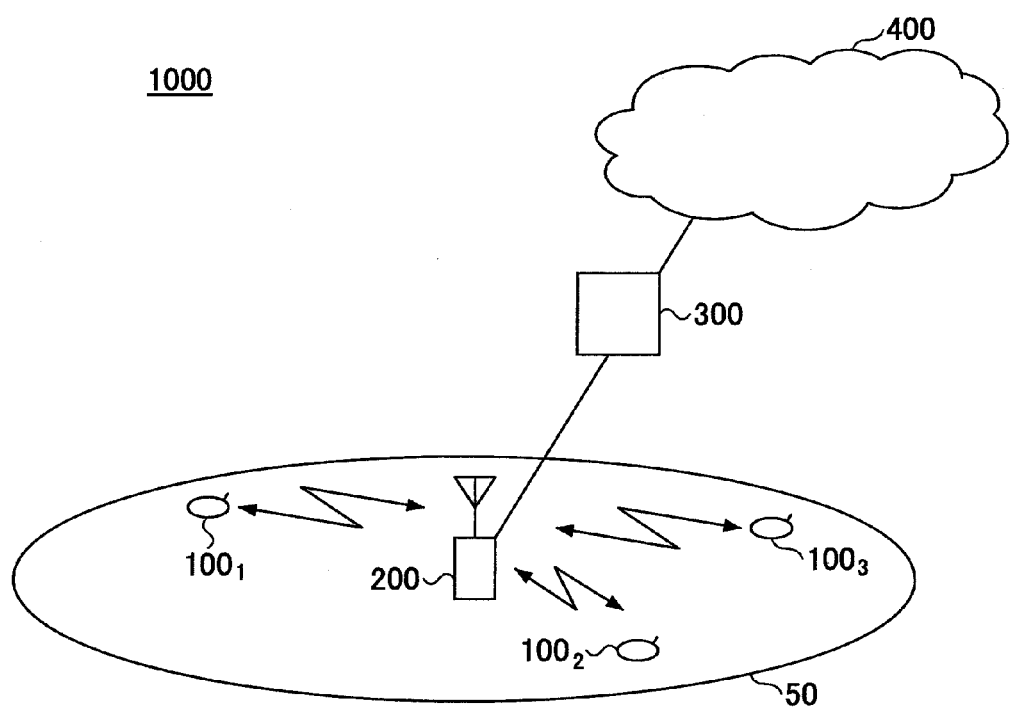
FIG. 1 is a schematic diagram showing a configuration of a radio communication system according to an embodiment of the present invention.

Description of Notations 50 cell
$100_1$, $100_2$, $100_3$, $100_n$ user equipment terminal
200 base station apparatus
206 scheduling coefficient calculation unit
210 transport format and resource block selection unit
212 layer 1 processing unit
300 access gateway apparatus
400 core network

BEST MODE OF CARRYING OUT THE INVENTION

First Embodiment

Next, a best mode for carrying out the present invention is described based on a first embodiment described below with reference to the accompanying drawings.

Throughout the figures for illustrating the embodiments of the present invention, the same reference numerals are used for the same or equivalent elements and their repeated descriptions may be omitted.

First, a radio communication system having a base station apparatus according to an embodiment of the present invention is described with reference to FIG. 1.

As shown in FIG. 1, the radio communication system 1000, which may be an Evolved UTRA (Universal Terrestrial Radio Access) and UTRAN (UTRA Network) system (a.k.a an LTE (Long Term Evolution) system or a super 3 G system), includes a base station apparatus (eNB: eNode B) 200 and plural sets of user equipment (UE) $100_n$ ($100_1$, $100_2$, $100_3$, . . . $100_n$; an integer greater than zero (0)) (hereinafter, the user equipment (UE) may be referred to as a user equipment terminal(s)). The base station apparatus 200 is connected to an upper node such as an access gateway apparatus 300. The access gateway apparatus 300 is connected to a core network 400. In this case, the user equipment terminals $100_n$ are in communication with the base station apparatus 200 in a cell 50 based on the Evolved UTRA and UTRAN radio communication scheme.

Each of the user equipment terminals ($100_1$, $100_2$, $100_3$, ... $100_n$) has the same configuration, functions, and status. Therefore, unless otherwise described, the term of user equipment terminals (UE) $100_n$ may be collectively used in the following descriptions.

As the radio access scheme in the radio communication system 1000, the OFDM (Orthogonal Frequency Division Multiplexing) scheme and the SC-FDMA (Single-Carrier Frequency Division Multiplexing Access) scheme are used in downlink and uplink communications, respectively. As described above, the OFDM scheme is a multi-carrier transmission scheme in which a frequency band is divided into plural sub-carriers having narrow frequency bands and data are mapped on each sub-carrier to be transmitted. The SC-FDMA scheme is a single-carrier transmission scheme in which a frequency band is divided so that different frequencies can be used among plural terminals and as a result, interference between terminals can be reduced.

Next, communication channels used in the Evolved UTRA and UTRAN radio communication scheme are described.

In downlink communications, a Physical Downlink Shared Channel (PDSCH) that is shared among the user equipment terminals $100_n$ and a Physical Downlink Control Channel (PDCCH) are used. The Physical Downlink Control Channel (PDCCH) may also be called a DL L1/L2 Control Channel. In downlink, transport format information and user information of the user to which the Physical Downlink Shared Channel is transmitted, transport format information and user information of the user by which a Physical Uplink Shared Channel (PUSCH) is transmitted, acknowledge information of the PUSCH (or an Uplink Shared Channel (UL-SCH) as a transport channel), and the like are reported via the Physical Downlink Control Channel (PDCCH). User data are transmitted via the Physical Downlink Shared Channel. The user data are transmitted via a Downlink Shared Channel (DL-SCH) as a transport channel.

In uplink communication, the Physical Uplink Shared Channel (PUSCH) that is shared among user equipment terminals $100_n$ and an LTE control channel are used. The LTE control channel has two types; one is to be time-multiplexed with the Physical Uplink Shared Channel (PUSCH) and the other is to be frequency-multiplexed with the Physical Uplink Shared Channel (PUSCH). The control channel to be frequency-multiplexed with the Physical Uplink Shared Channel (PUSCH) is called a Physical Uplink Control Channel (PUCCH).

In uplink communication, a downlink Channel Quality Indicator (CQI) to be used for scheduling for the Downlink Shared Channel (DL-SCH) and Adaptive Modulation and Coding (AMC), and acknowledgement information of the Downlink Shared Channel (HARQ ACK information) are transmitted via the LTE control channel. Further, user data are transmitted via the Physical Uplink Shared Channel (PUSCH). The user data are transmitted via an Uplink Shared Channel (UL-SCH) as a transport channel.

1. Uplink MAC Communication Control Procedure

Next, an uplink MAC (UL MAC) communication control procedure as a communication control method performed in a base station apparatus according the present embodiment is described.

In this embodiment, a logical channel corresponds to, for example, a Radio bearer; and a priority class corresponds to, for example, a priority level (or priority).

Unless otherwise described, the "corresponding sub-frame" refers to a sub-frame in which the user equipment terminal transmits the Uplink Shared Channel (UL-SCH) according to scheduling.

In the following descriptions, dynamic scheduling corresponds to a first resource allocating scheme for dynamically allocating radio resources. When dynamic scheduling is applied to the Uplink Shared Channel (UL-SCH), radio resources are allocated to the user equipment terminal in arbitrary sub-frames. Further, in this case, various values may be set as the values of the transmission format including allocation information about resource blocks (frequency resources), a modulation scheme, a payload size, information about transmission power, HARQ information (a Redundancy version parameter, a process number, etc.), and MIMO information (a reference signal sequence for MIMO transmission, etc.).

On the other hand, persistent scheduling is a scheduling scheme for periodically allocating data transmission opportunities in accordance with a data type or features of the application to transmit/receive data. Persistent scheduling corresponds to a second resource allocating scheme for periodically allocating radio resources. Namely, when persistent scheduling is applied to the Uplink Shared Channel (UL-SCH), radio resources are allocated to the user equipment terminal in predetermined sub-frames. Further, in this case, predetermined values are set as the values of the transmission format including allocation information about resource blocks (frequency resources), a modulation scheme, a payload size, information about transmission power, HARQ information (a Redundancy version parameter, a process number, etc.), and MIMO information (a reference signal sequence for MIMO transmission, etc.). Namely, radio resources are allocated in the predetermined sub-frames, and the Uplink Shared Channel (UL-SCH) is transmitted using the predetermined transmission format. In this case, the predetermined sub-frames may be arranged, for example, at a predetermined cycle. Further, the predetermined transmission format is not necessarily fixed to one type, so that plural types of transmission formats may be provided.

2. Allocation Unit of the Transmission Band for The Physical Uplink Shared Channel (PUSCH)

In the present embodiment, the transmission band in the frequency direction is allocated in terms of resource blocks (RBs). For example, one resource block (1 RB) corresponds to 180 kHz. The number of RBs is equal to 25 for the system bandwidth of 5 MHz, is equal to 50 for the system bandwidth of 10 MHz, and is equal to 100 for the system bandwidth of 20 MHz. Also, the transmission band for the PUSCH is allocated in terms of RBs in each sub-frame. In addition, RBs are allocated such that factors of the DFT size do not include values other than 2, 3, and 5. In other words, the factors of the DFT size only include 2, 3, and 5.

For retransmission of the Uplink Shared Channel (UL-SCH), the base station apparatus 200 may or may not transmit the corresponding Uplink Scheduling Grant. When the base station apparatus 200 transmits the Uplink Scheduling Grant for retransmission of the Uplink Shared Channel (UL-SCH), the user equipment terminal retransmits the Uplink Shared Channel (UL-SCH) according to the Uplink Scheduling Grant. As described above, the Uplink Scheduling Grant includes the identification information of the user equipment terminal which communicates using the shared channel in the corresponding sub-frame and also includes the transmission format of the shared channel such as allocation information about resource blocks (frequency resources), a modulation scheme, a payload size, information about transmission power, HARQ information (a Redundancy version parameter, a process number, etc.), and MIMO information (a reference signal sequence for MIMO transmission, etc.). It should be noted that only a portion of the Uplink Scheduling Grant may be modified from the corresponding portion for initial transmission. For example, only allocation information about resource blocks (frequency resources) and information about transmission power may be modified. On the other hand, when the base station apparatus 200 does not transmit the Uplink Scheduling Grant for retransmission of the Uplink Shared Channel (UL-SCH), the user equipment terminal retransmits the Uplink Shared Channel (UL-SCH) according to either the Uplink Scheduling Grant for initial transmission or the previously received Uplink Scheduling Grant for the Uplink Shared Channel (UL-SCH). This retransmission is performed for the PUSCH (the UL-SCH as the transport channel) to which dynamic scheduling is applied. Alternatively, this retransmission may be performed for the PUSCH (the UL-SCH as the transport channel) to which persistent scheduling is applied. In addition, in the case of a Message-3 in the random access procedure, the base station apparatus 200 may never transmit the Uplink Scheduling Grant for retransmission of the Uplink Shared Channel (UL-SCH).

As used herein, dynamic scheduling corresponds to a first resource allocating scheme for dynamically allocating radio resources.

3. UL MAC Data Transmission Procedure

Figure 2:
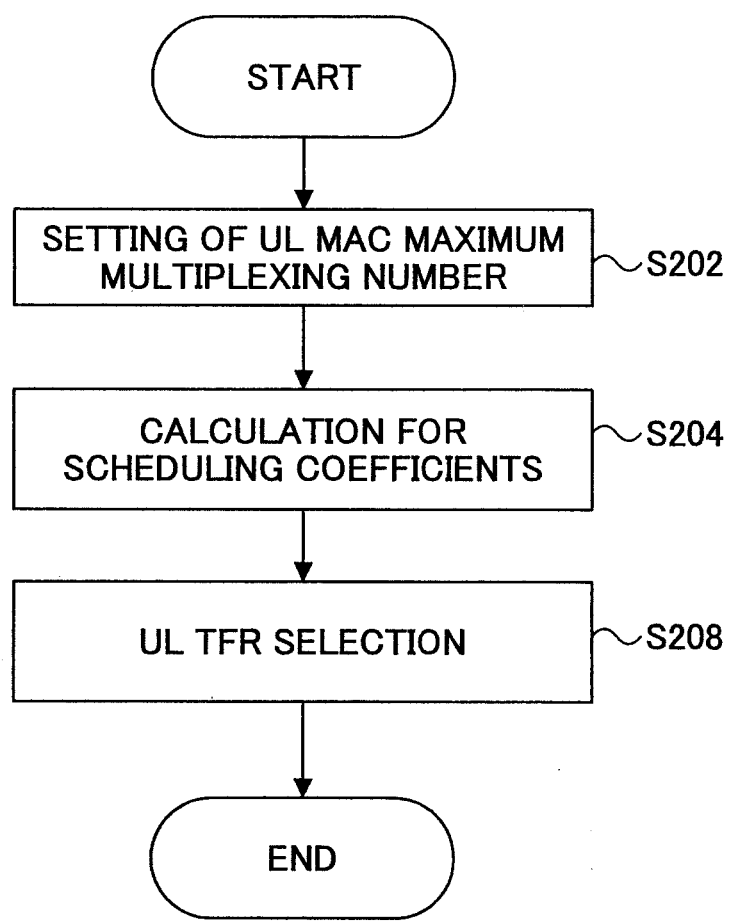
FIG. 2 is a flowchart showing a process of UL MAC data transmission according to an embodiment of the present invention.

Next, an uplink MAC (UL MAC) data transmission procedure is described with reference to FIG. 2. FIG. 2 shows a procedure, starting from a scheduling process of calculating scheduling coefficients, to an UL TFR selection process of determining the transport format and RBs to be allocated.

3.1. Setting of UL MAC Maximum Multiplexing Number $N_{ULMAX}$

In step S202, an UL MAC maximum multiplexing number $N_{ULMAX}$ is set in the base station apparatus 200. The UL MAC maximum multiplexing number $N_{ULMAX}$ is the maximum multiplexing number in one sub-frame of the Uplink Shared Channel (UL-SCH) (including both the UL-SCH for initial transmission and the UL-SCH for retransmission) to which dynamic scheduling is applied and is designated via the external input interface (I/F).

3.2. Calculation for Scheduling Coefficients

Next, in step S204, Calculation for Scheduling coefficients is performed in the base station apparatus 200. The user equipment terminals (UEs) to which radio resources are to be allocated according to dynamic scheduling in the corresponding sub-frame are selected. Then, Uplink Transport format and Resource selection is performed, as described below, with respect to the user equipment terminals (UEs) to which radio resources are to be allocated according to dynamic scheduling in the corresponding sub-frame.

The number of user equipment terminals (UEs) to which radio resources are to be allocated according to dynamic scheduling in the corresponding sub-frame is defined as $N_{UL\text{-}SCH}$.

3.4. Uplink Transport Format and Resource Selection (UL TFR Selection)

Next, in step S208, Uplink Transport format and Resource selection is performed in the base station apparatus 200. The base station apparatus 200 reserves radio resources (RBs) for the Physical Random Access Channel (PRACH), reserves prohibited radio resources (RBs) or guard RBs, reserves radio resources (RBs) for the UL-SCH to which persistent scheduling is applied, and then determines a transmission format for the UL-SCH to which dynamic scheduling is applied and allocates radio resources for the UL-SCH to which dynamic scheduling is applied (including for both initial transmission and retransmission).

4. Calculation for Scheduling Coefficients

Next, Calculation for Scheduling coefficients performed in step S204 is described with reference to FIG. 3.

4.1. Process Flow

Figure 3:
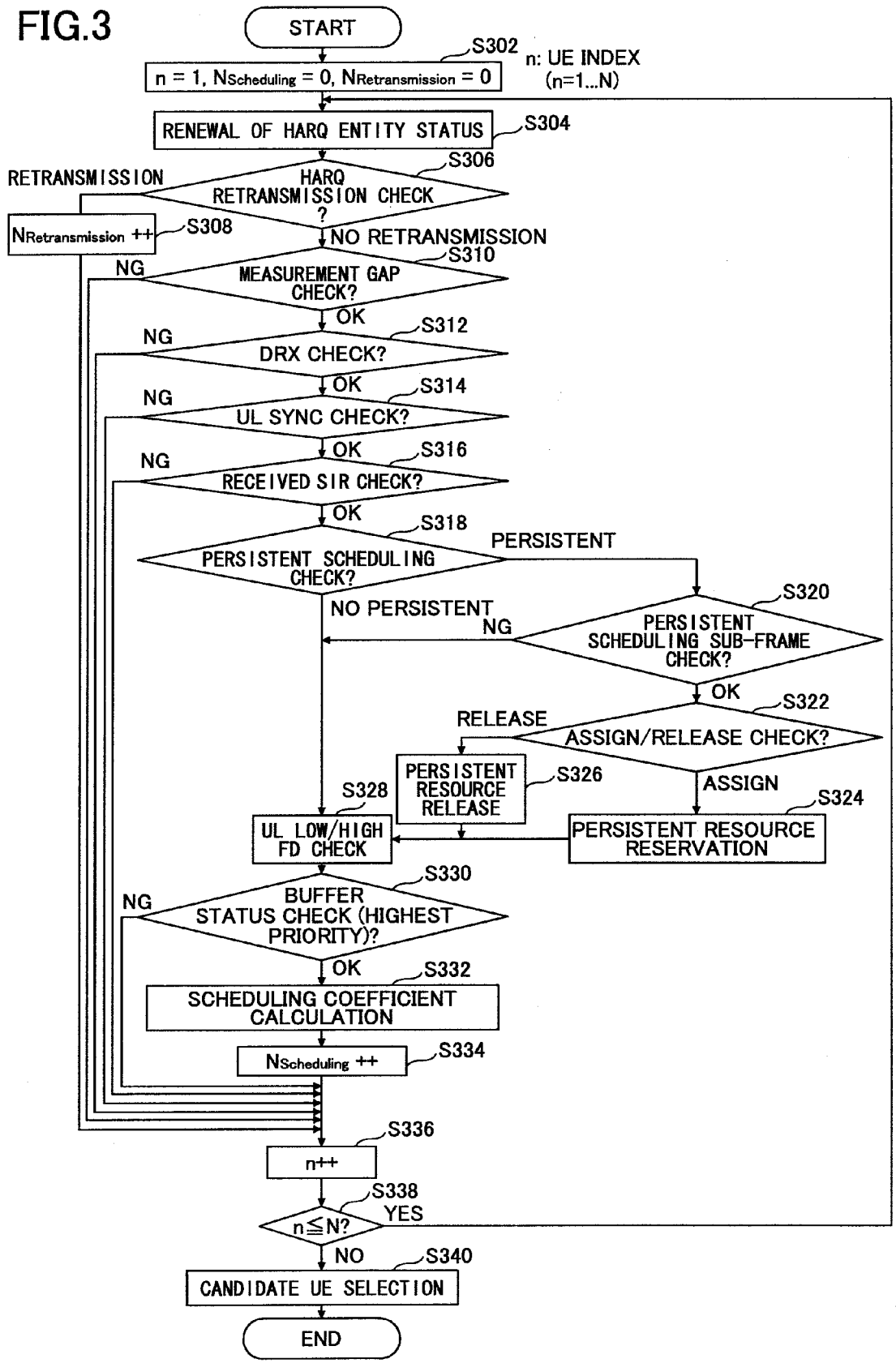
FIG. 3 is a flowchart showing a process of scheduling coefficient calculation and candidate UE selection according to an embodiment of the present invention.

FIG. 3 shows a process of selecting candidates for the user equipment terminals (UEs) to which radio resources are to be allocated according to dynamic scheduling, by calculating the scheduling coefficients. The base station apparatus 200 performs the following processes with respect to all the user equipment terminals (UEs) in an LTE active state (in an RRC (Radio Resource Control) connected state).

As shown in FIG. 3, in step S302, equations of n=1, $N_{Scheduling}$=0, $N_{Retransmission}$=0 are provided; where n denotes an index of the user equipment terminals 100$_n$ and n=1, ..., N (N is an integer greater than 0).

4.1.1. Renewal of HARQ Entity Status

Next, in step S304, Renewal of HARQ (Hybrid Automatic Repeat reQuest) Entity Status is performed. In this step, with respect to the user equipment terminal (UE), a process in which the CRC result of the UL-SCH is OK is released.

Further, a process in which the maximum number of retransmission times has been reached is also released and the user data in the process are discarded. As used herein, the maximum number of retransmission times is "the largest value selected from the maximum numbers of retransmission times of all the logical channels which may be used by the user equipment terminal (UE) for transmission".

The user equipment terminal (UE) performs HARQ based on the maximum number of retransmission times of the logical channel with the highest priority class among logical channels to be multiplexed in the MAC PDU. For example, when the user equipment terminal uses the shared channel to transmit the transport channel including two or more logical channels, the user equipment terminal determines that the maximum number of retransmission times of the transport channel is the maximum number of retransmission times of the logical channel with the highest priority level among the two or more logical channels.

Further, a process in which no transmission of the UL-SCH is detected upon power detection of the Uplink Shared Channel is also released.

4.1.2. HARQ Retransmission Check

Next, in step S306, HARQ Retransmission Check is performed. It is determined whether the user equipment terminal (UE) has data to be retransmitted in the corresponding sub-frame. The "data to be retransmitted" refer to retransmission data which satisfy the following four conditions:

the timing of retransmitting data corresponds to the retransmission timing according to Synchronous HARQ;

the previous CRC results of the UL-SCH are not OK;

the maximum number of retransmission times has not been reached; and

"no transmission of the UL-SCH" is not detected upon power detection of the Uplink Shared Channel.

When the user equipment terminal (UE) has data to be retransmitted, the process of the HARQ Retransmission Check returns "Retransmission". Otherwise, the process of the HARQ Retransmission Check returns "No retransmission". When the result of the HARQ Retransmission Check is determined as "No retransmission", the process goes to step S310 in which Measurement Gap Check is performed.

Since the maximum number of retransmission times of the UL-SCH is determined for each priority class of the logical channel, the base station apparatus (eNB) performs the process assuming that the maximum number of retransmission times is the largest value selected from the maximum numbers of retransmission times of all the logical channels which may be used for transmission.

When the result of the HARQ Retransmission Check is determined as "Retransmission", $N_{Retransmission}$ is incremented by one in step S308 ($N_{Retransmission}$++), and then the user equipment terminal (UE) is excluded from a target of the scheduling process for initial transmission. In addition, when persistent resources are allocated in the corresponding sub-frame to the user equipment terminal's logical channel to which persistent scheduling is applied, the persistent resources are released. The RBs corresponding to the persistent resources are used for UL TFR Selection for the UL-SCH to which dynamic scheduling is applied.

As a result, retransmission according to dynamic scheduling has precedence over initial transmission according to persistent scheduling.

4.1.3. Measurement Gap Check

Next, in step S310, Measurement Gap Check is performed. In this step, the base station apparatus 200 does not allocate the Uplink Shared Channel (RBs for the Uplink Shared Channel) to the user equipment terminal (UE), when the time interval during which the user equipment terminal (UE) measures a cell with a different frequency overlaps a time frame in which the Physical Downlink Control Channel for the Uplink Shared Channel is transmitted in downlink, a time frame in which the shared channel is received, or a time frame in which acknowledge information for the Uplink Shared Channel is transmitted. The UL Scheduling Grant for the Uplink Shared Channel is transmitted via the Physical Downlink Control Channel.

In this case, the cell with the different frequency may be a cell of the Evolved UTRA and UTRAN system or a cell of another system such as GSM, WCDMA, TDD-CDMA, CDMA-2000, or WiMAX.

Specifically, it is determined whether the sub-frame in which the Physical Downlink Control Channel is transmitted is included in the Measurement gap, whether the sub-frame in which the UL-SCH is transmitted is included in the Measurement gap, or whether the sub-frame in which an ACK/NACK for the UL-SCH is transmitted is included in the Measurement gap, with respect to initial transmission and second transmission from the user equipment terminal (UE). When it is determined that the sub-frame in which the Physical Downlink Control Channel is transmitted is included in the Measurement gap, that the sub-frame in which the UL-SCH is transmitted is included in the Measurement gap, or that the sub-frame in which the ACK/NACK for the UL-SCH is transmitted is included in the Measurement gap, the process of the Measurement Gap Check returns NG (failed). Otherwise, the process of the Measurement Gap Check returns OK. The Measurement gap refers to a time interval during which the user equipment terminal (UE) measures a cell with a different frequency for the purpose of different-frequency handover or different-system handover. During the time interval, communications cannot be performed and therefore, the user equipment terminal (UE) cannot receive the Physical Downlink Control Channel. For the same reason, the user equipment terminal (UE) cannot transmit the Uplink Shared Channel and cannot receive the ACK/NACK. When the result of the Measurement Gap Check is determined as NG, the user equipment (UE) terminal is excluded from a target of the scheduling process.

In this example, the Measurement Gap Check is not performed for third transmission or later. Although the Measurement Gap Check is performed for the initial transmission and second transmission in this example, it may be performed for the initial transmission, second transmission, and third transmission.

4.1.4. DRX Check

Next, in step S312, DRX (discontinuous reception) Check is performed. When the user equipment terminal (UE) performs DRX, that is, when the user equipment terminal (UE) is in a DRX mode, the Uplink Shared Channel (RBs for the Uplink Shared Channel) is not allocated to the user equipment terminal (UE).

Specifically, it is determined whether the user equipment terminal (UE) is in the DRX mode. When it is determined that the user equipment terminal (UE) is in the DRX mode, the process of the DRX Check returns NG (failed). Otherwise, the process of the DRX Check returns OK. When the result of the DRX Check is determined as NG, the user equipment terminal (UE) is excluded from a target of the scheduling process for initial transmission.

4.1.5. UL Sync Check

Next, in step S314, Uplink Synchronization Check (UL Sync Check) is performed. In this step, when the user equipment terminal (UE) is out of synchronization, the Uplink Shared Channel (RBs for the Uplink Shared Channel) is not allocated to the user equipment terminal (UE).

Specifically, it is determined whether the uplink synchronization state of the user equipment terminal (UE) is "Synchronization established", "Out of Synchronization: Type A", or "Out of Synchronization: Type B". When it is determined that the uplink synchronization state is "Out of Synchronization: Type A" or "Out of Synchronization: Type B", the process of the UL Sync Check returns NG (failed). When it is determined that the uplink synchronization state is "Synchronization established", the process of the UL Sync Check returns OK. When the result of the UL Sync Check is determined as NG, the user equipment terminal (UE) is excluded from a target of the scheduling process.

The base station apparatus (eNB) 200 performs the following two kinds of detections (determinations) for the uplink synchronization state with respect to each user equipment terminal (UE) $100_n$ in the RRC_connected state.

First, the base station apparatus (eNB) 200 performs power detection of a Sounding RS (Reference signal) of the user equipment terminal (UE) within a range of Window 1 determined by taking the cell radius into consideration and having a similar size of a Window to wait for a RACH preamble. Namely, when a metric used in the power detection of the user equipment terminal exceeds a predetermined threshold, the result of the power detection is determined as OK. Otherwise, the result of the power detection is determined as NG. Further, a reflection time (which is a time period required to determine OK or NG) in the power detection is typically in a range from 200 ms to 1,000 ms while the Sounding RS is continuously received.

Second, the base station apparatus (eNB) 200 performs FFT timing detection to detect whether a signal of the user equipment terminal (UE) is included within a range of Window 2 defined based on an FFT timing and a CP (Cyclic Prefix) length. Therefore, when the signal of the user equipment terminal (UE) is included in the Window 2, the result of the FFT timing detection is determined as OK. When there is no main path of the user equipment terminal (UE), the result of the FFT timing detection is determined as NG. Further, the reflection time (which is a time period required to determine OK or NG) in the FFT timing detection is typically in a range from 1 ms to 200 ms while the Sounding RS is continuously received.

The "Out of Synchronization: Type A" refers to a synchronization state of the user equipment terminal (UE) in which the result of the power detection is determined as OK and the result of the FFT timing detection is determined as NG. On the other hand, the "Out of Synchronization: Type B" refers to a synchronization state of the user equipment terminal (UE) in which the result of the power detection is determined as NG and the result of the FFT timing detection is determined as NG.

As described above, the process of the HARQ Retransmission Check in step S306 is performed before the process of the UL Sync Check in step S314. Accordingly, when the result of the HARQ Retransmission Check is determined as "Retransmission", the retransmitted UL-SCH is received with respect to the user equipment terminal (UE) even if the result of the UL Sync Check is determined as NG.

4.1.6. Received SIR Check

Next, in step S316, Received SIR Check is performed. In this step, when the base station apparatus 200 does not receive the reference signal from the user equipment terminal (UE), the base station apparatus 200 does not allocate the Uplink Shared Channel (RBs for the Uplink Shared Channel) to the user equipment terminal (UE).

Specifically, the base station apparatus 200 determines whether at least one Sounding Reference Signal is received from the user equipment terminal (UE) within "all the RBs in which the Sounding Reference Signal may be transmitted", which is defined by the transmission bandwidth and the frequency hopping interval for the Sounding Reference Signal. When at least one Sounding Reference Signal is received within "all the RBs in which the Sounding Reference Signal may be transmitted", the process of the Received SIR Check returns OK. Otherwise, the process of the Received SIR Check returns NG (failed). When the result of the Received SIR Check is determined as NG, the user equipment terminal (UE) is excluded from a target of the scheduling process.

In this example, the base station apparatus 200 determines whether at least one Sounding Reference Signal is received within "all the RBs in which the Sounding Reference Signal may be transmitted". Alternatively, the base station apparatus 200 may determine whether at least one Sounding Reference Signal is received in at least one of "all the RBs in which the Sounding Reference Signal may be transmitted".

The Sounding Reference Signal refers to a signal used for measurement of channel quality for the purpose of uplink frequency scheduling.

4.1.7. Persistent Scheduling Check

Next, in step S318, Persistent Scheduling Check is performed. Persistent scheduling is a scheduling scheme for periodically allocating data transmission opportunities in accordance with a data type or features of the application to transmit/receive data. Further, the data type may include data of Voice Over IP, Streaming data or the like. The Voice Over IP or the Streaming corresponds to the application.

In step S318, it is determined whether the user equipment terminal (UE) has a logical channel to which persistent scheduling is applied. When it is determined that the user equipment terminal (UE) has a logical channel to which persistent scheduling is applied, the process goes to step S320 in which Persistent Scheduling Sub-frame Check is performed. Otherwise, the process goes to step S328 in which UL Low/High Fd Check is performed.

4.1.7.1. Persistent Scheduling Sub-Frame Check

Next, in step S320, Persistent Scheduling Sub-frame Check is performed. In this step, it is determined whether persistent resources are to be allocated to the user equipment terminal's logical channel to which persistent scheduling is applied. When it is determined that persistent resources are to be allocated, the process goes to step S322 in which Assign/Release Check is performed. Otherwise, the process goes to step S328 in which UL Low/High Fd Check is performed. As used herein, the persistent resources refer to resource blocks which are reserved for persistent scheduling.

4.1.7.2. Assign/Release Check

Next, in step S322, Assign/Release Check is performed. It is determined whether the base station apparatus 200 receives from the user equipment terminal (UE) a Release request for the persistent resources which are allocated to the user equipment terminal (UE) in the corresponding sub-frame. When the base station apparatus receives the Release request, the process goes to step S326 in which Persistent Resource Release is performed. Otherwise, the process goes to step S324 in which Persistent Resource Reservation is performed.

4.1.7.3. Persistent Resource Reservation

Next, in step S324, Persistent Resource Reservation is performed. In this step, persistent resources to be allocated to the user equipment terminal's logical channel to which persistent scheduling is applied are reserved.

Further, Scheduling Coefficient Calculation described in Section 4.1.10 is also performed with respect to the user equipment terminal (UE) to which persistent resources are to be allocated in the corresponding sub-frame. Further, when radio resources are allocated to the logical channel to which dynamic scheduling is applied in the corresponding sub-frame, the user equipment terminal (UE) multiplexes the logical channel to which persistent scheduling is applied and the logical channel to which dynamic scheduling is applied, and then transmits the MAC PDU (UL-SCH).

Alternatively, radio resources may not be allocated to the logical channel to which dynamic scheduling is applied in the corresponding sub-frame with respect to the user equipment terminal (UE) to which persistent resources are to be allocated in the corresponding sub-frame. In this case, the process goes to step S336 after Persistent Resource Reservation in step S324.

4.1.7.4. Persistent Resource Release

Next, in step 326, Persistent Resource Release is performed. In this step, when the base station apparatus 200 receives a signal for the release of the resources to be allocated according to persistent scheduling, the base station apparatus 200 uses the released resources (the resources to be allocated according to persistent scheduling) as the resources to be allocated according to dynamic scheduling.

Specifically, the base station apparatus 200 releases persistent resources to be allocated in the corresponding sub-frame to the user equipment terminal's logical channel to which persistent scheduling is applied. It should be noted that the persistent resources are released only in the corresponding sub-frame and the Assign/Release Check is performed again in the next allocation timing of persistent resources.

4.1.8. UL Low/High Fd Check

Next, in step S328, the uplink transmission type is checked (UL Low/High Fd Check is performed). In this step, it is determined whether the UL transmission type for the user equipment terminal (UE) is Low Fd or High Fd. The transmission type is independently managed in downlink and uplink.

For example, when the value of path loss (Pathloss) for the user equipment terminal (UE) is less than or equal to a predetermined threshold (Threshold$_{PL}$) and when the estimated value of Fd for the user equipment terminal (UE) is less than or equal to a predetermined threshold (Threshold$_{Fd,UL}$), the UL transmission type is determined as Low Fd. Otherwise, the UL transmission type is determined as High Fd.

As the value of Pathloss, a value reported from the user equipment terminal (UE) by means of a Measurement report or the like may be used. Alternatively, as the value of Pathloss, a value calculated based on both UPH (UE Power Headroom) reported from the user equipment terminal (UE) and the received level of the Sounding Reference Signal transmitted from the user equipment terminal (UE) may be used. When the value of Pathloss is calculated based on both the UPH reported from the user equipment terminal (UE) and the received level of the Sounding Reference Signal transmitted from the user equipment terminal (UE), the value of Pathloss may be calculated according to the following equation.

Pathlosss=(maximum transmission power for UE)−UPH−(the received level of the Sounding RS)

(This equation is calculated in the units of dB.)
UPH is defined as follows.

UPH=(maximum transmission power for UE)−(transmission power for the Sounding RS)

(This equation is also calculated in the units of dB.)

As the estimated value of Fd, the value reported from the user equipment terminal (UE) by means of the Measurement report or the like may be used. Alternatively, as the estimated value of Fd, a value calculated based on the time correlation value of the Sounding Reference Signal transmitted from the user equipment terminal (UE) may be used.

Further, in this example, the transmission type is determined based on both the value of Pathloss and the estimated value of Fd. Alternatively, the transmission type may be determined based on only the value of Pathloss or only the estimated value of Fd.

4.1.9. Buffer Status Check (Highest Priority)

Next, in step S330, Buffer Status Check is performed. In this step, the base station apparatus does not allocate the Uplink Shared Channel (RBs for the Uplink Shared Channel) to the user equipment terminal (UE), when the user equipment terminal (UE) does not have data to be transmitted.

Specifically, it is determined whether there are available data to be transmitted in the corresponding sub-frame with respect to the user equipment terminal's logical channel groups (a high priority group and a low priority group). When there are no available data to be transmitted, the process of the Buffer Status Check returns NG (failed). Otherwise, the process of the Buffer Status Check returns OK. As used herein, available data to be transmitted refers to available data to be initially transmitted. When the amount of data in the UL Buffer is greater than zero (0), it is determined that there are "available data to be initially transmitted". Please refer to Section 4.1.10.2 for the definition of the amount of data in the UL Buffer. Although two types of the user equipment terminal's logical channel groups (the high priority group and the low priority group) are used in this example, a similar process can be applied to the case where three or more types of logical channel groups are used. Also, a similar process can be applied to the case where only one type of logical channel group is used.

When the base station apparatus receives from the user equipment terminal (UE) "allocation request for the PUSCH: REQUESTING" by means of the Scheduling request and uplink radio resources (PUSCH) have not been allocated to the user equipment terminal (UE) since the base station apparatus has received the Scheduling request, namely, when the Uplink Shared Channel (RBs for the Uplink Shared Channel) is not allocated to the user equipment terminal (UE), the following scheduling process is performed assuming that there are available data to be transmitted with respect to the logical channel group corresponding to the high priority group.

When the base station apparatus does not receive information about the amount of data in the buffer (data including the Buffer Status Report) at the reception timing of the PUSCH (the UL-SCH as the transport channel), even though the base station apparatus (eNB) allocates uplink radio resources (PUSCH) in response to the Scheduling request or allocates the Uplink Shared Channel (RBs for the Uplink Shared Channel), the base station again assumes that the base station apparatus receives from the user equipment terminal (UE) the "allocation request for the PUSCH: REQUESTING" by means of the Scheduling request and uplink radio resources (PUSCH) have not been allocated to the user equipment terminal (UE) since the base station apparatus has received the Scheduling request. This assumption is made when the base station apparatus does not receive information about the amount of data in the buffer (data including the Buffer Status Report) at the timing of initial transmission without waiting for the maximum number of retransmission times.

When the result of the Buffer Status Check is determined as NG, the user equipment terminal (UE) is excluded from a target of the scheduling process for initial transmission.

On the other hand, when the result of the Buffer Status Check is determined as OK, a logical channel group with the highest priority level is selected based on the following selection logic and the process goes to step S332 in which Scheduling Coefficient Calculation is performed. In other words, the base station apparatus calculates the scheduling coefficients based on the data type with the highest priority level among data types retained by the user equipment terminal.

Selection logic 1: When there are available data to be transmitted in the high priority group, the logical channel group corresponding to the high priority group is defined as the logical channel group with the highest priority level.

Selection logic 2: When there are no available data to be transmitted in the high priority group (when there are available data to be transmitted only in the low priority group), the logical channel group corresponding to the low priority group is defined as the logical channel group with the highest priority level.

4.1.10. Scheduling Coefficient Calculation

Next, in step S332, Scheduling Coefficient Calculation is performed. In this step, with respect to the logical channel group with the highest priority level determined in Section 4.1.9, the scheduling coefficients are calculated based on the following evaluation equation.

Tables 1-1 and 1-2 show parameters set via the external interface (I/F). Table 2 shows parameters for each logical channel group of the user equipment terminal (UE).

TABLE 1-1

List of input parameters for the scheduler

| No | Parameter name | Set with respect to each | Remarks |
|---|---|---|---|
| 1 | $A_{LCG}$ | Logical channel group | This is a Priority Class priority level coefficient based on the logical channel group. |

TABLE 1-1-continued

List of input parameters for the scheduler

| No | Parameter name | Set with respect to each | Remarks |
|---|---|---|---|
| 2 | $F_{LCG}(t_{No\_allocated})$ | Logical channel group | This is a transmission resource allocation priority level coefficient used to preferentially transmit data to UE to which transmission resources are not allocated according to dynamic scheduling. A time interval $t_{No\_allocated}$ during which transmission resources are not allocated according to dynamic scheduling is defined as an elapsed time from the timing when the preceding CRC result of the UL-SCH including logical channels belonging to the corresponding logical channel group is determined as OK. If the CRC result of the UL-SCH including logical channels belonging to the corresponding logical channel group is never determined as OK, the time interval $t_{No\_allocated}$ is defined as an elapsed time from the timing when information about the amount of data in the buffer (the amount of data is other than zero (0)) with respect to the logical channel group is reported from the user equipment terminal. This value is set based on the buffer residence time $t_{No\_allocated}$ as follows. $F_{LCG}(t_{No\_allocated} < Th_{LCG}^{(No\_allocated)}) = 0.0$ $F_{LCG}(t_{No\_allocated} >= Th_{LCG}^{(No\_allocated)}) = 1.0$ |
| 3 | $Th_{LCG}^{(No-Allocated)}$ | Priority class | This is a threshold related to the time interval during which transmission resources are not allocated according to dynamic scheduling. |
| 4 | $G(flag_{SR})$ | UE | This is a Scheduling request priority level coefficient given to preferentially transmit data to UE from which the base station apparatus receives "allocation request for the PUSCH: REQUESTING" by means of the Scheduling request and to which uplink radio resources (PUSCH) have not been allocated since the base station apparatus has received the Scheduling request. In the corresponding sub-frame, this value is set based on a value $flag_{SR}$ related to the corresponding UE. For example, when $flag_{SR} = 0$, G(0) is set to a fixed value 1.0 (G(0) = 1.0), and only when $flag_{SR} = 1$, this value is set via the external interface (I/F). When the base station apparatus receives from the UE "allocation request for the PUSCH: REQUESTING" by means of the Scheduling request and when uplink radio resources (PUSCH) have not been allocated to the UE since the base station apparatus has received the Scheduling request, $flag_{SR}$ is set equal to one ($flag_{SR} = 1$). Otherwise, $flag_{SR}$ is set equal to zero ($flag_{SR} = 0$). |
| 5 | $H(flag_{gap\_control})$ | UE | This is a gap control priority level coefficient used to preferentially transmit data to UE in which a Measurement gap control mode is ON to measure a cell with a different frequency. In the corresponding sub-frame, this value is set based on a value $flag_{gap\_control}$ of the corresponding UE. When $flag_{gap\_control} = 0$, H(0) is set to a fixed value 1.0 (H(0) = 1.0), and only when $flag_{gap\_control} = 1$, this value is set via the external interface (I/F). When the corresponding UE is in Measurement gap control mode (i.e., when the Measurement gap control mode is ON), $flag_{gap\_control}$ is defined as 1 ($flag_{gap\_control} = 1$), otherwise, $flag_{gap\_control}$ is defined as 0 ($flag_{gap\_control} = 0$). For example, to increase the priority level of UE where the Measurement gap control mode is ON, H(1) may be set 10 (H(1) = 10). |

(The subscript LCG refers to the logical channel group.)

TABLE 1-2

List of input parameters for the scheduler

| No | Parameter name | Set with respect to each | Remarks |
|---|---|---|---|
| 6 | $R_{PC}^{(target)}$ | Logical channel group | This is a target data rate (bits/sub-frame). |
| 7 | $\alpha^{(PL)}$ | UE | This is a weighting coefficient with respect to the priority level based on path loss (Pathloss). |
| 8 | $\alpha_{LCG}^{(No\_allocated)}$ | Logical channel group | This is a weighting coefficient with respect to the priority level based on the transmission interval during which transmission resources are not allocated according to dynamic scheduling. |
| 9 | $\alpha_{LCG}^{(freq)}$ | Logical channel group | This is a weighting coefficient with respect to the priority level based on the allocation frequency (the frequency of allocation occurrences). |
| 10 | $\alpha_{LCG}^{(rate)}$ | Logical channel group | This is a weighting coefficient with respect to the priority level based on an Average Data Rate. |
| 11 | $\delta'_{LCG}$ | Logical channel group | This is a convergence value of a user data rate averaged forgetting coefficient for $\overline{R}_{n,k}$. |
| 12 | $\tau'$ | UE | This is a convergence value of allocation frequency averaged forgetting coefficient used in calculating $freq_n$. |
| 13 | Scheduling priority handling mode | Cell | This is a parameter to select a scheduling mode among logical channel groups. This value is set as a value 0 or 1. 0 is a mode used to preferentially schedule the high priority group regardless of the values of scheduling coefficients. 1 is a mode used to schedule based on the values of scheduling coefficients. |

(The subscript LCG refers to the logical channel group.)

TABLE 2

List of input parameters for the scheduler
(The subscript LCG refers to the logical channel group.)

| No. | Parameter name | Remarks |
|---|---|---|
| 1 | $R_n$ | This parameter indicates an Instantaneous transmittable Data Rate (bits/sub-frame) of UE #n, as described below. This parameter is calculated based on the following equation with reference to the UL_TF_related_table. $R_n = \text{UL\_Table\_TF\_SIZE}(RB\_all, \lfloor SIR_{estimated} \rfloor)$ where RB_all is the number of RBs across the system band. Further, $SIR_{estimated}$ is calculated across the system band. Alternatively, $SIR_{estimated}$ may be the maximum value of plural sets of $SIR_{estimated}$ which are calculated across narrower bands. Alternatively, $SIR_{estimated}$ may be selected, based on the transmission type, from both the value calculated across the system band and the maximum value of plural sets of $SIR_{estimated}$ which are calculated across narrower bands. |
| 2 | $\overline{R}_{n,k}$ | This parameter indicates an Average Data Rate (bits/sub-frame) of a logical channel group #k of UE #n. $\overline{R}_{n,k}(TTI) = \delta_{n,k} * \overline{R}_{n,k}(TTI-1) + (1 - \delta_{n,k}) * r_{n,k}$ $r_{n,k}$: instantaneous data rate As the inital value of $\overline{R}_{n,k}$, $R_{n,k}$ calculated in the sub-frame is used. $\delta_{n,k}$: forgetting coefficient which is a variable changing for each calculation period, as described in Section 4.1.10.1. Calculation of $\overline{R}_{n,k}$ is performed in every sub-frame based on an updating timing (Section 4.1.10.1) with respect to not only a logical channel group with the highest priority level but also any other logical channel groups. |
| 3 | $freq_n$ | This parameter indicates a time-average value of allocation frequency of UE #n. An averaging interval (time) is designated by $\tau$. Namely, $Freq_n = \tau_n * freq_n(TTI-1) + (1 - \tau_{n,k}) * Allocated_n$, where, $Allocated_n$ is set to be 1 when the DL-SCH is allocated to UE #n in the sub-frame where the amount of data in the UL Buffer is not zero (0) for the high priority group or the low priority group of UE #n. Otherwise, $Allocated_n$ is set to be 0. Further, the update is to be performed in each sub-frame when the amount of data in the UL Buffer is not zero (0). Calculation of $freq_n$ is performed with respect to each UE rather then with respect to each logical channel group. |
| 4 | Freq | This parameter indicates a value by averaging $freq_n$ amoung user equipment terminals (UEs). Averaging is performed with respect to only user equipment terminals (UEs) in which the amount of data in the UL Buffer for the high priority group or the low priority group is not zero (0) in the corresponding sub-frame. Namely, it is calculated as follows. |

TABLE 2-continued

List of input parameters for the scheduler
(The subscript LCG refers to the logical channel group.)

| No. | Parameter name | Remarks |
|---|---|---|
| | | $Freq = \dfrac{\sum_{n, Scheduling} freq_n}{\sum_{n, Scheduling} 1}$ where $\sum_{n, Scheduling}^{n, Scheduling}$ denotes the sum ($\Sigma$) with respect to the "user equipment terminals (UEs) in which the amount of data in the UL Buffer for the high priority group or the low priority group is not zero (0) in the corresponding sub-frame". |

Based on the input parameters in Tables 1-1, 1-2, and 2, the scheduling coefficient $C_n$ of the logical channel #h with the highest priority level of the user equipment terminal (UE) #n is calculated according to the following equation (1-1) ([Equation 1]).

[Equation 1]

$$C_n = A_{highest} \times \alpha^{(PL)} \cdot R_n \times \qquad (1\text{-}1)$$
$$\left(1 + \alpha_{highest}^{(No\_allocated)} \cdot F_{highest}(t_{No\_allocated})\right) \times G(flag_{SR}) \times$$
$$\exp\left(\alpha_{highest}^{(freq)} \cdot (Freq - freq_n) + \alpha_{highest}^{(rate)} \cdot (R_{n,highest}^{(target)} - \overline{R}_{n,highest})\right)$$

Namely, when the base station apparatus selects a user equipment terminal to which radio resources are allocated, the base station apparatus may select the user equipment terminal based on a signal (Scheduling request) by means of which the user equipment terminal requests allocation of the Uplink Shared Channel (RBs for the Uplink Shared Channel). In addition, the base station apparatus may calculate a coefficient representing a priority level for allocating radio resources based on at least one of a priority class of data; radio quality of the reference signal transmitted from the user equipment terminal (for example, SIR of the Sounding Reference Signal); a time duration during which the shared channel (RBs for the shared channel) is not allocated; whether the base station apparatus receives the Scheduling request; a frequency of allocation occurrences; an average transmission rate; and a target transmission rate.

Alternatively, the scheduling coefficient $C_n$ of the logical channel #h with the highest priority level of the user equipment terminal (UE) #n may be calculated according to the following equation (1-2) ([Equation 2])

[Equation 2]

$$C_n = A_{highest} \times \alpha^{(PL)} \cdot R_n \times \left(1 + \alpha_{highest}^{(No\_allocated)} \cdot F_{highest}(t_{No\_allocated})\right) \times \qquad (1\text{-}2)$$
$$G(flag_{SR}) \times H(flag_{gap\_contol}) \times$$
$$\exp\left(\alpha_{highest}^{(freq)} \cdot (Freq - freq_n) + \alpha_{highest}^{(rate)} \cdot (R_{n,highest}^{(target)} - \overline{R}_{n,highest})\right)$$

In the equation (1-2), a term of "$H(flag_{gap\_control})$" is added to the equation (1-2). $flag_{gap\_control}$ is a flag indicating whether the user equipment terminal (UE) #n is in a Measurement gap control mode. As used herein, the Measurement gap control mode indicates whether a Measurement gap for measuring a cell with a different frequency is being applied. When the Measurement gap control mode is ON, the Measurement gap is set at a predetermined timing. The Measurement gap is set by the base station apparatus 200.

Generally, in the sub-frame where the Measurement gap is applied, data cannot be transmitted and received. Therefore, it is necessary to allocate radio resources to the user equipment terminal (UE) #n to preferentially transmit and receive data in the sub-frame to which the Measurement gap is not applied. For example, by setting $H(flag_{gap\_control})$ to be 10 ($H(flag_{gap\_control})=10$) in the case of $flag_{gap\_control}=1$ (i.e., Measurement gap control mode: ON) and $H(flag_{gap\_control})$ is set to be 1 ($H(flag_{gap\_control})=1$) in the case of $flag_{gap\_control}=0$ (i.e., Measurement gap control mode: OFF), it may become possible to "preferentially transmit and receive data in the sub-frame to which the Measurement gap is not applied".

By the Measurement Gap Check in step S310, when the Measurement gap control mode is ON and when the time frame in which the Physical Downlink Control Channel for the Uplink Shared Channel is transmitted in downlink is included in the Measurement gap or the time frame in which the shared channel is received or the time frame in which acknowledge information for the Uplink Shared Channel is transmitted is included the Measurement gap, this process in step S332 is not performed. In other words, when the Measurement gap control mode is ON and when this process in step S332 is to be performed, the sub-frame is at the timing when the same (original) frequency signal is transmitted and received in a mode when a cell with a different frequency is being measured. Namely, due to the term "$H(flag_{gap\_control})$", it may become possible to preferentially allocate the shared channel to the user equipment terminal transmitting and receiving the same (original) frequency in a mode when a cell with a different frequency is being measured.

In the case of intra-eNB handover (Intra-eNB HO), measured values and calculated values used for the scheduling process are transferred to a Target eNB (eNB of the handover destination).

4.1.10.1. Measurement of Average Data Rate

In step S332, an Average Data Rate is measured. The Average Data Rate is calculated using the following equation (2) ([Equation 3]).

[Equation 3]

$$\overline{R}_{n,k} = R_{n,k}(N_{n,k}=1)$$

$$\overline{R}_{n,k} = \delta_{n,k} \cdot \overline{R}_{n,k}(TTI-1) + (1-\delta_{n,k}) \cdot r_{n,k}(N_{n,k}>1) \qquad (2)$$

where $N_{n,k}(1, 2, \ldots)$ denotes the number of times updating the Average Data Rate. However, in the sub-frame where $N_{n,k}=0$, the following equation (3) ([Equation 4]) is applied.

[Equation 4]

$$\overline{R}_{n,k} = R_{n,k} \qquad (3)$$

Further, a forgetting coefficient $\delta_{n,k}$ is calculated as follows.

$$\delta_{n,k} = \min(1 - 1/N_{n,k}, \delta'_{PCn,k})$$

An updating cycle of the Average Data Rate is based on "every sub-frame where the amount of data in the UL Buffer is not zero (0) for each logical channel group". Further, $r_{n,k}$ is calculated as "the size of the MAC SDU (including for both initial transmission and retransmission) transmitted from the user equipment terminal (UE)". Namely the calculation of the Average Data Rate is performed based on any of the following operations in the sub-frame when the Average Data Rate is to be updated.

1) For a user equipment terminal (UE) that transmits data, the Average Data Rate is calculated assuming "$r_{n,k}$=size of the transmitted MAC SDU".

2) For a user equipment terminal (UE) that has not transmitted data, the Average Data Rate is calculated assuming "$r_{n,k}$=0".

The size of the retransmitted MAC SDU is calculated retroactively to previous transmissions of the UL-SCH, when the CRC result of the UL-SCH including logical channels belonging to the corresponding logical channel group is OK.

It should be noted that the Average Data Rate is calculated when the result of the Received SIR Check is OK and the condition of updating the Average Data Rate is matched. Namely the calculation is started after at least one Sounding Reference Signal is received across the whole band.

4.1.10.2. Definition of the Amount of Data in UL MAC

The amount of data in the UL Buffer is defined as follows.

The amount of data $Buffer_{n,k}^{(UL)}$ in the UL Buffer for a logical channel group #k of the user equipment terminal (UE) #n is calculated as follows.

[Equation 5]

$$Buffer_{n,k}^{(UL)} = Buffer_{n,k}^{(BSR)} - \sum_{j} Size_{n,k}^{(CRC:OK)}(j) \quad (4)$$

where $Buffer_{n,k}^{(BSR)}$ denotes the amount of data in the buffer for the logical channel group #k of the user equipment terminal (UE) #n, which is calculated based on the Buffer Status Report reported from the user equipment terminal (UE).

$$\sum_{j} Size_{n,k}^{(CR:OK)}(j)$$

denotes the sum of data sizes for the logical channel group #k of the user equipment terminal (UE) #n, which has been included in the UL-SCH where the CRC result is OK since the timing of making the Buffer Status Report (until the current timing).

Namely, the base station apparatus calculates the amount of data in the buffer of the user equipment terminal based on both information about the amount of data in the buffer (Buffer Status Report (BSR)) reported from the user equipment terminal and the amount of data which has been received from the user equipment terminal since the base station apparatus has received the information.

4.1.11. UE Selection

Next, in step S334, $N_{Scheduling}$ indicating the number of user equipment terminals (UEs) for which the scheduling coefficient is calculated is incremented by one. In step S336, a value of "n" indicating the index of the user equipment terminal (UE) is incremented by one.

Next, in step S338, it is determined whether the value of "n" is less than or equal to N. When it is determined that the value of "n" is less than or equal to N, the process goes back to step S304.

On the other hand, when it is determined that the value of "n" is greater than N, the process goes to step S340 in which UE Selection is performed. In this step, the user equipment terminal (UE) to which radio resources are to be allocated according to dynamic scheduling (only for initial transmission) is selected in the corresponding sub-frame.

First, according to the following equation, the number of user equipment terminals (UEs) $N_{UL-SCH}$ to which radio resources are to be allocated according to dynamic scheduling is calculated. $N_{Scheduling}$ denotes the number of user equipment terminals (UEs) for which the scheduling coefficient is calculated (see FIG. 3). $N_{retransmission}$ denotes the number of user equipment terminals (UEs) which perform retransmission in the corresponding sub-frame (see FIG. 3).

$$N_{UL-SCH,tmp} = \min(N_{Scheduling}, N_{ULMAX} - N_{retransmission})$$

Then, the "user equipment terminals (UEs) to which radio resources are to be allocated according to dynamic scheduling" are selected as follows based on the value of the Scheduling priority handling mode.

If the Scheduling priority handling mode=0;

Top $N_{UL-SCH}$ "user equipment terminals (UEs) to which radio resources are to be allocated according to dynamic scheduling" are selected in descending order of the scheduling coefficients calculated in Section 4.1.10 for each logical channel group, by prioritizing the high priority groups. Namely, the user equipment terminals (UEs) are selected according to the following order.

High (1st)→High (2nd)→ . . . →Low (1st)→Low (2nd)→ . . . .

If the Scheduling priority handling mode=1;

Top $N_{UL-SCH}$ "user equipment terminals (UEs) to which radio resources are to be allocated according to dynamic scheduling" are selected in descending order of the scheduling coefficients calculated in Section 4.1.10 regardless of the logical channel group.

As described above, it may become possible to calculate the scheduling coefficient with respect to each user equipment terminal that is determined to be capable of initial transmission, by performing a loop process with respect to "n" which is an index of the user equipment terminals (UE index). Further, the radio resources may be allocated to the user equipment terminal having a greater calculated scheduling coefficient value, and thereby it may become possible to determine the user equipment terminals to which the radio resources (Uplink Shared Channel) are to be allocated based on a priority level of data; uplink radio quality; a time duration during which the shared channel (RBs for the shared channel) is not allocated; whether the base station apparatus receives the Scheduling request; a frequency of allocation occurrences; an average transmission rate; or a target transmission rate.

5. UL TFR Selection

Next, Uplink TFR Selection (UL TFR Selection) performed in step S208 is described with reference to FIG. 4.

Figure 4:
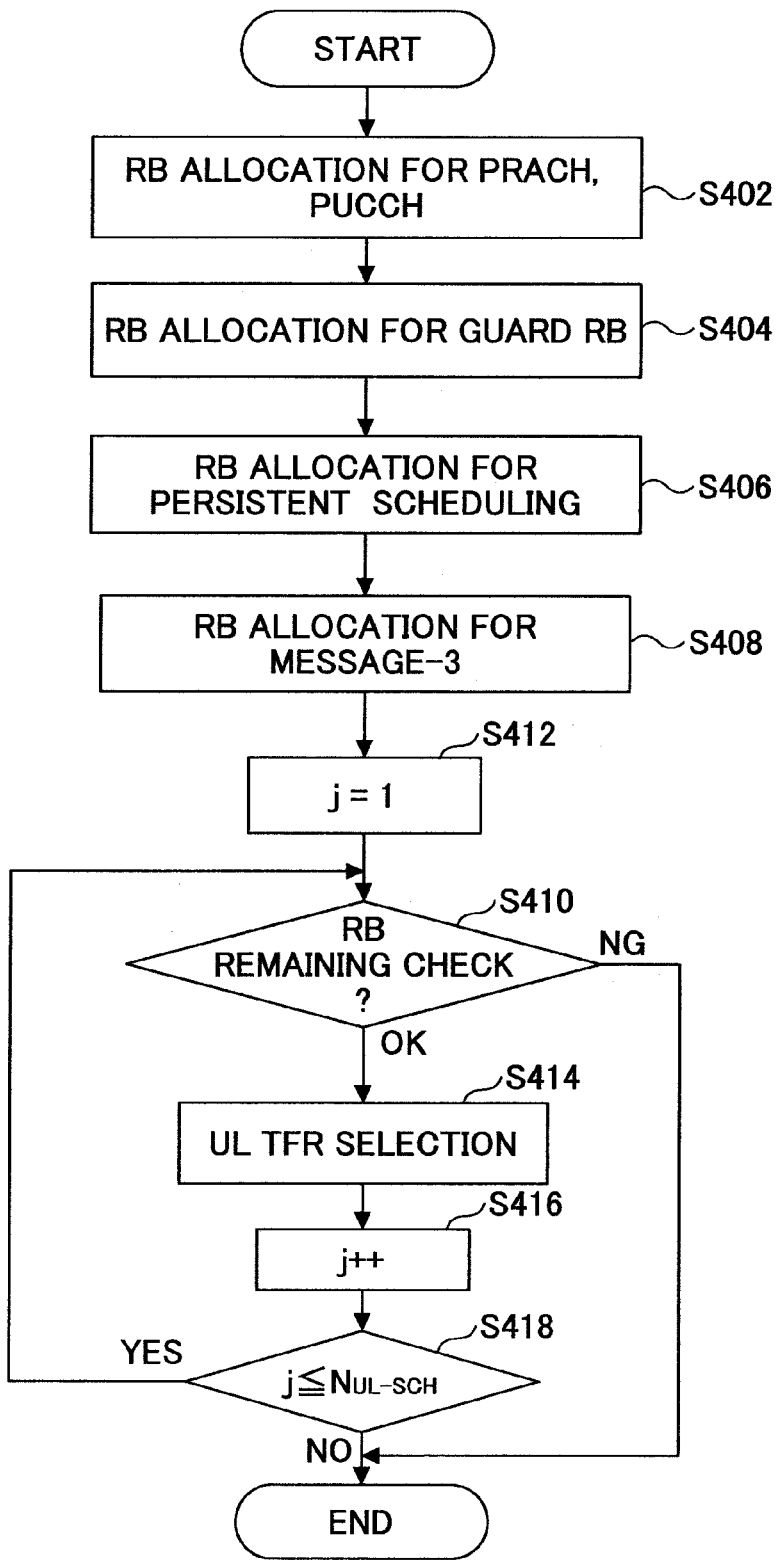
FIG. 4 is a flowchart showing a process of control for a TFR selection according to an embodiment of the present invention.

FIG. 4 shows a procedure of UL TFR Selection. According to this procedure, the base station apparatus 200 reserves radio resources (RBs) for the Physical Random Access Channel (PRACH), reserves prohibited radio resources (RBs) or guard RBs, reserves radio resources (RBs) for the UL-SCH to which persistent scheduling is applied, and then determines a transmission format for the UL-SCH to which dynamic scheduling is applied and allocates radio resources for the UL-SCH to which dynamic scheduling is applied (including for both initial transmission and retransmission).

5.1. RB Allocation for PRACH and PUCCH

In step S402, resource block allocation for the Physical Random Access Channel (PRACH) and the Physical Uplink Control Channel (PUCCH) to be frequency-multiplexed with the Physical Uplink Shared Channel (PUSCH) (RB allocation for PRACH and PUCCH) is performed. In this step, radio resources are allocated to the Random Access Channel (RACH) and the Physical Uplink Control Channel (PUCCH) before radio resources are allocated to the shared channel.

Specifically, when a RACH preamble is transmitted in the corresponding sub-frame, radio resources (RBs) for the PRACH and $N_{RACH}$ RBs on both sides of the PRACH are reserved ($6+2*N_{RACH}$ RBs are reserved in total). In other words, the radio resources (RBs) for the PRACH and $N_{RACH}$ RBs on both sides of the PRACH ($6+2*N_{RACH}$ RBs in total) are excluded from candidates for RBs to be allocated to the UL-SCH to which dynamic scheduling is applied. For example, $N_{RACH}$ is a value designated via the external input interface (I/F). For example, $N_{RACH}$ is selected from 0, 1, 2, and 3.

The PRACH preamble corresponds to a Message-1 in the random access procedure. The number of resource blocks in which the PRACH preamble is transmitted is equal to six (6).

In addition, radio resources (RBs) for the Physical Uplink Control Channel (PUCCH) are reserved. In other words, the radio resources (RBs) to be allocated to the Physical Uplink Control Channel (PUCCH) are excluded from candidates for RBs to be allocated to the UL-SCH to which dynamic scheduling is applied.

5.2. RB Allocation for Guard RBs

In step S404, RB allocation for Guard RBs is performed. When the system is frequency-adjacent (adjacent in the frequency direction) to a heterogeneous radio communication system (WCDMA system), for example, radio resources other than the resource placed at the end of the system bandwidth are allocated.

Specifically, Guard RBs are reserved. In other words, the Guard RBs are excluded from candidates for RBs to be allocated to the UL-SCH to which dynamic scheduling is applied.

In this example, the heterogeneous radio communication system is the WCDMA system. Alternatively, the heterogeneous radio communication system may be a GSM system, a CDMA-2000 system, a PHS system, or the like.

The Guard RBs are implemented as guard bands for the purpose of reducing adjacent channel interference with a frequency-adjacent system. Two sets of Guard RBs may be reserved for both ends of adjacent systems. It should be noted that the Physical Uplink Control Channel (PUCCH) is mapped to the end of the system band regardless of the presence or absence of the Guard RBs.

5.3. RB Allocation for Persistent Scheduling

In step S406, RB allocation for Persistent Scheduling is performed. In this step, allocation according to persistent scheduling is performed before allocation according to dynamic scheduling is performed.

Specifically, radio resources (RBs) for the persistent resources, which are reserved in Section 4.1.7.3, are reserved.

When persistent resources are allocated in the corresponding sub-frame to the "user equipment terminal (UE) to which radio resources are to be allocated according to dynamic scheduling (only for initial transmission)", the persistent resources are released. The RBs corresponding to the persistent resources are used for UL TFR Selection for the UL-SCH to which dynamic scheduling is applied. Please refer to Section 4.1.2 for the process where persistent resources are allocated to the user equipment terminal (UE) for retransmission.

The base station apparatus may perform the following three processes, in order to handle collisions from plural user equipment terminals (UEs) via the PUSCH due to either "miss detection of the UL Scheduling Grant via the Physical Downlink Control Channel" or "false detection of acknowledgement information (UL ACK/NACK) for the Uplink Shared Channel (False ACK (NACK→ACK) detection)" by the user equipment terminal (UE).

(1) In the case where radio resources (RBs) for dynamic scheduling which are allocated to the "user equipment terminal (UE) to which radio resources are allocated according to dynamic scheduling (including for both initial transmission and retransmission) and persistent resources are also allocated" include all of the RBs corresponding to the radio resources (RBs) for the persistent resources;

First, the base station apparatus performs reception of the UL-SCH from the user equipment terminal (UE) according to dynamic scheduling at the reception timing. Then, when the CRC result is NG, the base station apparatus performs reception of the UL-SCH according to persistent scheduling.

(2) In the case where radio resources (RBs) for dynamic scheduling which are allocated to the "user equipment terminal (UE) to which radio resources are allocated according to dynamic scheduling and persistent resources are also allocated" include none of the RBs corresponding to the radio resources (RBs) corresponding to the persistent resources;

First, the base station apparatus performs reception of the UL-SCH from the user equipment terminal (UE) according to dynamic scheduling at the reception timing. Then, when the result of the power detection is DTX (when no transmission of the UL-SCH is detected), the base station apparatus performs reception of the UL-SCH according to persistent scheduling.

When the radio resources (RBs) for persistent scheduling are found to collide with "radio resources (RBs) which are allocated to other user equipment terminals (UEs) according to dynamic scheduling" and when the CRC result for the "radio resources (RBs) which are allocated to other user equipment terminals (UEs) according to dynamic scheduling" is NG, the base station apparatus transmits the ACK for the "UL-SCH according to persistent scheduling" to the user equipment terminal (UE) regardless of the CRC result.

(3) In the case other than (1) and (2);

First, the base station apparatus performs reception of the UL-SCH according to dynamic scheduling at the reception timing. Then, the base station apparatus performs power detection using only RBs which do not overlap the radio resources (RBs) corresponding to the persistent resources. When the result of the power detection is DTX (when no transmission of the UL-SCH is detected), the base station apparatus performs reception of the UL-SCH according to persistent scheduling.

When the radio resources (RBs) for persistent scheduling are found to collide with "radio resources (RBs) which are allocated to other user equipment terminals (UEs) according to dynamic scheduling" and when the CRC result for the "radio resources (RBs) which are allocated to other user equipment terminals (UEs) according to dynamic scheduling" is NG, the base station apparatus transmits the ACK for the "UL-SCH according to persistent scheduling" to the user equipment terminal (UE) regardless of the CRC result.

5.4. Resource Block Allocation for the Message-3 in the Random Access Procedure (RB Allocation for Message-3 (RACH))

In step S408, resource block allocation for the Message-3 in the random access procedure (RB allocation for Message-3 (RACH)) is performed. In this step, radio resources are allocated to the Message-3(s) in the random access procedure before radio resources are allocated to the shared channel.

Radio resources (RBs) for the Message-3s in the random access procedure are reserved. Specifically, radio resources (RBs) for the Message-3s in the random access procedure (including for both initial transmission and retransmission) are excluded from candidates for RBs to be allocated to the UL-SCH to which dynamic scheduling is applied.

In the following descriptions, the Message-3s in the random access procedure are merely referred to as Message-3s.

The RB allocation for the Message-3s for initial transmission is performed according to the following five-step procedure. The RB allocation for retransmission is the same as the RB allocation for initial transmission.

(1) It is determined whether there are available RBs to be allocated to the Message-3s. When there are available RBs to be allocated to the Message-3s, next step (2) is performed. Otherwise, this process comes to an end. The "available RBs to be allocated to the Message-3s" correspond to RBs other than the RBs allocated to the Physical Random Access Channel (PRACH) and the Physical Uplink Control Channel (PUCCH), the Guard RBs, and the RBs allocated to the UL-SCH to which persistent scheduling is applied.

(2) Message-3s to be transmitted in the corresponding sub-frame are arranged in ascending order of quality. The order of plural Message-3s with the same quality is arbitrarily determined. The Message-3 with lowest quality is indexed as #0, and thereby the Message-3s are indexed as #0, #1, #2, #3, . . . .

(3) The following process is performed according to a Hopping mode.

The Hopping mode is a parameter designated via the external input interface (I/F).

If the Hopping mode is zero (Hopping mode==0), the base station apparatus generates Message-3 sets, each of which includes a pair of two Message-3s selected on a two-by-two basis from the beginning of Message-3s in the order of #0, #1, #2, #3, . . . . The Message-3 sets are indexed as #a, #b, #c, . . . (the Message-3 set #a includes the Message-3s #0 and #1, the Message-3 set #b includes the Message-3s #2 and #3, and so on). When the number of Message-3s is odd-numbered, the last Message-3 constitutes one Message-3 set.

The base station apparatus allocates "RBs which have reflective symmetry at the center of the system band" to the Message 3 sets in the order of #a, #b, #c, . . . . Specifically, the base station apparatus allocates RBs to the Message-3 sets in the order of #a, #b, #c, . . . beginning from the ends of the system band. The number of RBs allocated to the Message-3s is determined based on quality information. For example, when the quality information indicates "high quality", two RBs are allocated. For example, when the quality information indicates "low quality", four RBs are allocated. Alternatively, the number of RBs may be determined regardless of quality information. For example, this quality information is included in the Message-1 in the random access procedure.

When the number of RBs in one Message-3 in a particular Message-3 set is different from the number of RBs in the other Message-3 in the particular Message-3 set, the base station apparatus uses a larger number of RBs to allocate the "RBs which have reflective symmetry at the center of the system band".

The base station apparatus 200 may notify the user equipment terminal that the Message-3s are transmitted with hopping, as information included in the Uplink Scheduling Grant to be mapped to the Physical Downlink Control Channel (PDCCH), for example.

The base station apparatus does not allocate RBs which are placed outside the RBs allocated to the Message-3s to the UL-SCH to which dynamic scheduling is applied. In addition, when the number of Message-3s is odd-numbered, the base station apparatus does not allocate the RBs used for transmitting the last Message-3 to the UL-SCH to which dynamic scheduling is applied.

Otherwise (if the Hopping mode is not zero), the base station apparatus allocates RBs to Message-3s as follows. The number of RBs allocated to the Message-3s is determined based on quality information. For example, when the quality information indicates "high quality", two RBs are allocated. For example, when the quality information indicates "low quality", four RBs are allocated. Alternatively, the number of RBs may be determined regardless of quality information. For example, this quality information is included in the Message-1 in the random access procedure.

0: #0 is allocated to the RB with the lowest frequency among available RBs to be allocated to the Message-3s;

1: #1 is allocated to the RB with the highest frequency among available RBs to be allocated to the Message-3s;

2: #2 is allocated to the RB with the next lowest frequency among available RBs to be allocated to the Message-3s;

3: #3 is allocated to the RB with the next highest frequency among available RBs to be allocated to the Message-3s; and so on.

(This process continues until RBs are allocated to all the Message-3s.)

(4) The modulation scheme for all the Message-3s is determined as QPSK.

(5) Transmission power of the Uplink Scheduling Grant for each Message-3 is determined based on quality information. For example, when the quality information indicates "high quality", transmission power is determined as low transmission power. For example, when the quality information indicates "low quality", transmission power is determined as high transmission power. Alternatively, transmission power may be determined regardless of quality information. For example, this quality information is included in the Message-1 in the random access procedure.

When no more RBs can be allocated to the Message-3s during this process, the process comes to an end. The base station apparatus does not transmit a Message-2 (RACH response) in the random access procedure to the user equipment terminal (UE) which has the Message-3 to which no RB is allocated. Alternatively, the base station apparatus may transmit the Message-2 (RACH response) in the random access procedure in the next sub-frame.

In step S412, the value of "j" is set equal to 1 (j=1).

5.5. RB Remaining Check

In step S410, RB Remaining Check is performed. It is determined whether there are available RBs to be allocated to the UL-SCH to which dynamic scheduling is applied. When there are available RBs to be allocated to the UL-SCH, the process of the RB Remaining Check returns OK. Otherwise, the process of the RB Remaining Check returns NG (failed). When the result of the RB Remaining Check is determined as NG, the process of the UL TFR Selection comes to an end.

The "available RBs to be allocated to the UL-SCH to which dynamic scheduling is applied" correspond to RBs other than the RBs allocated to the Physical Random Access Channel (PRACH) and the Physical Uplink Control Channel (PUCCH), the Guard RBs, the RBs allocated to the UL-SCH to which persistent scheduling is applied, the RBs allocated to the Message-3 in the random access procedure, and the RBs allocated to the UL-SCH to which dynamic scheduling is applied after TFR Selection (including for both retransmission and initial transmission). The total number of "available RBs to be allocated to the UL-SCH to which dynamic scheduling is applied (including for both retransmission and transmission" is defined as $N_{remain}^{(RB)}$.

The RBs allocated to the UL-SCH to which dynamic scheduling is applied after TFR Selection (including for both retransmission and initial transmission) correspond to the RBs determined in step S414, when the value of "j" is less than the current value in the loop process with respect to the index "j" composed of steps S410, S414, S416, and S418.

5.6. UL TFR Selection

In step S414, UL TFR Selection is performed. The base station apparatus determines the transport format for the "user equipment terminal (UE) to which radio resources are to be allocated according to dynamic scheduling", which is determined in Section 3.2, and allocates RBs.

5.6.1. Setting of RB Allocation Mode

In step S414, Setting of RB allocation mode is performed. The UL RB allocation mode shown in Table 3 is a parameter designated via the external input interface (I/F). The loop process with respect to the index "j" is executed based on the selection order of user equipment terminals (UEs) specified by the UL RB allocation mode.

TABLE 3

| UL RB allocation mode | |
|---|---|
| Mode | Definition |
| Mode-0 | This is a normal RB allocation mode. In this mode, the following selection order of user equipment terminals (UEs) is used. (1st criterion) |
| | User equipment terminals (UEs) for retransmission are selected. Among these user equipment terminals (UEs), a higher selection order is assigned to a user equipment terminal (UE) with a longer elapsed time from initial transmission. When the elapsed time is the same for plural user equipment terminals (UEs), the selection order is arbitrary determined. (2nd criterion) |
| | User equipment terminals for initial transmission are selected. Among these user equipment terminals (UEs), a higher selection order is assigned to the "candidates for the user equipment terminals (UEs) to which radio resources are to be allocated according to dynamic scheduling" determined in Section 4.1.11. |
| Mode-1 | This is a RB allocation mode in which RBs at the end of the system band are allocated to user equipment terminals with low path loss (Pathloss). (1st criterion) |
| | User equipment terminals for retransmission are selected. Among these user equipment terminals (UEs), a higher selection order is assigned to a user equipment terminal (UE) with lower path loss. (2nd criterion) |
| | User equipment terminals for initial transmission are selected. Among these user equipment terminals (UEs), a higher selection order is assigned to a user equipment terminal (UE) with lower path loss. |

TABLE 3-continued

| UL RB allocation mode | |
|---|---|
| Mode | Definition |
| Mode-2 | This is a RB allocation mode in which RBs with a low frequency are allocated to user equipment terminals with high path loss (Pathloss). (1st criterion) |
| | User equipment terminals for retransmission are selected. Among these user equipment terminals (UEs), a higher selection order is assigned to a user equipment terminal (UE) with higher path loss. (2nd criterion) |
| | User equipment terminals for initial transmission are selected. Among these user equipment terminals (UEs), a higher selection order is assigned to a user equipment terminal (UE) with higher path loss. |
| Mode-3 | This is a RB allocation mode in which RBs with high frequency are allocated to user equipment terminals with high path loss (Pathloss). (1st criterion) |
| | User equipment terminals for retransmission are selected. Among these user equipment terminals (UEs), a higher selection order is assigned to a user equipment terminal (UE) with higher path loss. (2nd criterion) |
| | User equipment terminals for initial transmission are selected. Among these user equipment terminals (UEs), a higher selection order is assigned to a user equipment terminal (UE) with higher path loss. |

For example, when the system is frequency-adjacent to a WCDMA system at one end and to an LTE system at the other end, Mode-2 and Mode-3 are selected. Specifically, when the system is frequency-adjacent to the WCDMA system at one end and to the LTE system at the other end, the base station apparatus allocates radio resources (frequency resources) for the shared channel, on the side of the WCDMA system and at the end of the system band, to a user equipment terminal with lower path loss. In addition, the base station apparatus allocates radio resources (frequency resources), on the side of the LTE system and at the end of the system band, to a user equipment terminal with higher path loss.

For example, when the system is frequency-adjacent to WCDMA systems at both ends, Mode-1 is selected. Specifically, the base station apparatus allocates radio resources (frequency resources) for the shared channel, at both ends of the system band, to a user equipment terminal with lower path loss. In addition, the base station apparatus allocates radio resources (frequency resources), at the center of the system band, to a user equipment terminal with higher path loss.

For example, when the system is frequency-adjacent to LTE systems at both ends, Mode-0 is selected. Specifically, radio resources (frequency resources) are allocated based on reception power of the reference signal transmitted from the user equipment terminal or the like, as described below.

5.6.2. RB Allocation

In step S414, RB allocation is performed. According to the following process, RBs are allocated to a $j^{th}$ "user equipment terminal (UE) to which radio resources are to be allocated according to dynamic scheduling". FIG. 5 shows an example of a TF_Related_table.

As shown in FIG. 5, the TF_Related_table may store the correspondence between radio resources available for transmission of the Uplink Shared Channel, uplink radio quality information, and a transmission scheme used for transmission of the Uplink Shared Channel. The base station apparatus may determine the transmission scheme used for the Uplink Shared Channel, with reference to the TF_related_table, based on radio quality of the Sounding Reference Signal transmitted from the user equipment terminal (radio quality information calculated based on SIR, for example) and radio resources available for transmission of the Uplink Shared Channel. In addition, the RF_Related_table may store the data size used for the Uplink Shared Channel. The data size is determined to be a maximum value which satisfies a predetermined error rate, when uplink radio quality information and frequency resources available for the shared channel are fixed. The TF_Related_table may store, as the transmission scheme, the data size used for transmission of the Uplink Shared Channel, a modulation scheme used for the Uplink Shared Channel, and the amount of frequency resources used for the Uplink Shared Channel.

<Process>
(Process of Calculating Temporary RBs)
$N_{remain}^{(RB)}$: the number of Remaining RBs
$N_{capability}$: the maximum number of RBs which is determined based on the UE category
$N_{max,bit}$: the maximum data size (payload size) which is determined based on the UE category $$N_{remain}^{(UE)} = N_{UL-SCH} - j + 1$$

[Equation 6]

$$N_{allocated} = \min\left(\left\lceil \frac{N_{remain}^{(RB)}}{N_{remain}^{(UE)}} \right\rceil, N_{capability}\right) \quad (5)$$

It is assumed that available RBs to be allocated to the $j^{th}$ "user equipment terminal (UE) to which radio resources are to be allocated according to dynamic scheduling" are continuous. When the RBs are not continuous, the "available RBs to be allocated" are determined as a set of RBs which has the maximum number of available RBs to be allocated among continuous available RBs to be allocated. When there are plural sets of RBs which have the maximum number of available RBs to be allocated, the "RBs to be allocated" are determined as a set of RBs with a lower frequency.

When the number of subcarriers corresponding to $N_{allocated}$ includes factors other than 2, 3, and 5, $N_{allocated}$ is determined as a maximum integer among integers which include only factors of 2, 3, 5 for the number of subcarriers and which are less than $N_{allocated}$.

(1) If the UL RB allocation mode==Mode-0 and UL Transmission type==High Fd;

RBs are allocated to the user equipment terminal (UE) among the "available RBs to be allocated to the UL-SCH to which dynamic scheduling (hereinafter called "available RBs to be allocated")", which are determined in Section 5.5, beginning from the lowest frequency or the highest frequency until the number of RBs to be allocated to the user equipment terminal (UE) is greater than or equal to $N_{allocated}$. In this case, hopping is not used.

<For Initial Transmission>
Upon determining whether RBs are allocated beginning from the lowest frequency or the highest frequency, the base station apparatus selects RBs far from the center of the system band. When RBs have the same distance from the center of the system band, the base station apparatus allocates RBs beginning from the lowest frequency.

<For Retransmission>
Upon determining whether RBs are allocated beginning from the lowest frequency or the highest frequency, the base station apparatus determines as follows based on whether the RBs include the previously allocated RBs.

$N_{small}$ denotes the number of the previously allocated RBs, which are included in a set of RBs when the RBs are allocated beginning from the lowest frequency.

$N_{large}$ denotes the number of the previously allocated RBs, which are included in a set of RBs when the RBs are allocated beginning from the highest frequency.

If $N_{small} > N_{large}$, RBs are allocated beginning from the highest frequency.

If $N_{small} \leq N_{large}$, RBs are allocated beginning from the lowest frequency.

For example, when the base station apparatus allocates frequency resources (RBs) to the shared channel used by plural user equipment terminals, beginning from the end of the system bandwidth, the base station apparatus may allocate, to the shared channel used by the plural user equipment terminals, frequency resources (RBs) for retransmission at one end of the system bandwidth which are different from the frequency resources (RBs) used for previous transmission at the other end of the system bandwidth.

(2) If the UL RB allocation mode==Mode-0 and UL Transmission type==Low Fd;

RBs are allocated to the user equipment terminal (UE) among the "available RBs to be allocated to the UL-SCH to which dynamic scheduling is applied (hereinafter called "available RBs to be allocated")", which are determined in Section 5.5, beginning from the lowest frequency or the highest frequency until the number of RBs to be allocated to the user equipment terminal (UE) is greater than or equal to $N_{allocated}$. In this case, hopping is not used.

Upon determining whether RBs are allocated beginning from the lowest frequency or the highest frequency, the base station apparatus selects RBs as follows.

If $SIR_{estimated}$ in the case where RBs are allocated beginning from the lowest frequency is higher than $SIR_{estimated}$ in the case where RBs are allocated beginning from the highest frequency, RBs are allocated beginning from the lowest frequency.

If $SIR_{estimated}$ in the case where RBs are allocated beginning from the lowest frequency is lower than or equal to $SIR_{estimated}$ in the case where RBs are allocated beginning from the highest frequency, RBs are allocated beginning from the highest frequency.

For example, when the base station apparatus allocates frequency resources (RBs) to the shared channel used by plural user equipment terminals, beginning from the end of the system bandwidth, the base station apparatus may allocate, to the shared channel used by the plural user equipment terminals, a frequency resource (RB) with higher radio quality among frequency resources (RBs) at both ends of the system bandwidth.

This process is used for both initial transmission and retransmission.

(3) If the UL RB allocation mode==Mode-1;

RBs are allocated to the user equipment terminal (UE) among the "available RBs to be allocated to the UL-SCH to which dynamic scheduling is applied (hereinafter called "available RBs to be allocated")", which are determined in Section 5.5, beginning from the lowest frequency or the highest frequency until the number of RBs to be allocated to the user equipment terminal (UE) is greater than or equal to $N_{allocated}$. In this case, hopping is not used.

Upon determining whether RBs are allocated beginning from the lowest frequency or the highest frequency, the base station apparatus selects RBs far from the center of the system band. When RBs have the same distance from the center of the system band, the base station apparatus allocates RBs beginning from the lowest frequency.

(4) If the UL RB allocation mode==Mode-2;

RBs are allocated to the user equipment terminal (UE) among the "available RBs to be allocated to the UL-SCH to which dynamic scheduling is applied (hereinafter called "available RBs to be allocated")", which are determined in Section 5.5, beginning from the lowest frequency until the number of RBs to be allocated to the user equipment terminal (UE) is greater than or equal to $N_{allocated}$. In this case, hopping is not used.

(5) If the UL RB allocation mode is anything other than Mode-0, Mode-1, and Mode-2;

RBs are allocated to the user equipment terminal (UE) among the "available RBs to be allocated to the UL-SCH to which dynamic scheduling is applied (hereinafter called "available RBs to be allocated")", which are determined in Section 5.5, beginning from the highest frequency until the number of RBs to be allocated to the user equipment terminal (UE) is greater than or equal to $N_{allocated}$. In this case, hopping is not used.

In this process, a set of RBs "to be allocated to the user equipment terminals (UE)" is called a Temporary RB group. $SIR_{i,estimated}^{(RB)}$ in the Temporary RB group is defined as $SIR_{estimated}$.

When the user equipment terminal performs retransmission of the UL-SCH and when the Uplink Scheduling Grant for retransmission is not specified, this process is not performed. Instead, the base station apparatus allocates, to the UL-SCH for retransmission, the same RBs as the RBs used for the previous transmission.

[Calculation for $SIR_{estimated}$]

$SIR_{estimated}$ is calculated as follows.

(1) Radio quality information of the shared channel is calculated based on radio quality of the uplink reference signal, a target reception level of the shared channel, and an uplink interference level.

(2) A first offset process is performed for radio quality information of the shared channel based on the decoding result of the Uplink Shared Channel and the required uplink quality.

(3) A second offset process is performed for radio quality information of the shared channel based on the priority level determined by the data type. Radio quality information of the shared channel after the first offset process and the second offset process corresponds to $SIR_{estimated}$.

Specifically, the base station apparatus (eNB) calculates a transmission power offset value $\Delta_{i,data}^{(eNB)}$ for the PUSCH relative to the Sounding RS, according to the following equation ($\Delta_{i,data}^{(eNB)}$ is a offset value in terms of a power value per one RB). UPH (UE Power Headroom) of UE #i is defined as $UPH_i$, the transmission bandwidth of the Sounding Reference Signal is defined as $B_{i,ref}$ and the transmission bandwidth of the PUSCH is defined as $B_{i,data}$.

The term of min (,) in the equation (6) ([Equation 7]) is applied when $B_{i,ref}$=1 (RB) (180 kHz).

[Equation 7]

$$\Delta_{i,data}^{(eNB)} = \min\left(Target_{i,RoT} - SRSP_i, UPH_i + 10 \cdot \log_{10}\left(\frac{B_{i,ref}}{B_{i,data}}\right)\right) \quad (6)$$

where $SRSP_i$ denotes the reception level of the Sounding Reference Signal. Further, $B_{i,ref}$ denotes the bandwidth in which the Sounding Reference Signal is transmitted, and $B_{i,data}$ denotes the bandwidth in which the PUSCH is transmitted. $B_{i,data}$ corresponds to the bandwidth for the Temporary RB group. $Target_{i,RoT}$ is calculated based on Pathloss and Table 4. As $Pathloss_i$, a value calculated based on the UPH may be used. Alternatively, as $Pathloss_i$, a value of Pathloss reported as the Measurement report by the user equipment terminal (UE) may be used. When the value calculated based on the UPH is used as $Pathloss_i$, $Pathloss_i$ is calculated according to the following equation.

Pathloss=$P_{max}$−UPH−SRSP(in dB)(in consideration of the band)

where $P_{max}$ denotes rated power (24 dBm) of the user equipment terminal (UE).

UPH=(rated power of UE)−(transmission power of the Sounding Reference Signal)

This equation is calculated in the units of dB.

TABLE 4

Relationship between $Target_{RoT}$ and Pathloss

| $Target_{RoT}$ (dB) | Pathloss (dB) |
|---|---|
| $Y_0$ | 0~$X_1$ |
| $Y_1$ | $X_1$~$X_2$ |
| $Y_2$ | $X_2$~$X_3$ |
| $Y_3$ | $X_3$~$X_4$ |
| $Y_4$ | $X_4$~$X_5$ |
| $Y_5$ | $X_5$~$X_6$ |
| $Y_6$ | $X_6$~$X_7$ |
| $Y_7$ | $X_7$~ |

Next, the base station apparatus (eNB) calculates the estimated SIR ($SIR_{i,estimated}$) of the UL-SCH according to the following equation (7) ([Equation 8]).

[Equation 8]

$$SIR_{i,estimated} = SRSP_i + \Delta_{i,data}^{(eNB)} - \text{Interference} \quad (7)$$

where $SRSP_i$ denotes the reception level of the Sounding Reference Signal. "Interference" corresponds to the uplink interference level.

In addition, the base station apparatus (eNB) adjusts the value of $SIR_{i,estimated}$ based on the following equation (8) ([Equation 9]), when the function for adjusting $SIR_{estimated}$ is "On". The calculation of $SIR\_offset_i$ will be described below.

[Equation 9]

$$SIR_{i,estimated} = SIR_{i,estimated} + SIR\_offset_i \quad (8)$$

Transmission power information $\Delta_{data}$ to be reported to the user equipment terminal (UE) by means of the UL Scheduling Grant via the Physical Downlink Control Channel is calculated as follows. This transmission power information $\Delta_{data}$ corresponds to the power offset for the PUSCH relative to the Sounding Reference Signal.

[Equation 10]

-continued $$\Delta_{data} = \Delta_{data}^{(eNB)} + 10 \cdot \log10\left(\frac{B_{data}}{B_{ref}}\right) \quad (9)$$

[Process Performed in the Long Interval]

SIR_offset$_i$ is adjusted in an outer-loop manner based on the CRC result of the UL-SCH for the user equipment terminal (UE) #i, according to the following equation. SIR_offset$_i$ is adjusted in the outer-loop manner based on the CRC result of the UL-SCH in which the priority level of the logical channel group with the highest priority level is $Z_{i,adjust}$ (equation (10) ([Equation 11])). When the priority level of the logical channel group with the highest priority level is different from $Z_{i,adjust}$, SIR_offset$_i$ is not adjusted in the outer-loop manner.

Since the base station apparatus (eNB) cannot identify the logical channel included in the MAC PDU until the CRC result is OK, the priority level of the logical channel group with the highest priority level determined in Section 4.1.10 (Scheduling Coefficient Calculation) is used as the "priority level of the logical channel group with the highest priority level" in this process.

SIR_offset$_i$ is adjusted for each user equipment terminal (UE). The priority level $Z_{i,adjust}$ in this process is adjusted via the MT (maintenance tool or external interface) for each user equipment terminal (UE).

It should be noted that $\Delta_{adj}^{(P)}$ and $BLER_{target}^{(P)}$ can be designated via the external input interface (I/F). The maximum value of SIR_offset$_i$ is defined as SIR_offset$_p^{(max)}$ and the minimum value of SIR_offset$_i$ is defined as SIR_offset$_p^{(min)}$. When SIR_offset$_i$ is continuously determined as the maximum value or the minimum value, the following calculation is not performed.

[Equation 11]

$$\text{SIR\_offset}_i = \begin{cases} \text{SIR\_offset}_i + \Delta_{adj}^{(Pz)} \times BLER_{target}^{(Pz)} & \text{Input} = \text{"Ack"} \\ \text{SIR\_offset}_i - \Delta_{adj}^{(Pz)} \times (1 - BLER_{target}^{(Pz)}) & \text{Input} = \text{"Nack"} \\ \text{SIR\_offset}_i & \text{Input} = \text{"DTX"} \end{cases} \quad (10)$$

[Process of Determining RBs, the Data Size, and the Modulation Scheme]

(1) In the case where the user equipment terminal (UE) transmits the UL-SCH for initial transmission in the corresponding sub-frame;

(Correction Process of the Allocation Bandwidth Based on UPH)

The bandwidth for the Temporary RB group is defined as $B_{i,data,tmp}$.

If Target$_{i,RoT}$−SRSP$_i$>UPH$_i$+10*log$_{10}$ ($B_{i,ref}$/$B_{i,data,tmp}$), then it is assumed as follows.

[Equation 12]

$$B_{i,data} = \frac{B_{i,ref}}{10^{\frac{\text{Target}_{i,RoT}-SRSP_i-UPH_i}{10}}}$$

Also, the number of RBs included in $B_{i,data}$ is defined as the number of RBs Num$_{RB}$ to be allocated. Then, RBs in the Temporary RB group are removed, such that the number of RBs to be allocated to the user equipment terminal (UE) is not less than Num$_{RB}$, and the number of subcarriers includes only factors of 2, 3, and 5.

Upon allocation of the Temporary RB group, when RBs are allocated beginning from the highest frequency, RBs are removed beginning from the lowest frequency. On the other hand, when RBs are allocated beginning from the lowest frequency, RBs are removed beginning from the highest frequency.

Namely, when transmission power of the user equipment terminal (UE Power Headroom reported from the user equipment terminal) is less than a predetermined threshold, frequency resources to be allocated to the shared channel are decreased.

If Target$_{i,RoT}$−SRSP$_i$=<UPH$_i$+10*log$_{10}$ ($B_{i,ref}$/$B_{i,data,tmp}$), then it is assumed as follows.

Num$_{RB}$=$N_{allocated}$ (Offset Process Based on the Priority Level of the Logical Channel Group)

The SIR (SIR$_{estimated}^{(RB)}$) is adjusted by the offset based on the priority level of the logical channel group with the highest priority level. $\Delta_{LCG}$ is designated via the external interface (I/F). The subscript LCG refers to the logical channel group.

$$SIR_{estimated}^{(RB)} = SIR_{estimated}^{(RB)} - \Delta_{LCG}$$

(Calculation for Transport Format)

With reference to the UL_TF_related_table using the number of RBs (RB_available) in the Temporary RB group and SIR$_{estimated}^{(RB)}$ as arguments, a MAC PDU size (hereinafter described as Size) and a modulation scheme (hereinafter described as Modulation) are determined.

Size=UL_Table_TF_SIZE (RB_available, SIR$_{estimated}^{(RB)}$)

Modulation=UL_Table_TF_Mod (RB_available, SIR$_{estimated}^{(RB)}$)

If Size>$N_{max,bit}$, then the value of SIR$_{estimated}^{(RB)}$ is decremented by 1 (dB) until Size=<$N_{max,bit}$. (A smaller SIR is referred in the UL_TF_related_table. In this case, the value of RB_available is fixed.) After Size is determined, Modulation is adjusted to the corresponding value in the UL_TF_related_table.

Next, the number of RBs to be allocated to the user equipment terminal (UE) is recalculated based on the comparison between the amount of data in the UL Buffer and the Size. Please refer to Section 4.1.10.2 for the amount of data in the UL Buffer. $\alpha_{ULTFRS}$ is a coefficient designated via the external interface (I/F). For example, $\alpha_{ULTFRS}$ is set to be 1.0 or 2.0.

When the base station apparatus receives from the user equipment terminal (UE) "allocation request for the PUSCH: REQUESTING" by means of the Scheduling request and uplink resources (PUSCH) have not been allocated to the user equipment terminal (UE) since the base station apparatus has received the Scheduling request, the following process "in the case of Size=<$\alpha_{ULTFRS}$*(Buffer$_{j,h}^{(UL)}$+Buffer$_{j,l}^{(UL)}$)" is performed.

<In the Case of Size=<$\alpha_{ULTFRS}$*(Buffer$_{j,h}^{(UL)}$+Buffer$_{j,l}^{(UL)}$)>

The base station apparatus determines that there are enough data in the UE buffer and all the RBs in the Temporary RB group are to be allocated to the user equipment terminal (UE).

<In the Case of Size>$\alpha_{ULTFRS}$*(Buffer$_{j,h}^{(UL)}$+Buffer$_{j,l}^{(UL)}$)>

The base station apparatus determines that there are not enough data in the UE buffer and the number of RBs Num$_{RB}$ to be allocated is recalculated with reference to the UL_T-F_related_table using $\alpha_{ULTFRS}*(Buffer_{j,h}^{(UL)}+Buffer_{j,l}^{(UL)})$ (hereinafter described as $Size_{buffer}$) and $SIR_{estimated}^{(RB)}$ as arguments.

$Num_{RB}=UL\_Table\_TF\_RB\ (Size_{buffer}, SIR_{estimated}^{(RB)})$
$Size=UL\_Table\_TF\_SIZE\ (Num_{RB}, SIR_{estimated}^{(RB)})$
$Modulation=UL\_Table\_TF\_Mod\ (Num_{RB}, SIR_{estimated}^{(RB)})$ When the number of subcarriers corresponding to $Num_{RB}$ includes factors other than 2, 3, and 5, $Num_{RB}$ is determined as a minimum integer among integers which include only factors of 2, 3, and 5 for the number of subcarriers and which are greater than $Num_{RB}$.

RBs in the Temporary RB group are removed, such that the number of RBs to be allocated to the user equipment terminal (UE) is not less than $Num_{RB}$. Upon allocation of the Temporary RB group, when RBs are allocated beginning from the highest frequency, RBs are removed beginning from the lowest frequency. On the other hand, when RBs are allocated beginning from the lowest frequency, RBs are removed beginning from the highest frequency.

Namely, when the amount of data in the buffer of the user equipment terminal is less than the data size determined as the transmission scheme, the amount of frequency resources (the number of RBs) determined as the transmission scheme is decreased.

(2) In the case where the user equipment terminal transmits the UL-SCH for retransmission in the corresponding sub-frame;

Transmission power information $\Delta_{data}$ to be reported to the user equipment terminal (UE) is adjusted based on the following equation, when the Uplink Scheduling Grant is specified via the Physical Uplink Control Channel for retransmission. $\Delta_{data}^{(eNB)}$ and $10*\log_{10}(B_{data}/B_{ref})$ are calculated at the retransmission timing. An offset value $\Delta_{LCG}^{(HARQ)}$ is designated via the external interface (I/F) for each logical channel group.

[Equation 13]

$$\Delta_{data} = \Delta_{data}^{(eNB)} + 10 \cdot \log_{10}\left(\frac{B_{data}}{B_{ref}}\right) + \Delta_{LCG}^{(HARQ)}$$

Namely, the base station apparatus calculates transmission power of the shared channel based on the reception level of the uplink reference signal and the target reception level of the shared channel, and then performs the offset process for transmission power of the shared channel based on whether data are to be initially transmitted or to be retransmitted via the shared channel.

In step S416, the value of "j" is incremented by one. In step S418, it is determined whether the value of "j" is less than or equal to $N_{UL-SCH}$. If the value of "j" is less than or equal to $N_{UL-SCH}$ (step S418: YES), the process returns to step S410. Otherwise (step S418: NO), the process comes to an end.

Next, the base station apparatus 200 according to an embodiment of the present invention is described with reference to FIG. 6.

As shown in FIG. 6, the base station apparatus 200 according to an embodiment of the present invention includes a scheduling coefficient calculation unit 206 (as a selection unit), a transport format and resource block selection unit 210 (as an allocation unit), and a layer 1 processing unit 212.

The scheduling coefficient calculation unit 206 performs the process of step S204. Specifically, the scheduling coefficient calculation unit 206 selects user equipment terminals (UEs) to which radio resources are to be allocated according to dynamic scheduling in the corresponding sub-frame and supplies the number of user equipment terminals (UEs) $N_{UL-SCH}$ to which radio resources are to be allocated according to dynamic scheduling to the transport format and resource block selection unit 210.

The transport format and resource block selection unit 210 performs the process of step S208. Specifically, the transport format and resource block selection unit 210 performs uplink transport format and resource selection. More specifically, the transport format and resource block selection unit 210 reserves radio resources (RBs) for the Physical Random Access Channel (PRACH), reserves prohibited radio resources (RBs) or guard RBs, reserves radio resources (RBs) for the UL-SCH to which persistent scheduling is to be applied, and then determines a transmission format for the UL-SCH to which dynamic scheduling is to be applied and allocates radio resources for the UL-SCH to which dynamic scheduling is to be applied (including for both initial transmission and retransmission).

The layer 1 processing unit 212 performs a process related to the layer 1.

Second Embodiment

Next, a best mode for carrying out the present invention is described based on a second embodiment described below with reference to the accompanying drawings.

Throughout the figures for illustrating the embodiments of the present invention, the same reference numerals are used for the same or equivalent elements and their repeated descriptions may be omitted.

First, a radio communication system having a base station apparatus according to an embodiment of the present invention is described with reference to FIG. 1.

As shown in FIG. 1, the radio communication system 1000, which may be an Evolved UTRA (Universal Terrestrial Radio Access) and UTRAN (UTRA Network) system (a.k.a an LTE (Long Term Evolution) system or a super 3G system), includes a base station apparatus (eNB: eNode B) 200 and plural sets of user equipment (UE) $100_n$ ($100_1, 100_2, 100_3, \ldots 100_n$; n: an integer greater than zero (0)) (hereinafter, the user equipment (UE) may be referred to as a user equipment terminal(s)). The base station apparatus 200 is connected to an upper node such as an access gateway apparatus 300. The access gateway apparatus 300 is connected to a core network 400. In this case, the user equipment terminals $100_n$ are in communication with the base station apparatus 200 in a cell 50 based on the Evolved UTRA and UTRAN radio communication scheme.

Each of the user equipment terminals ($100_1, 100_2, 100_3, \ldots 100_n$) has the same configuration, functions, and status. Therefore, unless otherwise described, the term of user equipment terminals (UE) $100_n$ may be collectively used in the following descriptions.

As the radio access scheme in the radio communication system 1000, the OFDM (Orthogonal Frequency Division Multiplexing) scheme and the SC-FDMA (Single-Carrier Frequency Division Multiplexing Access) scheme are used in downlink and uplink communications, respectively. As described above, the OFDM scheme is a multi-carrier transmission scheme in which a frequency band is divided into plural sub-carriers having narrow frequency bands and data are mapped on each sub-carrier to be transmitted. The SC-FDMA scheme is a single-carrier transmission scheme in which a frequency band is divided so that different frequencies can be used among plural terminals and as a result, interference between terminals can be reduced.

Next, communication channels used in the Evolved UTRA and UTRAN radio communication scheme are described.

In downlink communications, a Physical Downlink Shared Channel (PDSCH) shared among the user equipment terminals $100_n$ and a Physical Downlink Control Channel (PDCCH) are used. The Physical Downlink Control Channel (PDCCH) may also be called a DL L1/L2 Control Channel. In downlink, transport format information and user information of the user to which the Physical Downlink Shared Channel is transmitted, transport format information and user information of the user by which a Physical Uplink Shared Channel (PUSCH) is transmitted, acknowledge information of the PUSCH (or an Uplink Shared Channel (UL-SCH) as a transport channel), and the like are reported via the Physical Downlink Control Channel (PDCCH). User data are transmitted via the Physical Downlink Shared Channel. The user data are transmitted via a Downlink Shared Channel (DL-SCH) as a transport channel. The transport format information and user information of the user to which Physical Downlink Shared Channel is transmitted, which are transmitted via the Physical Downlink Control Channel (PDCCH), are called Downlink Scheduling Information. The transport format information and user information of the user by which the Physical Uplink Shared Channel (PUSCH) is transmitted, which are transmitted via the Physical Downlink Control Channel (PDCCH), are called an Uplink Scheduling Grant.

In uplink communication, the Physical Uplink Shared Channel (PUSCH) that is shared among user equipment terminals $100_n$ and an LTE control channel are used. The LTE control channel has two types; one is to be time-multiplexed with the Physical Uplink Shared Channel (PUSCH) and the other is to be frequency-multiplexed with the Physical Uplink Shared Channel (PUSCH). The control channel to be frequency-multiplexed with the Physical Uplink Shared Channel (PUSCH) is called a Physical Uplink Control Channel (PUCCH).

In uplink communication, a downlink Channel Quality Indicator (CQI) to be used for scheduling for the Downlink Shared Channel (DL-SCH) and Adaptive Modulation and Coding (AMC), and acknowledgement information of the Downlink Shared Channel (HARQ ACK information) are transmitted via the LTE control channel. Further, user data are transmitted via the Physical Uplink Shared Channel (PUSCH). The user data are transmitted via an Uplink Shared Channel (UL-SCH) as a transport channel.

1. Uplink MAC Communication Control Procedure

Next, an uplink MAC (UL MAC) communication control procedure as a communication control method performed in a base station apparatus according the present embodiment is described.

In this embodiment, a logical channel corresponds to, for example, a Radio bearer; and a priority class corresponds to, for example, a priority level (or priority) or logical channel priority. In this embodiment, logical channels can be classified into four logical channel groups. The correspondence between the logical channel and the logical channel group can be arbitrarily determined.

Unless otherwise described, the "corresponding sub-frame" refers to a sub-frame in which the user equipment terminal transmits the Uplink Shared Channel (UL-SCH) according to scheduling.

In the following descriptions, dynamic scheduling corresponds to a first resource allocating scheme for dynamically allocating radio resources. When dynamic scheduling is applied to the Uplink Shared Channel (UL-SCH), radio resources are allocated to the user equipment terminal in arbitrary sub-frames. Further, in this case, various values may be set as the values of the transmission format including allocation information about resource blocks (frequency resources), a modulation scheme, a payload size, information about transmission power, HARQ information (a Redundancy version parameter, a process number, etc.), and MIMO information (a reference signal sequence for MIMO transmission, etc.). The transmission format including allocation information about resource blocks (frequency resources), a modulation scheme, a payload size, information about transmission power, HARQ information (a Redundancy version parameter, a process number, etc.), and MIMO information (a reference signal sequence for MIMO transmission, etc.) is reported to the user equipment terminal (UE) by means of the UL Scheduling Grant to be mapped to the Physical Downlink Control Channel (PDCCH).

On the other hand, persistent scheduling is a scheduling scheme for periodically allocating data transmission opportunities in accordance with a data type or features of the application to transmit/receive data. Persistent scheduling corresponds to a second resource allocating scheme for periodically allocating radio resources. Namely, when persistent scheduling is applied to the Uplink Shared Channel (UL-SCH), radio resources are allocated to the user equipment terminal in predetermined sub-frames. Further, in this case, predetermined values are set as the values of the transmission format including allocation information about resource blocks (frequency resources), a modulation scheme, a payload size, information about transmission power, HARQ information (a Redundancy version parameter, a process number, etc.), and MIMO information (a reference signal sequence for MIMO transmission, etc.). Namely, radio resources are allocated in the predetermined sub-frames, and the Uplink Shared Channel (UL-SCH) is transmitted using the predetermined transmission format. In this case, the predetermined sub-frames may be arranged, for example, at a predetermined cycle. Further, the predetermined transmission format is not necessarily fixed to one type, so that plural types of transmission formats may be provided.

2. Allocation Unit of the Transmission Band for the Physical Uplink Shared Channel (PUSCH)

In the present embodiment, the transmission band in the frequency direction is allocated in terms of resource blocks (RBs). For example, one resource block (1 RB) corresponds to 180 kHz. The number of RBs is equal to 25 for the system bandwidth of 5 MHz, is equal to 50 for the system bandwidth of 10 MHz, and is equal to 100 for the system bandwidth of 20 MHz. Also, the transmission band for the PUSCH is allocated in terms of RBs in each sub-frame. In addition, RBs are allocated such that factors of the DFT size do not include values other than 2, 3, and 5. In other words, the factors of the DFT size only include 2, 3, and 5.

For retransmission of the Uplink Shared Channel (UL-SCH), the base station apparatus 200 may or may not transmit the corresponding Uplink Scheduling Grant. For example, when the Uplink Scheduling Grant for retransmission of the Uplink Shared Channel (UL-SCH) can be transmitted, the base station apparatus 200 may transmit the Uplink Scheduling Grant. The "Uplink Scheduling Grant for retransmission of the Uplink Shared Channel (UL-SCH) can be transmitted" may mean that there are radio resources (i.e., frequency resources, time resources, or power resources) available for transmitting the Uplink Scheduling Grant. When the base station apparatus 200 transmits the Uplink Scheduling Grant for retransmission of the Uplink Shared Channel (UL-SCH), the user equipment terminal retransmits the Uplink Shared Channel (UL-SCH) according to the Uplink Scheduling Grant. As described above, the Uplink Scheduling Grant includes the identification information of the user equipment terminal which communicates using the shared channel in the corresponding sub-frame and also includes the transmission format of the shared channel such as allocation information about resource blocks (frequency resources), a modulation scheme, a payload size, information about transmission power, HARQ information (a Redundancy version parameter, a process number, etc.), and MIMO information (a reference signal sequence for MIMO transmission, etc.).

It should be noted that only a portion of the Uplink Scheduling Grant may be modified from the corresponding portion for initial transmission. For example, only allocation information about resource blocks (frequency resources) and information about transmission power may be modified.

As used herein, dynamic scheduling corresponds to a first resource allocating scheme for dynamically allocating radio resources.

When the base station apparatus 200 transmits the Uplink Scheduling Grant for retransmission of the Uplink Shared Channel (UL-SCH), the base station apparatus 200 may concurrently transmit the ACK via a Physical Hybrid ARQ Indicator Channel (PHICH). The effect of transmitting the ACK via the PHICH upon transmitting the Uplink Scheduling Grant for retransmission of the Uplink Shared Channel (UL-SCH) is described below. When the user equipment terminal (UE) cannot successfully receive the Uplink Scheduling Grant for retransmission of the Uplink Shared Channel (UL-SCH), the user equipment terminal follows information (i.e., ACK/NACK) transmitted via the PHICH. When the information transmitted via the PHICH is the ACK, the user equipment terminal (UE) stops retransmission of the UL-SCH. Otherwise (in the case of the NACK), the user equipment terminal (UE) retransmits the UL-SCH using the same frequency resources as the resources used for previous transmission. In this case, when the frequency resources used for previous transmission are different from the frequency resources specified by the UL Scheduling Grant and when the base station apparatus instructs another user equipment terminal (UE) to transmit the UL-SCH with the corresponding frequency resources used for the previous transmission, the Uplink Shared Channel (UL-SCH) for retransmission by the user equipment terminal (UE) collides with the Uplink Shared Channel (UL-SCH) for transmission by the other user equipment terminal (UE). As a result, transmission properties are degraded. When the base station apparatus 200 transmits the ACK via the PHICH upon transmitting the Uplink Scheduling Grant for retransmission of the Uplink Shared Channel (UL-SCH), degradation of transmission properties can be avoided. The process of transmitting the ACK via the PHICH upon transmitting the Uplink Scheduling Grant for retransmission of the Uplink Shared Channel (UL-SCH) also applies to the process of transmitting the ACK via the PHICH upon transmitting the Uplink Scheduling Grant for initial transmission of the Uplink Shared Channel (UL-SCH).

Figure 7A:
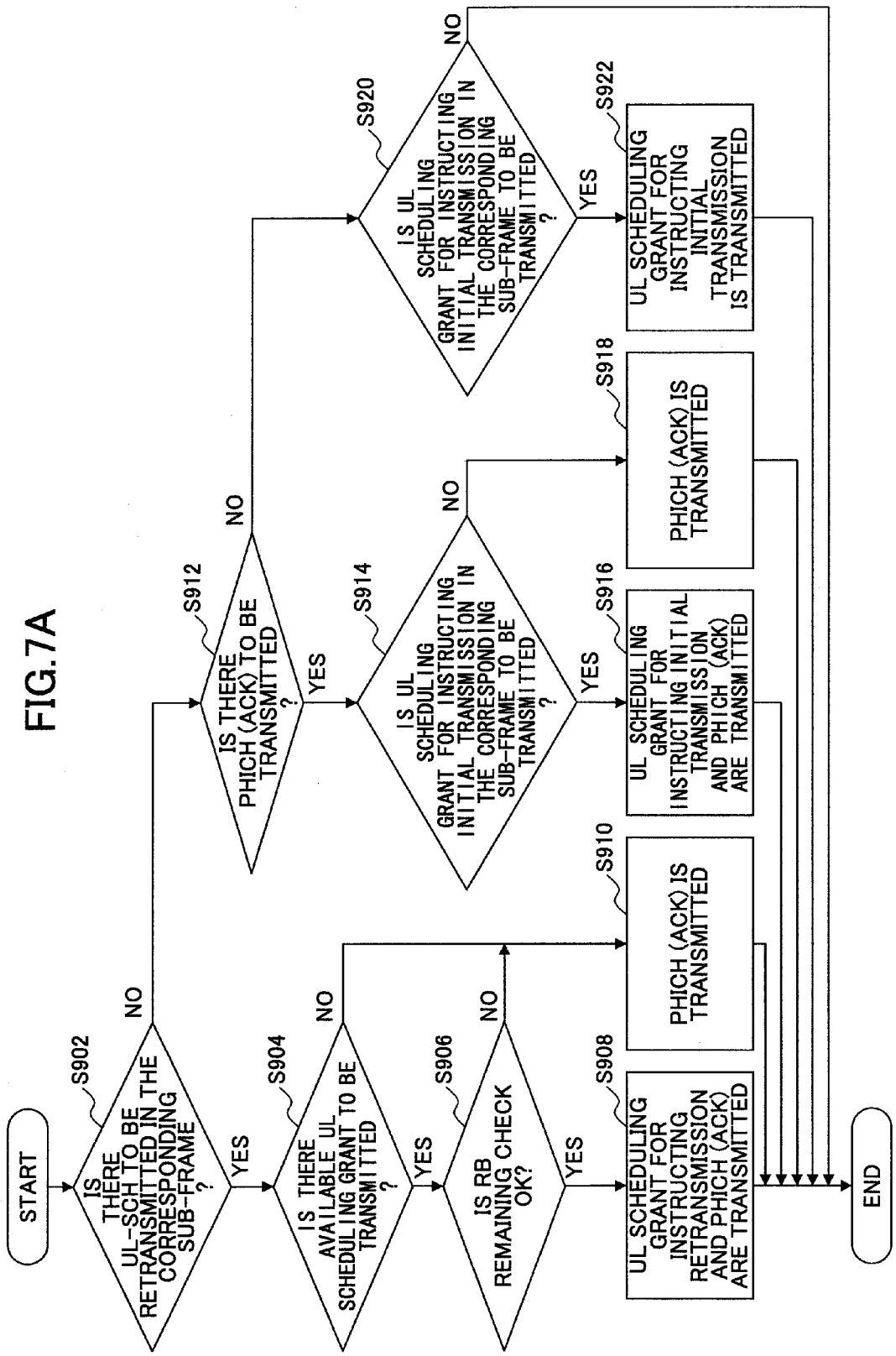
FIG. 7A is a flowchart showing a transmission process of an UL Scheduling Grant and a PHICH according to an embodiment of the present invention.

As described above, adequately transmitting the UL Scheduling Grant and the PHICH allows for more reliable communications using the control channel. As a result, transmission properties can be improved. FIG. 7A shows a flowchart of a method of transmitting the UL Scheduling Grant and the PHICH. With reference to FIG. 7, the method of transmitting the UL Scheduling Grant and the PHICH is described.

In step S902, the base station apparatus determines whether the UL-SCH is to be retransmitted in the corresponding sub-frame. When the UL-SCH is to be retransmitted in the corresponding sub-frame (step S902: YES), the base station apparatus determines whether there is an available UL Scheduling Grant to be transmitted in step S904. When there is an available UL Scheduling Grant to be transmitted (step S904: YES), the process goes to step S906. On the other hand, when there is no available UL Scheduling Grant to be transmitted (step S904: NO), the process goes to step S910. The "available UL Scheduling Grant to be transmitted" means that the Uplink Scheduling Grant can be transmitted to the user equipment terminal (UE). For example, it may also mean that there are radio resources (i.e., frequency resources, time resources, or power resources) available for transmitting the Uplink Scheduling Grant.

Figure 8:
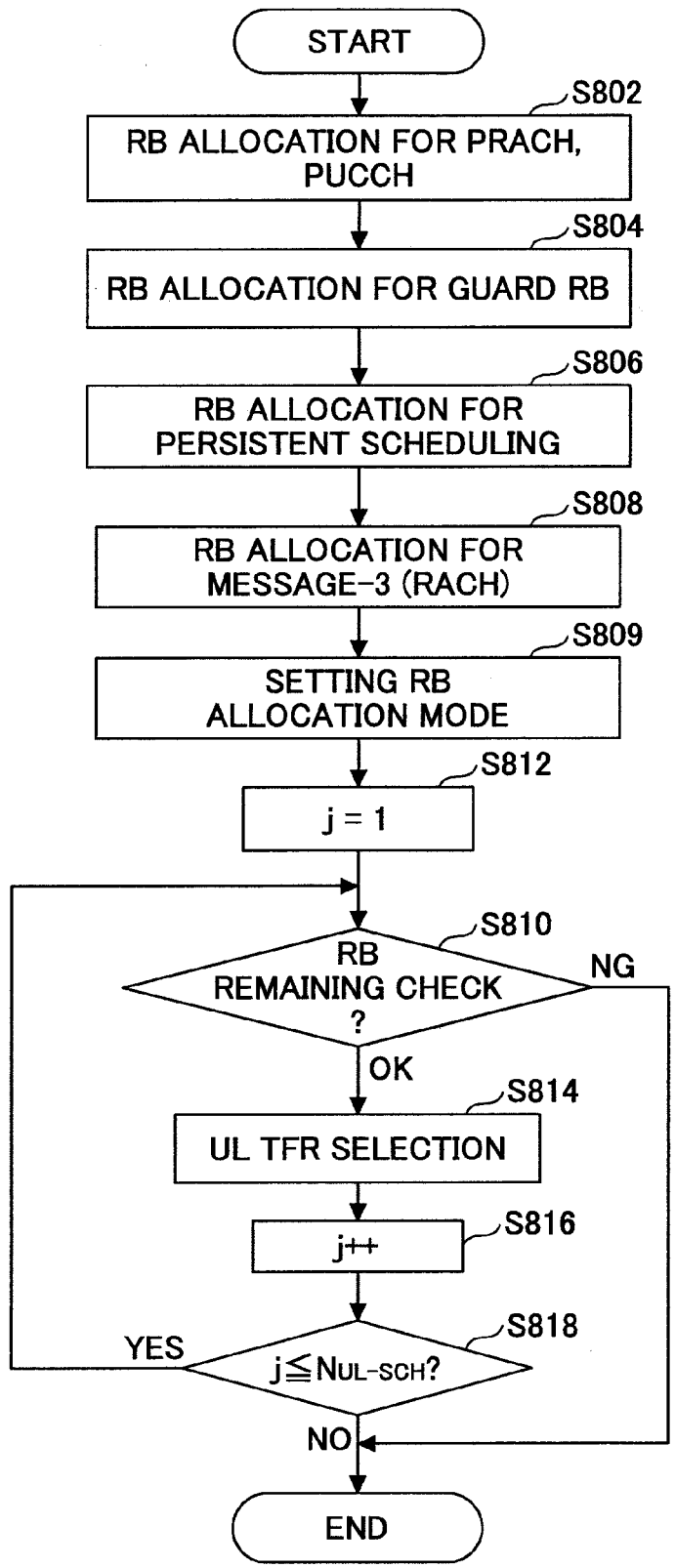
FIG. 8 is a flowchart of a process of UL TFR selection.

Next, in step S906, the base station apparatus determines whether RB Remaining Check, which will be described below with reference to step S810 in FIG. 8, is OK. When the RB Remaining Check in step S810 is OK (step S906: YES), the process goes to step S908. On the other hand, when the RB Remaining Check in step S810 is NG (step S906: NO), the process goes to step S910.

Next, in step S908, the base station apparatus determines that the UL Scheduling Grant for retransmission and the PHICH (ACK) are to be transmitted. The PHICH (ACK) is used to temporarily stop retransmission of the UL-SCH, when the UL Scheduling Grant is not detected by the user equipment terminal (UE) (missed detection). In step S910, the base station apparatus determines that PHICH (ACK) is to be transmitted. This PHICH (ACK) temporarily stops retransmission of the UL-SCH.

When the UL-SCH is not to be retransmitted in the corresponding sub-frame (step S902: NO), the base station apparatus determines whether the PHICH (ACK) is to be transmitted in step S912. The "PHICH (ACK) is to be transmitted" means that the user equipment terminal (UE) transmitted the UL-SCH at the immediately preceding HARQ transmission timing (i.e., at the transmission timing before one HARQ RTT) and the UL-SCH was successfully decoded (i.e., the CRC result was OK). When the PHICH (ACK) is to be transmitted, that is, when the CRC result of the UL-SCH transmitted before one HARQ RTT was OK (step S912: YES), the process goes to step S914.

In step S914, the base station apparatus determines whether the UL Scheduling Grant for initial transmission in the corresponding sub-frame is to be transmitted. When the UL Scheduling Grant for initial transmission in the corresponding sub-frame is to be transmitted (step S914: YES), the process goes to step S916. When the UL Scheduling Grant for initial transmission in the corresponding sub-frame is not to be transmitted (step S914: NO), the process goes to step S918.

In step S916, the base station apparatus determines that the UL Scheduling Grant for initial transmission and the PHICH (ACK) are to be transmitted. As described above, the PHICH (ACK) is used to temporarily stop retransmission of the UL-SCH, when the UL Scheduling Grant is not detected by the user equipment terminal (UE) (missed detection). In step S918, the base station apparatus determines that the PHICH (ACK) is to be transmitted.

On the other hand, when the PHICH (ACK) is not to be transmitted, that is, when the CRC result of the UL-SCH transmitted before one HARQ RTT was not OK (step S912: NO), the process goes to step S920. The "PHICH (ACK) is not to be transmitted" means that the user equipment terminal (UE) did not transmit the UL-SCH before one HARQ RTT.

In step S920, the base station apparatus determines whether the UL Scheduling Grant for initial transmission in the corresponding sub-frame is to be transmitted. When the base station apparatus determines that the UL Scheduling Grant for initial transmission in the corresponding sub-frame is to be transmitted (step S920: YES), the process goes to step S922. In step S922, the base station apparatus determines that the UL Scheduling Grant for initial transmission in the corresponding sub-frame is to be transmitted. On the other hand, when the base station apparatus determines that the UL Scheduling Grant for initial transmission in the corresponding sub-frame is not to be transmitted (step S920: NO), the base station apparatus determines that the PHICH and the UL Scheduling Grant are not to be transmitted.

3. UL MAC Data Transmission Procedure

Next, an uplink MAC (UL MAC) data transmission procedure is described with reference to FIG. 2. FIG. 2 shows a procedure, starting from a scheduling process of calculating scheduling coefficients, to an UL TFR selection process of determining the transport format and RBs to be allocated.

3.1. Setting of UL MAC Maximum Multiplexing Number $N_{ULMAX}$

In step S202, an UL MAC maximum multiplexing number $N_{ULMAX}$ is set in the base station apparatus 200. The UL MAC maximum multiplexing number $N_{ULMAX}$ is the maximum multiplexing number in one sub-frame of the Uplink Shared Channel (UL-SCH) (including both the UL-SCH for initial transmission and the UL-SCH for retransmission) to which dynamic scheduling is applied and is designated via the external input interface (I/F). The "UL MAC maximum multiplexing number is designated via the external input interface" means that the UL MAC maximum multiplexing number is specified by an upper node or another node in the core network or is set as an internal parameter, for example.

3.2. Calculation for Scheduling Coefficients

Next, in step S204, Calculation for Scheduling coefficients is performed in the base station apparatus 200. The user equipment terminals (UEs) to which radio resources are to be allocated according to dynamic scheduling in the corresponding sub-frame are selected. Then, Uplink Transport format and Resource selection is performed, as described below, with respect to the user equipment terminals (UEs) to which radio resources are to be allocated according to dynamic scheduling in the corresponding sub-frame. The "user equipment terminals (UEs) to which radio resources are to be allocated according to dynamic scheduling" include both a user equipment terminal (UE) having retransmission data to be transmitted in the corresponding sub-frame and a user equipment terminal (UE) having data to be initially transmitted which are selected based on Calculation for Scheduling Coefficients.

The number of user equipment terminals (UEs) to which radio resources are to be allocated according to dynamic scheduling in the corresponding sub-frame is defined as $N_{UL\text{-}SCH}$.

3.4. Uplink Transport Format and Resource Selection (UL TFR Selection)

Next, in step S208, Uplink Transport format and Resource selection is performed in the base station apparatus 200. The base station apparatus 200 reserves radio resources (RBs) for the Physical Random Access Channel (PRACH), reserves prohibited radio resources (RBs) or guard RBs, reserves radio resources (RBs) for the UL-SCH to which persistent scheduling is applied, and then determines a transmission format for the UL-SCH to which dynamic scheduling is applied and allocates radio resources for the UL-SCH to which dynamic scheduling is applied (including for both initial transmission and retransmission). It should be noted that Uplink Transport format and Resource selection includes uplink transmission power control.

4. Calculation for Scheduling Coefficients

Next, Calculation for Scheduling coefficients performed in step S204 is described with reference to FIG. 7B.

4.1. Process Flow

Figure 7B:
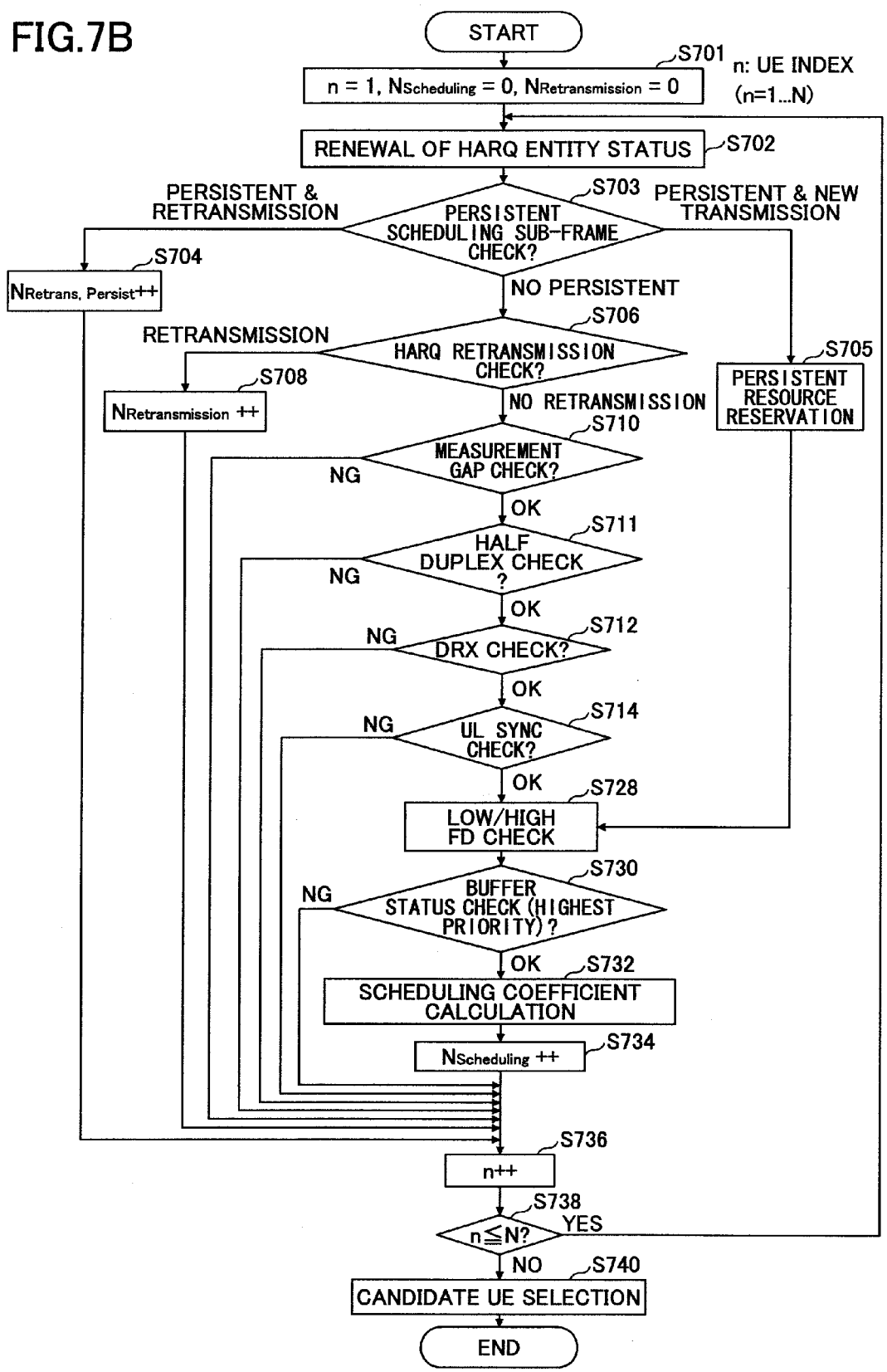
FIG. 7B is a flowchart showing a process of scheduling coefficient calculation and candidate UE selection according to an embodiment of the present invention.

FIG. 7B shows a process of selecting candidates for the user equipment terminals (UEs) to which radio resources are to be allocated according to dynamic scheduling, by calculating the scheduling coefficients. The base station apparatus 200 performs the following processes with respect to all the user equipment terminals (UEs) in an LTE active state (in an RRC (Radio Resource Control) connected state).

As shown in FIG. 7B, in step S701, equations of n=1, $N_{Scheduling}=0$, $N_{Retransmission}=0$ are provided; where n denotes an index of the user equipment terminals $100_n$ and n=1, ..., N (N is an integer greater than 0).

Next, in step S702, Renewal of HARQ (Hybrid Automatic Repeat reQuest) Entity Status is performed. In this step, with respect to the user equipment terminal (UE), a process in which the CRC result of the UL-SCH is OK is released.

Further, a process in which the maximum number of retransmission times has been reached is also released and the user data in the process are discarded. As used herein, the maximum number of retransmission times is independently determined for each user equipment terminal (UE).

Further, a process in which no transmission of the UL-SCH is detected upon power detection of the Uplink Shared Channel is also released.

Next, persistent scheduling is performed. Persistent scheduling is a scheduling scheme for periodically allocating data transmission opportunities in accordance with a data type or features of the application to transmit/receive data. Further, the data type may include data of Voice Over IP, Streaming data or the like. The Voice Over IP or the Streaming corresponds to the application.

Regarding resource allocation according to persistent scheduling in uplink, in the case where data are generated, i.e., in the case of transition from a silence period to a talk spurt, persistent resources are allocated at the timing when the Scheduling Request and the Buffer Status Report are transmitted. In the case of transition from the talk spurt to the silence period, persistent resources are released when an Empty Buffer Status Report is transmitted from the user equipment terminal (UE) to the base station apparatus. The Empty Buffer Status Report refers to a signal indicating that the amount of data in the buffer is equal to zero (0). The persistent resources refer to radio resources, specifically frequency resources, which are allocated according to persistent scheduling.

The base station apparatus 200 determines whether persistent resources are to be allocated to the user equipment terminal (UE) in the corresponding sub-frame. When persistent resources are to be allocated, the base station apparatus 200 also determines whether data are to be initially transmitted or to be retransmitted in step S703.

When it is determined in step S703 that persistent resources are to be allocated and data are to be retransmitted, $N_{Retrans,persist}$ is incremented by one ($N_{Retrans,persist}$++) in step S704, and then the user equipment terminal (UE) is excluded from a target of the scheduling process for initial transmission. When the user equipment terminal (UE) is excluded from a target of the scheduling process for initial transmission, the scheduling coefficients are not calculated in step S732, and as a result, the scheduling process for initial transmission is not performed.

When it is determined in step S703 that persistent resources are to be allocated and data are to be initially transmitted, the persistent resources are reserved in step S705.

Then, the process goes to step S728 in which Low/High Fd Check is performed. In this case, with regard to the user equipment terminal (UE) for which the persistent resources are reserved in step S705, Buffer Status Check in step S730 and Scheduling Coefficient Calculation in step S732 are performed. When transmission resources are allocated according to dynamic scheduling in the corresponding sub-frame, the user equipment terminal (UE) transmits the MAC PDU (UL-SCH) based on the transmission resources allocated according to dynamic scheduling. Even when the transmission resources are allocated according to dynamic scheduling, persistent resources are reserved. In other words, even when the transmission resources are allocated according to dynamic scheduling, persistent resources are not released.

Since whether persistent resources are to be allocated in the corresponding sub-frame is determined in step S703 before HARQ Retransmission Check in step S706, initial transmission according to persistent scheduling has precedence over retransmission according to dynamic scheduling. When retransmission according to dynamic scheduling is not performed due to initial transmission according to persistent scheduling, the ACK is transmitted as acknowledge information for the shared channel to which dynamic scheduling is applied for this retransmission. Transmitting the ACK allows transmission of the shared channel to which dynamic scheduling is applied to be absolutely stopped.

When persistent resources are not to be allocated, the process goes to HARQ Retransmission Check in step S706.

Next, in step S706, HARQ Retransmission Check is performed. It is determined whether the user equipment terminal (UE) has data to be retransmitted in the corresponding sub-frame. The "data to be retransmitted" refer to retransmission data which satisfy the following four conditions:
  the timing of retransmitting data corresponds to the retransmission timing according to Synchronous HARQ, and the NACK or the UL Scheduling Grant for transmission of the UL-SCH in the corresponding sub-frame is transmitted to the user equipment terminal (UE);
  the previous CRC results of the UL-SCH are not OK;
  the maximum number of retransmission times has not been reached; and
  "no transmission of the UL-SCH" is not detected upon power detection of the Uplink Shared Channel.

When the user equipment terminal (UE) has data to be retransmitted, the process of the HARQ Retransmission Check returns "Retransmission". Otherwise, the process of the HARQ Retransmission Check returns "No retransmission". When the result of the HARQ Retransmission Check is determined as "No retransmission", the process goes to step S710 in which Measurement Gap Check is performed.

With regard to the user equipment terminal which has transmitted the ACK (HARQ Process), when the maximum number of retransmission times has not been reached, it is assumed that the user equipment terminal (UE) has "data to be retransmitted" in the next transmission timing according to Synchronous HARQ. Specifically, when the results in step S902 and step S904 are determined as NO and when the PHICH (ACK) is transmitted in step S910 in spite of the fact that the previous CRC result of the corresponding data (UL-SCH) is not OK, it is assumed that the user equipment terminal (UE) has "data to be retransmitted" in the next transmission timing according to Synchronous HARQ. In this case, the PHICH (ACK) does not mean that the CRC result is OK, but means that retransmission of the UL-SCH is temporarily stopped.

When the result of the HARQ Retransmission Check is determined as "Retransmission", $N_{Retransmission}$ is incremented by one in step S708 ($N_{Retransmission}$++), and then the user equipment terminal (UE) is excluded from a target of the scheduling process for initial transmission. When the user equipment terminal (UE) is excluded from a target of the scheduling process for initial transmission, the scheduling coefficients are not calculated in step S732, and as a result, the scheduling process for initial transmission is not performed.

Next, in step S710, Measurement Gap Check is performed. In this step, the base station apparatus 200 does not allocate the Uplink Shared Channel (RBs for the Uplink Shared Channel) to the user equipment terminal (UE), when the time interval during which the user equipment terminal (UE) measures a cell with a different frequency overlaps a time frame in which the Physical Downlink Control Channel for the Uplink Shared Channel is transmitted in downlink, a time frame in which the shared channel is received, or a time frame in which acknowledge information for the Uplink Shared Channel is transmitted. The UL Scheduling Grant for the Uplink Shared Channel is transmitted via the Physical Downlink Control Channel. The acknowledgement information for the Uplink Shared Channel is called a PHICH (Physical Hybrid ARQ Indicator Channel) or an ACK/NACK.

In this case, the cell with the different frequency may be a cell of the Evolved UTRA and UTRAN system or a cell of another system such as GSM, WCDMA, TDD-CDMA, CDMA-2000, or WiMAX.

Specifically, it is determined whether the sub-frame in which the Physical Downlink Control Channel is transmitted is included in the Measurement gap, whether the sub-frame in which the UL-SCH is transmitted is included in the Measurement gap, or whether the sub-frame in which an ACK/NACK (PHICH) for the UL-SCH is transmitted is included in the Measurement gap, with respect to initial transmission and second transmission from the user equipment terminal (UE). When it is determined that the sub-frame in which the Physical Downlink Control Channel is transmitted is included in the Measurement gap, that the sub-frame in which the UL-SCH is transmitted is included in the Measurement gap, or that the sub-frame in which the ACK/NACK (PHICH) for the UL-SCH is transmitted is included in the Measurement gap, the process of the Measurement Gap Check returns NG (failed). Otherwise, the process of the Measurement Gap Check returns OK. The Measurement gap refers to a time interval during which the user equipment terminal (UE) measures a cell with a different frequency for the purpose of different-frequency handover or different-system handover. During the time interval, communications cannot be performed and therefore, the user equipment terminal (UE) cannot receive the Physical Downlink Control Channel. For the same reason, the user equipment terminal (UE) cannot transmit the Uplink Shared Channel and cannot receive the ACK/NACK (PHICH).

When the result of the Measurement Gap Check is determined as NG, the user equipment (UE) terminal is excluded from a target of the scheduling process. When the user equipment terminal (UE) is excluded from a target of the scheduling process for initial transmission, the scheduling coefficients are not calculated in step S732, and as a result, the scheduling process for initial transmission is not performed.

When the result of the Measurement Gap Check is determined as OK, the process goes to step S711 in which Half Duplex Check is performed.

In this example, the Measurement Gap Check is not performed for the third transmission or later. Although the Measurement Gap Check is performed for the initial transmission and second transmission in this example, it may be performed for the initial transmission, second transmission, and third transmission. In other words, the Measurement Gap Check may be performed for any number of transmission times.

In step S711, Half Duplex Check is performed. The Half Duplex refers to a communication scheme in which uplink transmission and downlink transmission are not performed simultaneously. In other words, in the Half Duplex mode, uplink transmission and downlink transmission are performed by the user equipment terminal (UE) at different timings.

In Half Duplex Check, when the user equipment terminal (UE) performs Half Duplex communications, the following six determinations are made:

- whether the corresponding sub-frame, i.e., the sub-frame in which the Uplink Shared Channel is transmitted, overlaps the sub-frame in which the Downlink Common Channel (a Synchronization Channel (SCH), a Primary Broadcast Channel (P-BCH), a Dynamic Broadcast Channel (D-BCH), or an MBMS Channel) is transmitted;
- whether the corresponding sub-frame, i.e., the sub-frame in which the Uplink Shared Channel is transmitted, overlaps the sub-frame in which acknowledge information for the Uplink Shared Channel transmitted from the user equipment terminal (UE) is transmitted;
- whether the corresponding sub-frame, i.e., the sub-frame in which the Uplink Shared Channel is transmitted, overlaps the sub-frame in which control information (UL Scheduling Grant or DL Scheduling Information) for uplink or downlink persistent scheduling is transmitted;
- whether the sub-frame in which control information (UL Scheduling Grant) for the Uplink Shared Channel transmitted in the corresponding sub-frame is transmitted overlaps the sub-frame in which the user equipment terminal (UE) transmits the Uplink Shared Channel;
- whether the sub-frame in which control information (UL Scheduling Grant) for the Uplink Shared Channel transmitted in the corresponding sub-frame is transmitted overlaps the sub-frame in which the user equipment terminal (UE) transmits CQI (downlink radio quality information), a Sounding Reference Signal, a Scheduling Request, or a RACH (Random Access Channel) Preamble in uplink; and
- whether the sub-frame in which control information (UL Scheduling Grant) for the Uplink Shared Channel transmitted in the corresponding sub-frame is transmitted overlaps the sub-frame in which the user equipment terminal (UE) transmits acknowledgement information (ACK/NACK) for the Downlink Shared Channel in uplink.

If at least one of these results is true among the six determinations, the process of the Half Duplex Check may return NG (failed). Otherwise, the process of the Half Duplex Check may return OK. Further, regarding the uplink and downlink channels relevant to the determinations, all of the corresponding channels may be considered, or only some of the corresponding channels may be considered. When the result of the Half Duplex Check is determined as NG (step S711: NG), the user equipment terminal (UE) is excluded from a target of the scheduling process. On the other hand, when the result of the Half Duplex Check is determined as OK (step S711: OK), the process goes to step S712 in which DRX Check is performed.

As described above, upon performing downlink reception, the user equipment terminal (UE) in the Half Duplex mode cannot perform uplink transmission. Therefore, according to the process described above, namely by determining whether downlink transmission is to be performed in the corresponding sub-frame and not allocating the Uplink Shared Channel (RBs for the Uplink Shared Channel) at the timing of downlink reception, it may become possible to avoid the problem in that the user equipment terminal (UE) in the Half Duplex mode cannot transmit an uplink transmission signal upon performing downlink reception.

Further, in the six determinations described above, each determination may be made by considering a switching period required to switch between downlink reception and uplink transmission in the user equipment terminal (UE). More specifically, for example, when the transmission timing of the Uplink Shared Channel in the user equipment terminal (UE) or the transmission timing of control information (UL Scheduling Grant) for the Uplink Shared Channel in the base station apparatus overlaps the switching timing, the result of the Half Duplex Check may be determined as NG.

In this example, Half Duplex Check is performed with respect to the user equipment terminal (UE) to communicate in the Half Duplex mode. However, the Half Duplex Check may be performed with respect to not only the user equipment terminal (UE) to communicate in the Half Duplex mode but also the user equipment terminal (UE) to communicate in the Full Duplex mode. Further, the Half Duplex Check may be performed with respect to all the user equipment terminals (UEs) to communicate in the Full Duplex mode. Alternatively, the Half Duplex Check may be performed with respect to the user equipment terminal (UE) communicating in the Full Duplex mode and having path loss between the user equipment terminal (UE) and the base station apparatus 200 above a threshold. On the other hand, the Half Duplex Check may not be performed with respect to the user equipment terminal (UE) communicating in the Full Duplex mode and having path loss between the user equipment terminal (UE) and the base station apparatus 200 below the threshold. In this case, uplink transmission and downlink reception are not performed at the same time; therefore, it may become possible to avoid a problem in that "uplink transmission signal in the user equipment terminal (UE) acts as an interference signal to a downlink reception signal; and as a result, quality of the downlink reception signal is degraded" as described below. Further, the Half Duplex Check may be performed with respect to the user equipment terminal (UE) to communicate in the Full Duplex mode in a cell or a frequency band which may be heavily influenced by the problem in that "uplink transmission signal in the user equipment terminal (UE) acts as an interference signal to a downlink reception signal; and as a result, quality of the downlink reception signal is degraded". On the other hand, the Half Duplex Check may not be performed with respect to the user equipment terminal (UE) to communicate in the Full Duplex mode in a cell or a frequency band which may not be heavily influenced by the problem in that "uplink transmission signal in the user equipment terminal (UE) acts as an interference signal to a downlink reception signal; and as a result, quality of the downlink reception signal is degraded".

Next, in step S712, DRX (discontinuous reception) Check is performed. When the user equipment terminal (UE) performs DRX, that is, when the user equipment terminal (UE) is in a DRX mode, the Uplink Shared Channel (RBs for the Uplink Shared Channel) is not allocated to the user equipment terminal (UE).

Specifically, it is determined whether the user equipment terminal (UE) is in the DRX mode. When it is determined that the user equipment terminal (UE) is in the DRX mode, the process of the DRX Check returns NG (failed). Otherwise, the process of the DRX Check returns OK.

When the result of the DRX Check is determined as NG, the user equipment terminal (UE) is excluded from a target of the scheduling process for initial transmission. When the user equipment terminal (UE) is excluded from a target of the scheduling process for initial transmission, the scheduling coefficients are not calculated in step S732, and as a result, the scheduling process for initial transmission is not performed.

When the result of the DRX Check is determined as OK, the process goes to step S714 in which UL Sync Check is performed.

Next, in step S714, Uplink Synchronization Check (UL Sync Check) is performed. In this step, when the uplink synchronization state of the user equipment terminal (UE) is out of synchronization or when uplink dedicated resources are released, the Uplink Shared Channel (RBs for the Uplink Shared Channel) is not allocated to the user equipment terminal (UE). The uplink dedicated resources refer to resources for CQI, a Scheduling Request, and a Sounding Reference Signal transmitted in uplink.

Specifically, the base station apparatus 200 determines whether the uplink synchronization state of the user equipment terminal (UE) is out of synchronization. Further, the base station apparatus 200 determines whether uplink dedicated resources for the user equipment terminal (UE) are released. When it is determined that the uplink synchronization state is out of synchronization or that uplink dedicated resources are released, the process of the UL Sync Check returns NG (failed). Otherwise, the process of the UL Sync Check returns OK.

When the result of the UL Sync Check is determined as NG, the user equipment terminal (UE) is excluded from a target of the scheduling process for initial transmission. When the user equipment terminal (UE) is excluded from a target of the scheduling process for initial transmission, the scheduling coefficients are not calculated in step S732, and as a result, the scheduling process for initial transmission is not performed.

When the result of the UL Sync Check is determined as OK, the process goes to step S728 in which Low/High Fd Check is performed.

The base station apparatus 200 performs the following detection (determination) for the uplink synchronization state with respect to each user equipment terminal (UE) $100_n$ in the RRC_connected state.

The base station apparatus 200 measures reception quality (for example, SIR) of the Sounding RS from the user equipment terminal (UE). When the reception quality is above a predetermined threshold, the uplink synchronization state is determined as OK. Otherwise, the uplink synchronization state is determined as NG, i.e., out of synchronization. In this example, the base station apparatus measures reception quality of the Sounding RS. Alternatively, the base station apparatus may determine the uplink synchronization state based on reception quality of CQI. Alternatively, the base station apparatus may determine the uplink synchronization state based on both reception quality of the Sounding RS and reception quality of CQI.

Further, the base station apparatus 200 performs the following detection (determination) for the state of uplink dedicated resources with respect to each user equipment terminal (UE) $100_n$ in the RRC_connected state.

The base station apparatus 200 determines that the uplink dedicated resources are released, when the elapsed time from the timing of transmitting Timing Advance to the user equipment terminal (UE) the last time is greater than an UL Out-of-sync timer. Further, the base station apparatus 200 determines that dedicated resources are released for the user equipment terminal (UE) which the base station apparatus 200 instructs to release the uplink dedicated resources. With respect to the user equipment terminal, the base station apparatus 200 assumes that dedicated resources are released until uplink synchronization is reestablished according to the random access procedure.

As described above, the process of the HARQ Retransmission Check in step S706 is performed before the process of the UL Sync Check in step S714. Accordingly, when the result of the HARQ Retransmission Check is determined as "Retransmission", the retransmitted UL-SCH is received with respect to the user equipment terminal (UE) even if the result of the UL Sync Check is determined as NG.

Next, in step S728, the uplink transmission type is checked (UL Low/High Fd Check is performed). In this step, it is determined whether the transmission type for the user equipment terminal (UE) is Low Fd or High Fd. The transmission type is managed in common in downlink and uplink.

For example, when the estimated value of Fd for the user equipment terminal (UE) is less than or equal to a predetermined threshold (Threshold$_{Fd,UL}$), the transmission type is determined as Low Fd. Otherwise, the transmission type is determined as High Fd.

As the estimated value of Fd, the value reported from the user equipment terminal (UE) by means of a Measurement report or the like may be used. Alternatively, as the estimated value of Fd, a value calculated based on the time correlation value of the Sounding Reference Signal transmitted from the user equipment terminal (UE) may be used. Alternatively, as the estimated value of Fd, a value calculated based on the Demodulation Reference Signal for CQI may be used.

Next, in step S730, Buffer Status Check is performed. In this step, the base station apparatus does not allocate the Uplink Shared Channel (RBs for the Uplink Shared Channel) to the user equipment terminal (UE), when the user equipment terminal (UE) does not have data to be transmitted.

Specifically, it is determined whether there are available data to be transmitted in the corresponding sub-frame with respect to the user equipment terminal's logical channel groups (a logical channel group #1, a logical channel group #2, a logical channel group #3, and a logical channel group #4). When there are no available data to be transmitted with respect to all the logical channel groups, the process of the Buffer Status Check returns NG (failed). When there are available data to be transmitted with respect to at least one of the logical channel groups, the process of the Buffer Status Check returns OK. As used herein, available data to be transmitted refers to available data to be initially transmitted. When the amount of data in the UL Buffer is greater than zero (0), it is determined that there are "available data to be initially transmitted". The definition of the amount of data in the UL Buffer will be described below. Although four types of the user equipment terminal's logical channel groups (the logical channel group #1, the logical channel group #2, the logical channel group #3, and the logical channel group #4) are used in this example, a similar process can be applied to the case where five or more types of logical channel groups are used. Also, a similar process can be applied to the case where three or less types of logical channel group is used. Also, a similar process can be applied to the case where only one type of logical channel group is used.

An exceptional process may be performed in the Buffer Status Check as follows.

When inter-eNB handover (handover between base station apparatus) is supposed to be performed by the user equipment terminal (UE), it is assumed that there are no available data (data for the logical channel group #1, the logical channel group #2, the logical channel group #3, and the logical channel group #4) to be transmitted with respect to the user equipment terminal. For retransmission data, however, the user equipment terminal (UE) transmits the retransmission data, since the process in step S730 is skipped due to "retransmission" in step S706.

When the base station apparatus receives from the user equipment terminal (UE) "resource allocation request for the UL-SCH: REQUESTING" by means of the Scheduling request and uplink radio resources (UL-SCH) have not been allocated to the user equipment terminal (UE) since the base station apparatus has received the Scheduling request, it is assumed that there are available data to be transmitted with respect to the logical channel group #1.

When the base station apparatus does not receive the Buffer Status Report at the reception timing of the UL-SCH, even though the base station apparatus allocates uplink radio resources (UL-SCH) in response to the Scheduling request, the base station again assumes that the base station apparatus receives from the user equipment terminal (UE) the "resource allocation request for the UL-SCH: REQUESTING" by means of the Scheduling request and uplink radio resources (UL-SCH) have not been allocated to the user equipment terminal (UE) since the base station apparatus has received the Scheduling request. This assumption is made when the base station apparatus does not receive the Buffer Status Report at the timing of initial transmission or later without waiting for the maximum number of retransmission times.

Both when persistent resources are reserved in the corresponding sub-frame (when the process in step S705 is performed) and when persistent resources are not reserved in the corresponding sub-frame (when the process in step S705 is not performed), the following process is performed with respect to the logical channel group to which persistent scheduling is applied:

1) when the amount of data in the UL Buffer is greater than or equal to a threshold $\text{Threshold}_{data\_size, UL}$, it is assumed that "there are available data to be transmitted" with respect to the logical channel group; and 2) when the amount of data in the UL Buffer is less than the threshold $\text{Threshold}_{data\_size, UL}$, it is assumed that "there are no available data to be transmitted" with respect to the logical channel group.

In this manner, when the amount of data in the UL Buffer is less than the threshold $\text{Threshold}_{data\_size, UL}$, it is assumed that "there are no available data to be transmitted" with respect to the logical channel group. Accordingly, it may become possible to prevent data to be transmitted with persistent resources, i.e., data with a small data size, from being transmitted in sub-frames other than the sub-frames in which the persistent resources are allocated. Specifically, assuming that persistent resources are not reserved (the process in step S705 is not performed), when the determination based on the data size is not made, data to be transmitted with persistent resources may be transmitted in sub-frames in which persistent resources are not allocated. As a result, data to be transmitted may not be found in the sub-frame in which persistent resources are allocated, and thereby the transmission efficiency is reduced. In this case, the threshold $\text{Threshold}_{data\_size, UL}$ may be set to the maximum data size with which persistent resources can be transmitted or a little greater value than the maximum data size.

When the result of the Buffer Status Check is determined as NG, the user equipment terminal (UE) is excluded from a target of the scheduling process for initial transmission. When the user equipment terminal (UE) is excluded from a target of the scheduling process for initial transmission, the scheduling coefficients are not calculated in step S732, and as a result, the scheduling process for initial transmission is not performed.

On the other hand, when the result of the Buffer Status Check is determined as OK, a logical channel group with the highest priority level is selected and the process goes to step S732 in which Scheduling Coefficient Calculation is performed. In other words, the base station apparatus calculates the scheduling coefficients based on the logical channel group with the highest priority level among data types retained by the user equipment terminal. Specifically, when there are plural logical channel groups for the user equipment terminal (UE), the base station apparatus does not calculate the scheduling coefficients with respect to all the plural logical channel groups, but calculates the scheduling coefficients with respect to the logical channel group with the highest priority level, and thereby the workload in the base station apparatus 200 can be reduced.

Next, in step S732, Scheduling Coefficient Calculation is performed. In this step, with respect to the logical channel group with the highest priority level determined in Section 4.1.9, the scheduling coefficients are calculated based on the following evaluation equation.

Tables 5-1 and 5-2 show parameters set via the external interface (I/F). Table 6 shows parameters for each logical channel group of the user equipment terminal (UE).

TABLE 5-1

List of input parameters for the scheduler
(The subscript LCG refers to the logical channel group.)

| No | Parameter name | Set with respect to each | Remarks |
|---|---|---|---|
| 1 | $A_{LCG}$ | Logical channel group | This is a Priority Class priority level coefficient based on the logical channel group. |
| 2 | $F_{LCG}(t_{No\_allocated})$ | Logical channel group | This is a transmission resource allocation priority level coefficient used to preferentially transmit data to UE to which transmission resources are not allocated according to dynamic scheduling. A time |

TABLE 5-1-continued

List of input parameters for the scheduler
(The subscript LCG refers to the logical channel group.)

| No | Parameter name | Set with respect to each | Remarks |
|---|---|---|---| interval $t_{No\_allocated}$ during which transmission resources are not allocated according to dynamic scheduling is defined as an elapsed time from the timing when the preceding CRC result of the UL-SCH including logical channels belonging to the corresponding logical channel group is determined as OK. If the CRC result of the UL-SCH including logical channels belonging to the corresponding logical channel group is never determined as OK, the time interval $t_{No\_allocated}$ is defined as an elapsed time from the timing when information about the amount of data in the buffer (the amount of data is other than zero (0)) with respect to the logical channel group is reported from the user equpment terminal.
This value is set based on the buffer residence time $t_{No\_allocated}$ as follows.
If $t_{No\_allocated} < Th_{LCG}^{(No\_allocated,\ 1)}$, then
$F_{LCG}(t_{No\_allocated}) = 0.0$
If $Th_{LCG}^{(No\_allocated,\ 1)} =< t_{No\_allocated} < Th_{LCG}^{(No\_allocated,\ 2)}$,
then $$F_{LCG}(t_{No\_allocated}) = \frac{t_{No\_allocated} - Th_{LCG}^{(No\_allocated,1)}}{Th_{LCG}^{(No\_allocated,2)} - Th_{LCG}^{(No\_allocated,1)}}$$

(When $Th_{LCG}^{(No\_allocated,\ 1)} = Th_{LCG}^{(No\_allocated,\ 2)}$, this process is not performed.)
If $Th_{LCG}^{(No\_allocated,\ 2)} =< t_{No-allocated}$, then
$F_{LCG}(t_{No\_allocated}) = 1.0$

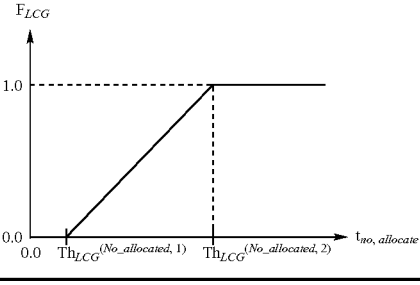

TABLE 5-2

List of input parameters for the scheduler

| No | Parameter name | Set with respect to each | Remarks |
|---|---|---|---|
| 3 | $Th_{LCG}^{(No\_Allocated, 1)}$ | Priority class | This is a first threshold related to the time interval during which transmission resources are not allocated according to dynamic scheduling. |
| 4 | $Th_{LCG}^{(No\_Allocated, 2)}$ | | This is a second threshold related to the time interval during which transmission resources are not allocated according to dynamic scheduling. |
| 5 | $G(flag_{SR})$ | UE | This is a Scheduling request priority level coefficient given to preferentially transmit data to UE from which the base station apparatus receives "allocation request for the PUSCH: REQUESTING" by means of the Scheduling request and to which uplink radio resources (PUSCH) have not been allocated since the base station apparatus has received the Scheduling request. In the corresponding sub-frame, this value is set based on a value $flag_{SR}$ related to the corresponding UE. For example, when $flag_{SR} = 0$, $G(0)$ is set to a fixed value 1.0 ($G(0) = 1.0$), and only when $flag_{SR} = 1$, this value is set via the external interface (I/F). When the base station apparatus receives from the UE "allocation request for the PUSCH: REQUESTING" by means of the Scheduling request and when uplink radio resources (PUSCH) have not been allocated to the UE since the base station apparatus has received the Scheduling request, $flag_{SR}$ is set equal to one ($flag_{SR} = 1$). Otherwise, $flag_{SR}$ is set equal to zero ($flag_{SR} = 0$). |
| 6 | $R_{PC}^{(target)}$ | Logical channel group | This is a target data rate (bits/sub-frame). |
| 7 | $\alpha^{(PL)}$ | UE | This is a weighting coefficient with respect to the priority level based on path loss (Pathloss). |
| 8 | $\alpha_{LCG}^{(No\_allocated)}$ | Logical channel group | This is a weighting coefficient with respect to the priority level based on the transmission interval during which transmission resources are not allocated according to dynamic scheduling. |
| 10 | $\alpha_{LCG}^{(rate)}$ | Logical channel group | This is a weighting coefficient with respect to the priority level based on an Average Data Rate. |
| 11 | $\delta'_{LCG}$ | Logical channel group | This is a convergence value of a user data rate averaged forgetting coefficient for $\overline{R}_{n, k}$. |
| 12 | Scheduling priority group index | Logical channel group | This is an index of a Scheduling priority group set for each logical channel group. The UEs are prioritized in the order of the Scheduling priority group (Scheduling priority group: High –> Middle –> Low). In each Scheduling priority group, the UEs are prioritized based on the scheduling coefficients. The priority level is determined such as High > Middle > Low. |

(The subscript LCG refers to the logical channel group.)

TABLE 6

List of input parameters for the scheduler

| No. | Parameter name | Remarks |
|---|---|---|
| 1 | $R_n$ | This parameter indicates an Instantaneous transmittable Data Rate (bits/sub-frame) of UE #n, as described below. This parameter is calculated based on the following equation with reference to the UL_TF_related_table. $R_n = UL\_Table\_TF\_SIZE(RB\_all, \lfloor SIR_{estimated} \rfloor)$ where RB_all is the number of RBs across the system band. Further, $SIR_{estimated}$ is calculated across the system band. Alternatively, $SIR_{estimated}$ may be the maximum value of plural sets of $SIR_{estimated}$ which are calculated across narrower bands. Alternatively, $SIR_{estimated}$ may be selected, based on the transmission type, from both the value calculated across the system band and the maximum value of plural sets of $SIR_{estimated}$ which are calculated across narrower bands. |
| 2 | $\overline{R}_{n, k}$ | This parameter indicates an Average Data Rate (bits/sub-frame) of a logical channel group #k of UE #n. $\overline{R}_{n, k}(TTI) = \delta_{n, k} * \overline{R}_{n, k}(TTI - 1) + (1 - \delta_{n, k}) * r_{n, k}$ |

TABLE 6-continued

List of input parameters for the scheduler

| No. | Parameter name | Remarks |
|---|---|---|
| | | $r_{n,k}$: instantaneous data rate As the initial value of $\overline{R}_{n,k}$, $R_{n,k}$ calculated in the sub-frame is used. $\delta_{n,k}$: forgetting coefficient which is a variable changing for each calculation period, as described in step S732 (Scheduling Coefficient Calculation). Calculation of $\overline{R}_{n,k}$ is performed in every sub-frame based on an updating timing (step S732 (Scheduling Coefficient Calculation) with respect to not only a logical channel group with the highest priority level but also any other logical channel groups. |

(The subscript LCG refers to the logical channel group.)

Based on the input parameters in Tables 5-1, 5-2, and 6, the scheduling coefficient $C_n$ of the logical channel group #h with the highest priority level of the user equipment terminal (UE) #n is calculated according to the following equation ([Equation 14]).

[Equation 14]

$$C_n = A_{highest} \times \alpha^{(PL)} \cdot R_n \times \left(1 + \alpha_{highest}^{(No\_allocated)} \cdot F_{highest}(t_{No\_allocated})\right) \times G(flag_{SR}) \times \exp\left(\alpha_{highest}^{(rate)} \cdot \left(R_{highest}^{(target)} - \overline{R}_{n,highest}\right)\right)$$

Namely, when the base station apparatus selects a user equipment terminal to which radio resources are allocated, the base station apparatus may select the user equipment terminal based on a signal (Scheduling request) by means of which the user equipment terminal requests allocation of the Uplink Shared Channel (RBs for the Uplink Shared Channel). In addition, the base station apparatus may calculate a coefficient representing a priority level for allocating radio resources based on at least one of a priority class of data; radio quality of the reference signal transmitted from the user equipment terminal (for example, SIR of the Sounding Reference Signal); a time duration during which the shared channel (RBs for the shared channel) is not allocated; whether the base station apparatus receives the Scheduling request; an average transmission rate; and a target transmission rate.

In the case of intra-eNB handover (Intra-eNB HO), measured values and calculated values used for the scheduling process are not transferred to a Target eNB (eNB of the handover destination).

In step S732, an Average Data Rate is measured. The Average Data Rate is calculated using the following equation ([Equation 15]).

$$\overline{R}_{n,k} = R_{n,k}(N_{n,k}=1)$$

$$\overline{R}_{n,k} = \delta_{n,k} \cdot \overline{R}_{n,k} \cdot (TTI-1) + (1-\delta_{n,k}) \cdot r_{n,k}(N_{n,k}>1) \quad \text{[Equation 15]}$$

where $N_{n,k}(1, 2, \ldots)$ denotes the number of times updating the Average Data Rate. However, in the sub-frame where $N_{n,k}=0$, the following equation ([Equation 16]) is applied.

$$\overline{R}_{n,k} = R_{n,k} \quad \text{[Equation 16]}$$

Further, a forgetting coefficient $\delta_{n,k}$ is calculated as follows.

$$\delta_{n,k} = \min(1 - 1/N_{n,k}, \delta'_{PCn,k})$$

An updating timing of the Average Data Rate is based on "every sub-frame where the amount of data in the UL Buffer is not zero (0) for each logical channel group". Further, $r_{n,k}$ is calculated as "a Payload size supposed to be transmitted from the user equipment terminal (UE)". It should be noted that $r_{n,k}$ is calculated both when the Uplink Shared Channel is initially transmitted in the corresponding sub-frame and when the Uplink Shared Channel is retransmitted in the corresponding sub-frame. Namely the calculation of the Average Data Rate is performed based on any of the following operations in the sub-frame when the Average Data Rate is to be updated (the sub-frame where the amount of data in the UL Buffer of the logical channel group #k is not zero).

1) For a user equipment terminal (UE) that transmits data, the Average Data Rate is calculated assuming that:

$r_{n,LCG1} = \min(\text{Payload size}, UL\_Buffer_{n,LCG1})$;

$r_{n,LCG2} = \max(0, \min(\text{Payload size} - r_{n,LCG1}, UL\_Buffer_{n,LCG2}))$;

$r_{n,LCG3} = \max(0, \min(\text{Payload size} - r_{n,LCG1} - r_{n,LCG2}, UL\_Buffer_{n,LCG3}))$; and $r_{n,LCG4} = \max(0, \min(\text{Payload size} - r_{n,LCG1} - r_{n,LCG2} - r_{n,LCG3}, UL\_Buffer_{n,LCG4}))$.

The Payload size is a value specified by the UL Scheduling Grant.

2) For a user equipment terminal (UE) that has not transmitted data, the Average Data Rate is calculated assuming "$r_{n,k}=0$".

As described above, the Average Data Rate is calculated based on the data size ($r_{n,k}$) of each logical channel group, which is estimated from the amount of data (Buffer$_{n,k}$) in the buffer for each logical channel group, assuming that the user equipment terminal (UE) preferentially maps logical channels belonging to a higher logical channel group to the MAC PDU (UL-SCH).

The amount of data in the UL Buffer is defined as follows. The amount of data UL_Buffer$_{n,k}$ in the UL Buffer for a logical channel group #k of the user equipment terminal (UE) #n is calculated as follows.

[Equation 17]

$$UL\_Buffer_{n,k} = Buffer_{n,k}^{(BSR)} - \sum_j Size_{n,k}^{(CRC:OK)}(j).$$

where Buffer$_{n,k}^{(BSR)}$ denotes the amount of data in the buffer for the logical channel group #k of the user equipment terminal (UE) #n, which is calculated based on the Buffer Status Report reported from the user equipment terminal (UE).

$$\sum_j Size_{n,k}^{(CRC:OK)}(j)$$

denotes the sum of data sizes for the logical channel group #k of the user equipment terminal (UE) #n, which has been included in the UL-SCH where the CRC result is OK since the timing of making the Buffer Status Report (until the current timing).

Namely, the base station apparatus calculates the amount of data in the buffer of the user equipment terminal based on both information about the amount of data in the buffer (Buffer Status Report (BSR)) reported from the user equipment terminal and the amount of data which has been received from the user equipment terminal since the base station apparatus has received the information.

Next, in step S734, $N_{Scheduling}$ indicating the number of user equipment terminals (UEs) for which the scheduling coefficient is calculated is incremented by one. In step S736, a value of "n" indicating the index of the user equipment terminal (UE) is incremented by one.

Next, in step S738, it is determined whether the value of "n" is less than or equal to N. When it is determined that the value of "n" is less than or equal to N, the process goes back to step S702.

On the other hand, when it is determined that the value of "n" is greater than N, the process goes to step S740 in which UE Selection is performed. In this step, the user equipment terminal (UE) to which radio resources are to be allocated according to dynamic scheduling (only for initial transmission) is selected in the corresponding sub-frame.

First, according to the following equation, the number of user equipment terminals (UEs) $N_{UL\text{-}SCH}$ to which radio resources are to be allocated according to dynamic scheduling is calculated. $N_{Scheduling}$ denotes the number of user equipment terminals (UEs) for which the scheduling coefficient is calculated (see step S732 in FIG. 7B). $N_{retransmission}$ denotes the number of user equipment terminals (UEs) which perform retransmission in the corresponding sub-frame (see FIG. 7B).

$$N_{UL\text{-}SCH,tmp} = \min(N_{Scheduling}, N_{ULMAX} - N_{retransmisson})$$

min(x, y) denotes a function which returns a smaller value among arguments "x" and "y".

Next, top $N_{UL\text{-}SCH,tmp}$ "user equipment terminals (UEs) to which radio resources are to be allocated according to dynamic scheduling (only for initial transmission)" are selected in descending order of the scheduling coefficients calculated in step S732 for each Scheduling priority group in the logical channel group with the highest priority level. As used herein, the Scheduling priority group refers to a group prioritized in the scheduling process and a scheduling priority group to which the logical channel group is to belong is defined with respect to each logical channel group.

Namely, the base station apparatus 200 selects "user equipment terminals (UEs) to which radio resources are to be allocated according to dynamic scheduling (only for initial transmission)"

High (1st)→High (2nd)→ . . . →Middle (1st)→Middle (2nd)→ . . . →Low (1st)→Low (2nd)→ . . . .

In this example, the Scheduling priority group has three types, High, Middle, and Low. However, for example, four more types of Scheduling priority groups may be defined or two or less types of Scheduling priority groups may be defined.

As described above, it may become possible to calculate the scheduling coefficient with respect to each user equipment terminal that is determined to be capable of initial transmission, by performing a loop process with respect to "n" which is an index of the user equipment terminals (UE index). Further, the radio resources may be allocated to the user equipment terminal having a greater calculated scheduling coefficient value, and thereby it may become possible to determine the user equipment terminals to which the radio resources (Uplink Shared Channel) are to be allocated based on a priority level of data; uplink radio quality; a time duration during which the shared channel (RBs for the shared channel) is not allocated; whether the base station apparatus receives the Scheduling request; an average transmission rate; or a target transmission rate.

Next, Uplink TFR Selection (UL TFR Selection) performed in step S208 is described with reference to FIG. 8.

FIG. 8 shows a procedure of UL TFR Selection. According to this procedure, the base station apparatus 200 reserves radio resources (RBs) for the Physical Random Access Channel (PRACH), reserves prohibited radio resources (RBs) or guard RBs, reserves radio resources (RBs) for the UL-SCH to which persistent scheduling is applied, and then determines a transmission format for the UL-SCH to which dynamic scheduling is applied and allocates radio resources for the UL-SCH to which dynamic scheduling is applied (including for both initial transmission and retransmission).

In step S802, resource block allocation for the Physical Random Access Channel (PRACH) and the Physical Uplink Control Channel (PUCCH) to be frequency-multiplexed with the Physical Uplink Shared Channel (PUSCH) (RB allocation for PRACH and PUCCH) is performed. In this step, radio resources are allocated to the Random Access Channel (RACH) and the Physical Uplink Control Channel (PUCCH) before radio resources are allocated to the shared channel.

Specifically, when a RACH preamble is transmitted in the corresponding sub-frame, radio resources (RBs) for the PRACH and $N_{RACH}$ RBs on both sides of the PRACH are reserved (6+2*$N_{RACH}$ RBs are reserved in total). In other words, the radio resources (RBs) for the PRACH and $N_{RACH}$ RBs on both sides of the PRACH (6+2*$N_{RACH}$ RBs in total) are excluded from candidates for RBs to be allocated to the UL-SCH to which dynamic scheduling is applied. For example, $N_{RACH}$ is a value designated via the external input interface (I/F). For example, $N_{RACH}$ is selected from 0, 1, 2, and 3.

The PRACH preamble corresponds to a Message-1 in the random access procedure. The number of resource blocks in which the PRACH preamble is transmitted is equal to six (6).

In addition, radio resources (RBs) for the Physical Uplink Control Channel (PUCCH) are reserved. In other words, the radio resources (RBs) to be allocated to the Physical Uplink Control Channel (PUCCH) are excluded from candidates for RBs to be allocated to the UL-SCH to which dynamic scheduling is applied.

In step S804, RB allocation for Guard RBs is performed. When the system is frequency-adjacent (adjacent in the frequency direction) to a heterogeneous radio communication system (WCDMA system), for example, radio resources other than the resource placed at the end of the system bandwidth are allocated.

Specifically, Guard RBs are reserved. In other words, the Guard RBs are excluded from candidates for RBs to be allocated to the UL-SCH to which dynamic scheduling is applied.

In this example, the heterogeneous radio communication system is the WCDMA system. Alternatively, the heterogeneous radio communication system may be a GSM system, a CDMA-2000 system, a PHS system, or the like.

The Guard RBs are implemented as guard bands for the purpose of reducing adjacent channel interference with a frequency-adjacent system. Two sets of Guard RBs may be reserved for both ends of adjacent systems. It should be noted that the Physical Uplink Control Channel (PUCCH) is mapped to the end of the system band regardless of the presence or absence of the Guard RBs.

Alternatively, large resources for the PUCCH may be reserved, and thereby interference with the heterogeneous radio communication systems can be reduced. Specifically, the base station apparatus may not allocate frequency resources at the end of system bands to the Uplink Shared Channel (UL-SCH), and thereby interference with the heterogeneous radio communication systems can be reduced.

In step S806, RB allocation for Persistent Scheduling is performed. In this step, allocation according to persistent scheduling is performed before allocation according to dynamic scheduling is performed.

Specifically, radio resources (RBs) for the persistent resources, which are reserved in step 705, are reserved. Further, with regard to the user equipment terminal to which persistent resources are to be allocated and whose data are to be transmitted, which is determined in step S703, radio resources (RBs) are reserved. In addition, with regard to the Uplink Shared Channel (UL-SCH) to which persistent scheduling is applied for retransmission, radio resources may be reserved.

When persistent resources are allocated in the corresponding sub-frame to the "user equipment terminal (UE) to which radio resources are to be allocated according to dynamic scheduling (only for initial transmission)", the persistent resources are reserved. The RBs corresponding to the persistent resources are not used for UL TFR Selection for the UL-SCH to which dynamic scheduling is applied. In this manner, even when radio resources are to be allocated according to dynamic scheduling to the user equipment terminal (UE) to which persistent resources are allocated, the persistent resources are reserved, and thereby the collision can be avoided among uplink signals which are transmitted when the UL Scheduling Grant for dynamic scheduling is not successfully received by the user equipment terminal (UE).

With reference to FIGS. 9 and 10, an effect of reserving persistent resources when radio resources are to be allocated according to dynamic scheduling to the user equipment terminal (UE) to which the persistent resources are allocated is described below. In FIGS. 9 and 10, two user equipment terminals (UE #A and UE #B) are used. Persistent resources are allocated to UE #A in the corresponding sub-frame and resources are allocated according to dynamic scheduling to UE #A and UE #B.

In FIG. 9 (1), persistent resources for UE #A are released and radio resources are allocated to UE #A and UE #B. In this case, radio resources allocated to UE #B according to dynamic scheduling may overlap the persistent resources for UE #A, for example. When UE #A cannot successfully receive the UL Scheduling Grant for dynamic scheduling, UE #A transmits the UL-SCH using the persistent resources. As a result, the UL-SCH for UE #A may conflict with the UL-SCH for UE #B a shown in FIG. 10 (1).

On the other hand, in FIG. 9 (2), persistent resources for UE #A are reserved and radio resources are allocated to UE #A and UE #B. In this case, radio resources allocated to UE #B according to dynamic scheduling do not overlap the persistent resources for UE #A, for example. When UE #A cannot successfully receive the UL Scheduling Grant for dynamic scheduling, UE #A transmits the UL-SCH using the persistent resources. In this case, the UL-SCH for UE #A does not conflict with the UL-SCH for UE #B a shown in FIG. 10 (2).

In this example, radio resources refer to frequency resources, for example.

In step S806, when the base station cannot allocate to the user equipment terminal resource blocks for the Uplink Shared Channel (UL-SCH) to which persistent scheduling is applied for retransmission, the base station may transmit the ACK via the PHICH. In this case, the ACK is used to temporarily stop retransmission of the Uplink Shared Channel (UL-SCH) to which persistent scheduling is applied.

In step S808, resource block allocation for the Message-3 in the random access procedure (RB allocation for Message-3 (RACH)) is performed. In this step, radio resources are allocated to the Message-3(s) in the random access procedure before radio resources are allocated to the Uplink Shared Channel (UL-SCH) according to dynamic scheduling.

Radio resources (RBs) for the Message-3s in the random access procedure are reserved. Specifically, radio resources (RBs) for the Message-3s in the random access procedure (including for both initial transmission and retransmission) are excluded from candidates for RBs to be allocated to the UL-SCH to which dynamic scheduling is applied.

In the following descriptions, the Message-3s in the random access procedure are merely referred to as Message-3s.

The RB allocation for the Message-3s for initial transmission is performed according to the following five-step procedure. The RB allocation for retransmission is the same as the RB allocation for initial transmission. The RB allocation to the Message-3s for retransmission may be considered as the RB allocation for initial transmission.

(1) It is determined whether there are available RBs to be allocated to the Message-3s. When there are available RBs to be allocated to the Message-3s, next step (2) is performed. Otherwise, this process comes to an end. The "available RBs to be allocated to the Message-3s" correspond to RBs other than the RBs allocated to the Physical Random Access Channel (PRACH) and the Physical Uplink Control Channel (PUCCH), the Guard RBs, and the RBs allocated to the UL-SCH to which persistent scheduling is applied.

(2) Message-3s to be transmitted in the corresponding sub-frame are arranged in ascending order of quality. The order of plural Message-3s with the same quality is arbitrarily determined. The Message-3 with lowest quality is indexed as #0, and thereby the Message-3s are indexed as #0, #1, #2, #3, . . . . . When only one type of quality is used, the order of plural Message-3s is arbitrarily determined.

(3) The following process is performed according to a Hopping mode.

The Hopping mode is a parameter designated via the external input interface (I/F).

If the Hopping mode is zero (Hopping mode=0), the base station apparatus generates Message-3 sets, each of which includes a pair of two Message-3s selected on a two-by-two basis from the beginning of Message-3s in the order of #0, #1, #2, #3, . . . . The Message-3 sets are indexed as #a, #b, #c, . . . (the Message-3 set #a includes the Message-3s #0 and #1, the Message-3 set #b includes the Message-3s #2 and #3, and so on). When the number of Message-3s is odd-numbered, the last Message-3 constitutes one Message-3 set.

The base station apparatus allocates "RBs which have reflective symmetry at the center of the system band" to the Message 3 sets in the order of #a, #b, #c, . . . . Specifically, the base station apparatus allocates RBs to the Message-3 sets in the order of #a, #b, #c, . . . beginning from the ends of the system band. The number of RBs allocated to the Message-3s is determined based on quality information. For example, when the quality information indicates "high quality", two RBs are allocated. For example, when the quality information indicates "low quality", four RBs are allocated. Alternatively, the number of RBs may be determined regardless of quality information. For example, this quality information is included in the Message-1 in the random access procedure.

When the number of RBs in one Message-3 in a particular Message-3 set is different from the number of RBs in the other Message-3 in the particular Message-3 set, the base station apparatus uses a larger number of RBs to allocate the "RBs which have reflective symmetry at the center of the system band".

The base station apparatus 200 may notify the user equipment terminal that the Message-3s are transmitted with hopping, as information included in the Uplink Scheduling Grant to be mapped to the Physical Downlink Control Channel (PDCCH), for example.

The base station apparatus does not allocate RBs which are placed outside the RBs allocated to the Message-3s to the UL-SCH to which dynamic scheduling is applied. In addition, when the number of Message-3s is odd-numbered, the base station apparatus does not allocate the RBs used for transmitting the last Message-3 to the UL-SCH to which dynamic scheduling is applied.

In this example, frequency resources (RBs) after hopping are the RBs which have reflective symmetry at the center of the system band. Alternatively, frequency resources (RBs) after hopping may be RBs which are shifted from the original RBs by a half of the system bandwidth.

Otherwise (if the Hopping mode is not zero), the base station apparatus allocates RBs to Message-3s as follows. The number of RBs allocated to the Message-3s is determined based on quality information. For example, when the quality information indicates "high quality", two RBs are allocated. For example, when the quality information indicates "low quality", four RBs are allocated. Alternatively, the number of RBs may be determined regardless of quality information. For example, this quality information is included in the Message-1 in the random access procedure.

0: #0 is allocated to the RB with the lowest frequency among available RBs to be allocated to the Message-3s;

1: #1 is allocated to the RB with the highest frequency among available RBs to be allocated to the Message-3s;

2: #2 is allocated to the RB with the next lowest frequency among available RBs to be allocated to the Message-3s;

3: #3 is allocated to the RB with the next highest frequency among available RBs to be allocated to the Message-3s; and so on.

(This process continues until RBs are allocated to all the Message-3s.)

(4) The modulation scheme for all the Message-3s is determined as QPSK.

(5) Transmission power of the Uplink Scheduling Grant for each Message-3 is determined based on quality information. For example, when the quality information indicates "high quality", transmission power is determined as low transmission power. For example, when the quality information indicates "low quality", transmission power is determined as high transmission power. Alternatively, transmission power may be determined regardless of quality information. For example, this quality information is included in the Message-1 in the random access procedure.

When no more RBs can be allocated to the Message-3s during this process, the process comes to an end. The base station apparatus does not transmit a Message-2 (RACH response) in the random access procedure to the user equipment terminal (UE) which has a Message-3 to which no RB is allocated. Alternatively, the base station apparatus may transmit the Message-2 (RACH response) in the random access procedure in the next sub-frame.

In step S809, Setting of RB allocation mode is performed. In this step, the RB allocation mode is determined. The UL RB allocation mode shown in Table 7 is a parameter designated via the external input interface (I/F). The loop process with respect to the index "j" composed of steps S812, S810, S814, S816, and S818 is executed based on the selection order of user equipment terminals (UEs) specified by the UL RB allocation mode.

TABLE 7

| Mode | UL RB allocation mode Definition |
|---|---|
| Mode-0 | This is a normal RB allocation mode. In this mode, the following selection order of user equipment terminals (UEs) is used. (1st criterion) |
|  | User equipment terminals (UEs) for retransmission are selected. Among these user equipment terminals (UEs), a higher selection order is assigned to a user equipment terminal (UE) with a longer elapsed time from initial transmission. When the elapsed time is the same for plural user equipment terminals (UEs), the selection order is arbitrary determined. (2nd criterion) |
|  | User equipment terminals for initial transmission are selected. Among these user equipment terminals (UEs), a higher selection order is assigned to the "candidates for the user equipment terminals (UEs) to which radio resources are to be allocated according to dynamic scheduling" determined in Section 4.1.11. |
| Mode-1 | This is a RB allocation mode in which RBs at the end of the system band are allocated to user equipment terminals with low path loss (Pathloss). (1st criterion) |
|  | User equipment terminals for retransmission are selected. Among these user equipment terminals (UEs), a higher selection order is assigned to a user equipment terminal (UE) with lower path loss. (2nd criterion) |
|  | User equipment terminals for initial transmission are selected. Among these user equipment terminals (UEs), a higher selection order is assigned to a user equipment terminal (UE) with lower path loss. |
| Mode-2 | This is a RB allocation mode in which RBs with low frequency are allocated to user equipment terminals with high path loss (Pathloss). (1st criterion) |
|  | User equipment terminals for retransmission are selected. Among these user equipment terminals (UEs), a higher selection order is assigned to a user equipment terminal (UE) with higher path loss. (2nd criterion) |
|  | User equipment terminals for initial transmission are selected. Among these user equipment terminals (UEs), a higher selection order is assigned to a user equipment terminal (UE) with higher path loss. |
| Mode-3 | This is a RB allocation mode in which RBs with high frequency are allocated to user equipment terminals with high path loss (Pathloss). (1st criterion) |
|  | User equipment terminals for retransmission are selected. Among these user equipment terminals (UEs), a higher selection order is assigned to a user equipment terminal (UE) with higher path loss. |

TABLE 7-continued

UL RB allocation mode

| Mode | Definition |
|---|---|
| | (2nd criterion) |
| | User equipment terminals for initial transmission are selected. Among these user equipment terminals (UEs), a higher selection order is assigned to a user equipment terminal (UE) with higher path loss. |

For example, when the system is frequency-adjacent to a WCDMA system at one end and to an LTE system at the other end, Mode-2 and Mode-3 are selected. Specifically, when the system is frequency-adjacent to the WCDMA system at one end and to the LTE system at the other end, the base station apparatus allocates radio resources (frequency resources) for the shared channel, on the side of the WCDMA system and at the end of the system band, to a user equipment terminal with lower path loss. In addition, the base station apparatus allocates radio resources (frequency resources), on the side of the LTE system and at the end of the system band, to a user equipment terminal with higher path loss.

Since the user equipment terminal with low path loss has low uplink transmission power, interference power affecting the adjacent frequency band is low. Accordingly, radio resources for the shared channel on the side of the WCDMA system, which is more tolerant to interference signals, are allocated to the user equipment terminal with lower path loss, and thereby degradation of properties in the WCDMA system can be reduced.

For example, when the system is frequency-adjacent to WCDMA systems at both ends, Mode-1 is selected. Specifically, the base station apparatus allocates radio resources (frequency resources) for the shared channel, at both ends of the system band, to a user equipment terminal with lower path loss. In addition, the base station apparatus allocates radio resources (frequency resources), at the center of the system band, to a user equipment terminal with higher path loss.

Since the user equipment terminal with low path loss has low uplink transmission power, interference power affecting the adjacent frequency band is low. Accordingly, radio resources for the shared channel at the center of the system band are allocated to the user equipment terminal with higher path loss and radio resources for the shared channel at the end of the system band are allocated to the user equipment terminal with lower path loss, and thereby degradation of properties in the WCDMA system can be reduced.

For example, when the system is frequency-adjacent to LTE systems at both ends, Mode-0 is selected. Specifically, radio resources (frequency resources) are allocated based on reception power or SIR of the reference signal transmitted from the user equipment terminal or the like, as described below.

In this case, radio resources can be allocated based on uplink reception power, and thereby the system capacity can be improved.

For example, when the frequency (frequency resources) used for uplink is different from the frequency (frequency resources) used for downlink, Mode-2 and Mode-3 may be selected. Specifically, radio resources (frequency resources) for the shared channel which are placed at the end of the system band and near the frequency used for downlink are allocated to a user equipment terminal with lower path loss and radio resources (frequency resources) for the shared channel which are placed at the end of the system band and far from the frequency used for downlink are allocated to the user equipment terminal with higher path loss.

Since the user equipment terminal with low path loss has low uplink transmission power, interference power from the transmitter in the user equipment terminal (i.e., the uplink frequency band) to the receiver in the user equipment terminal (i.e., the downlink frequency band) is low. Accordingly, radio resources for the Uplink Shared Channel near the downlink frequency band are allocated to the user equipment terminal with lower transmission power, and thereby interference power from the transmitter to the receiver in the user equipment terminal can be reduced. As a result, downlink reception properties can be improved.

Interference power from the transmitter to the receiver becomes higher when the uplink transmission bandwidth becomes wider. Accordingly, the base station apparatus 200 may set an upper limit of the transmission bandwidth for the Uplink Shared Channel (UL-SCH), and may allocate frequency resources for the Uplink Shared Channel such that the frequency bandwidth for the Uplink Shared Channel is less than or equal to the upper limit. According to this process, interference power from the transmitter to the receiver in the user equipment terminal can be reduced. As a result, downlink reception properties can be improved.

Further, interference power from the transmitter to the receiver depends on the frequency bands or the system bandwidth used in the mobile communication system, the total uplink or downlink bandwidth (pass bandwidth) assigned to the frequency bands, or the separation between the uplink frequency and the downlink frequency. Accordingly, Mode-2 or Mode-3 may be selected based on the frequency bands or the system bandwidth, the total uplink or downlink bandwidth (pass bandwidth) assigned to the frequency bands, or the separation between the uplink frequency and the downlink frequency. In addition, the upper limit of the transmission bandwidth for the Uplink Shared Channel may be determined based on the frequency bands or the system bandwidth, the total uplink or downlink bandwidth (pass bandwidth) assigned to the frequency bands, or the separation between the uplink frequency and the downlink frequency. For example, the frequency bands may be "UTRA FDD frequency bands" defined in TS 25.101.

In step S812, the value of "j" is set equal to one (j=1).

In step S810, RB Remaining Check is performed. It is determined whether there are available RBs to be allocated to the UL-SCH to which dynamic scheduling is applied. When there are available RBs to be allocated to the UL-SCH, the process of the RB Remaining Check returns OK. Otherwise, the process of the RB Remaining Check returns NG (failed).

When the result of the RB Remaining Check is determined as OK, the process goes to step S814 in which UL TFR Selection is performed.

When the result of the RB Remaining Check is determined as NG, the process of the UL TFR Selection in step S208 comes to an end.

When the result of the RB Remaining Check is determined as NG, the ACK may be transmitted via the PHICH to the user equipment terminal (UE) to which the UL Scheduling Grant cannot be transmitted and which performs retransmission. With regard to the user equipment terminal which has transmitted the ACK (HARQ Process), when the maximum number of retransmission times has not been reached, it is assumed that the user equipment terminal (UE) has "data to be retransmitted" in the next transmission timing according to Synchronous HARQ. In this case, the ACK means that retransmission of the Uplink Shared Channel (UL-SCH) is temporarily stopped. In the following, the effect of transmitting the ACK via the PHICH to the user equipment terminal (UE) to which the UL Scheduling Grant cannot be transmitted and which performs retransmission is described below. When the user equipment terminal (UE) cannot successfully receive the Uplink Scheduling Grant for retransmission of the Uplink Shared Channel (UL-SCH), the user equipment terminal follows information (i.e., ACK/NACK) transmitted via the PHICH. When the result of the RB Remaining Check is determined as NG, the base station apparatus 200 does not transmit the Uplink Scheduling Grant. As a result, the user equipment terminal (UE) follows information (i.e., ACK/NACK) transmitted via the PHICH. When the information transmitted via the PHICH is the ACK, the user equipment terminal (UE) stops retransmission of the UL-SCH. Otherwise (in the case of the NACK), the user equipment terminal (UE) retransmits the UL-SCH using the same frequency resources as the resources used for previous transmission. In this case, when the base station apparatus instructs another user equipment terminal (UE) to transmit the UL-SCH with the corresponding frequency resources used for the previous transmission, the Uplink Shared Channel (UL-SCH) for retransmission by the user equipment terminal (UE) collides with the Uplink Shared Channel (UL-SCH) for transmission by the other user equipment terminal (UE). As a result, transmission properties are degraded. When the base station apparatus 200 transmits the ACK via the PHICH in the case where the result of the RB Remaining Check is determined as NG, degradation of transmission properties can be avoided.

The "available RBs to be allocated to the UL-SCH to which dynamic scheduling is applied" correspond to RBs other than the RBs allocated to the Physical Random Access Channel (PRACH) and the Physical Uplink Control Channel (PUCCH), the Guard RBs, the RBs allocated to the UL-SCH to which persistent scheduling is applied, the RBs allocated to the Message-3 in the random access procedure, and the RBs allocated to the UL-SCH to which dynamic scheduling is applied after TFR Selection (including for both retransmission and initial transmission). The total number of "available RBs to be allocated to the UL-SCH to which dynamic scheduling is applied (including for both retransmission and transmission" is defined as $N_{remain}^{(RB)}$.

The RBs allocated to the UL-SCH to which dynamic scheduling is applied after TFR Selection (including for both retransmission and initial transmission) correspond to the RBs determined in step S814, when the value of "j" is less than the current value in the loop process with respect to the index "j" composed of steps S810, S814, S816, and S818.

In step S814, UL TFR Selection is performed. The base station apparatus determines the transport format for the "user equipment terminal (UE) to which radio resources are to be allocated according to dynamic scheduling (including for both initial transmission and retransmission)", which is determined in step S204, and allocates RBs.

Figure 11A:
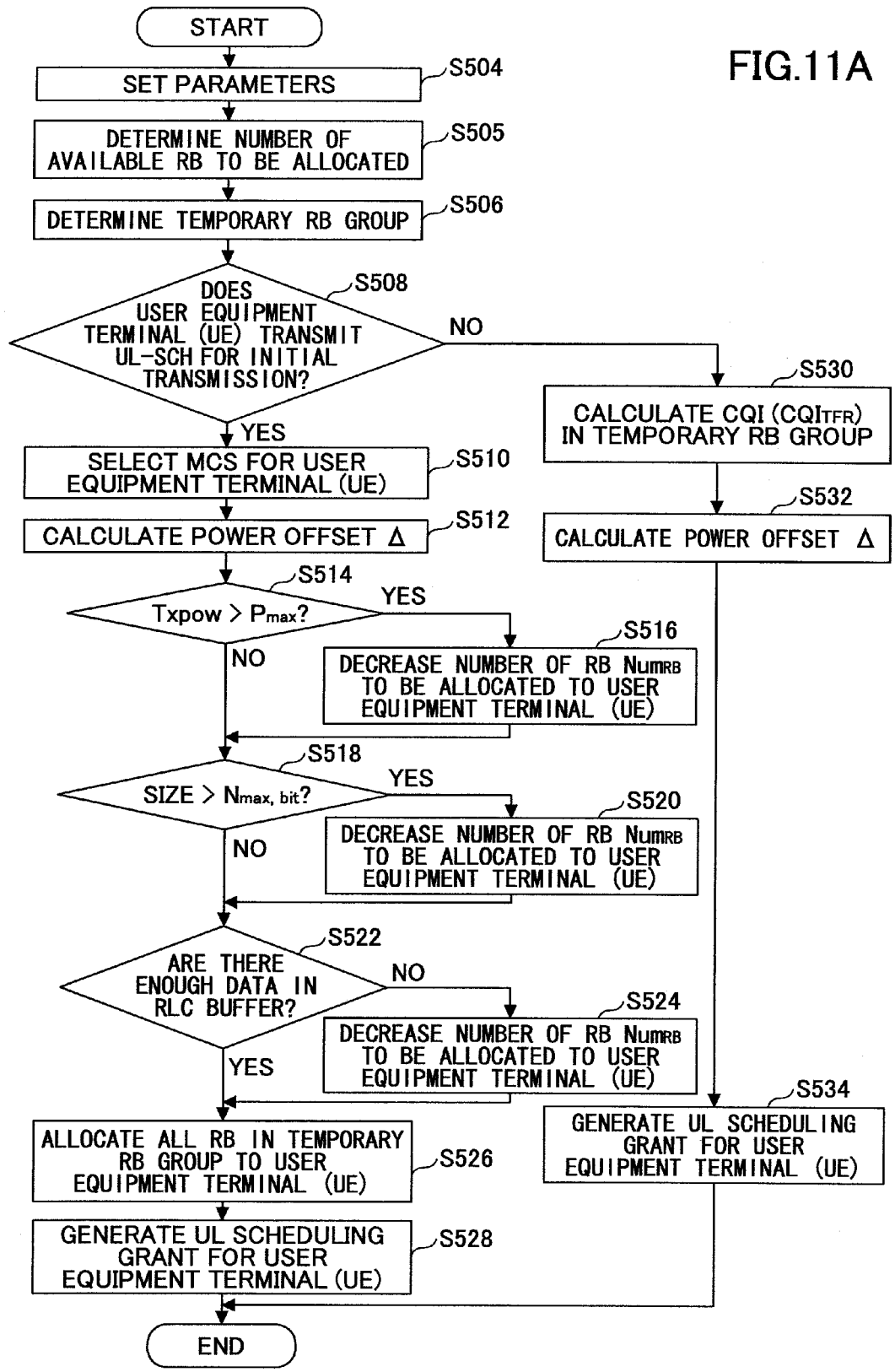
FIG. 11A is a flowchart of a process of UL TFR selection.

With reference to FIG. 11A, Uplink TFR Selection in step S814 is described below. According to the following process, RBs are allocated to a $j^{th}$ "user equipment terminal (UE) to which radio resources are to be allocated according to dynamic scheduling". FIGS. 12A and 12B show examples of TF_Related_table.

As shown in FIGS. 12A and 12B, the TF_Related_table may store the correspondence between radio resources (the number of resource blocks) available for transmission of the Uplink Shared Channel, uplink radio quality information, and a modulation scheme and a data size used for transmission of the Uplink Shared Channel. The base station apparatus may determine the transmission format (the modulation scheme and the data size) used for the Uplink Shared Channel, with reference to the TF_related_table, based on radio quality of the Sounding Reference Signal transmitted from the user equipment terminal (radio quality information calculated based on SIR, for example) and radio resources (the number of resource blocks) available for transmission of the Uplink Shared Channel. The data size is determined to be a maximum value which satisfies a predetermined error rate, when uplink radio quality information and frequency resources available for the shared channel are fixed. The TF_Related_table may store, as the transmission format, the data size used for transmission of the Uplink Shared Channel, a modulation scheme used for the Uplink Shared Channel, and the amount of frequency resources used for the Uplink Shared Channel. It should be noted that FIGS. 12A and 12B merely shows example values and values other than those shown in FIGS. 12A and 12B may be used. In addition, although FIGS. 12A and 12B show the case where the number of RBs is one (the number of RBs=1) and the case where the number of RBs is two (the number of RBs=2), respectively, a similar table can be used in the case where the number of RBs is greater than or equal to three.

<Process>

In step S504, the following parameters are provided.

$N_{remain}^{(RB)}$: the number of Remaining RBs $N_{capability}$: the maximum number of RBs $N_{max,bit}$: the maximum data size (payload size) which is determined based on the UE category $N_{capability}$ may be set as an internal parameter, may be set as a parameter designated via the upper node, or may be set based on information included in the UE capability reported from the user equipment terminal (UE). Using $N_{capability}$, the upper limit of frequency resources used for uplink transmission from the user equipment terminal (UE) can be provided.

Next, in step S505, the number of available RBs $N_{allocated}^{(RB)}$ to be allocated to the user equipment terminal (UE) is calculated.

$$N_{remain}^{(UE)} = N_{UL\text{-}SCH} - j + 1$$

[Equation 18]

$$N_{allocated} = \min\left(\left\lceil\frac{N_{remain}^{(RB)}}{N_{remain}^{(UE)}}\right\rceil, N_{capability}\right)$$

It is assumed that available RBs to be allocated to the $j^{th}$ "user equipment terminal (UE) to which radio resources are to be allocated according to dynamic scheduling" are continuous. When the RBs are not continuous, the "available RBs to be allocated" are determined as a set of RBs which has the maximum number of available RBs to be allocated among continuous available RBs to be allocated. When there are plural sets of RBs which have the maximum number of available RBs to be allocated, the "RBs to be allocated" are determined as a set of RBs with a lower frequency.

When the number of subcarriers corresponding to $N_{allocated}$ includes factors other than 2, 3, and 5, $N_{allocated}$ is determined as a maximum integer among integers which include only factors of 2, 3, 5 for the number of subcarriers and which are less than $N_{allocated}$.

Alternatively, $N_{allocated}^{(RB)}$ may be calculated according to the following approach rather than the above-mentioned equation ([Equation 18]).

When path loss between the user equipment terminal (UE) and the base station apparatus 200 is greater than or equal to a predetermined threshold Threshold$_{PL,UL}$, $N_{allocated}^{(RB)}$ may be calculated according to the following equation ([Equation 19]).

[Equation 19]

$$N_{allocated} = \min\left(\left\lceil \frac{N_{remain}^{(RB)}}{N_{remain}^{(UE)}} \right\rceil, N_{UL,HighPL}\right)$$

Otherwise, $N_{allocated}^{(RB)}$ may be calculated according to the following equation ([Equation 20]).

[Equation 20]

$$N_{allocated} = \min\left(\left\lceil \frac{N_{remain}^{(RB)}}{N_{remain}^{(UE)}} \right\rceil, N_{UL,LowPL}\right)$$

Typically, $N_{UL,HighPL}$ is less than $N_{UL,LowPL}$ ($N_{UL,HighPL} < N_{UL,LowPL}$). The path loss may be calculated based on UPH (UE Power Headroom) reported from the user equipment terminal (UE) and the received level of the Uplink Shared Channel (UL-SCH) or the Sounding Reference Signal. The path loss calculated based on UPH (UE Power Headroom) reported from the user equipment terminal (UE) and the received level of the Uplink Shared Channel (UL-SCH) or the Sounding Reference Signal corresponds to uplink path loss. On the other hand, path loss reported from the user equipment terminal corresponds to downlink path loss.

Figure 13A:
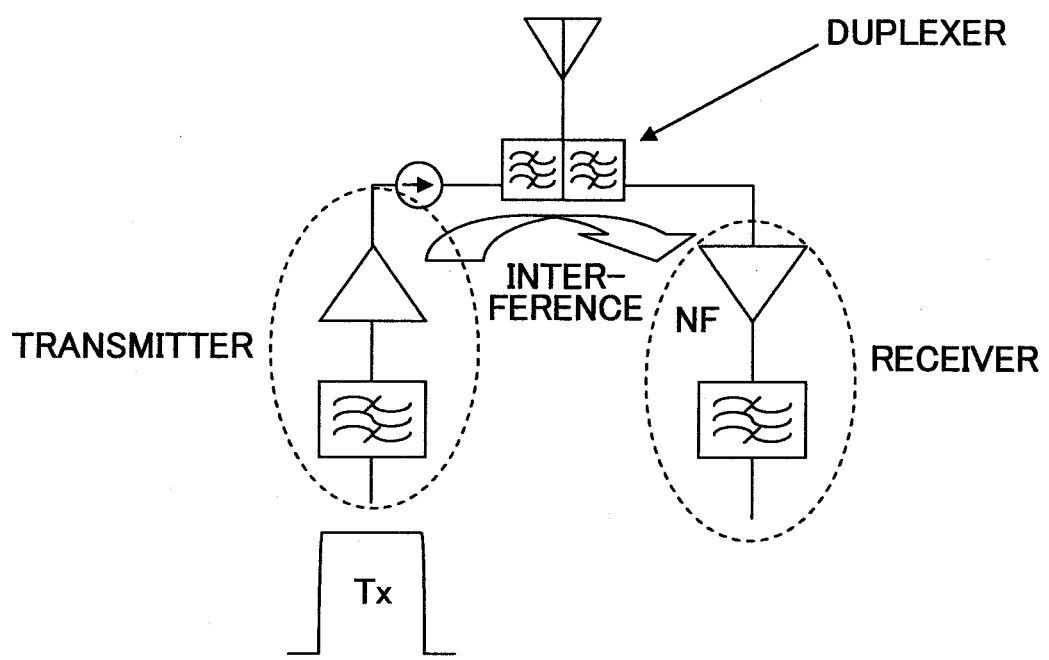
FIG. 13A is a schematic diagram showing interference in a user equipment terminal.

The effect of calculating $N_{allocated}^{(RB)}$ based on the threshold Threshold$_{PL,UL}$ and path loss between the user equipment terminal (UE) and the base station apparatus 200 is described below. For example, in an LTE system employing the FDD (Frequency Division Duplexing) scheme, the uplink transmission signal in the user equipment terminal (UE) may become an interference signal to the downlink reception signal. As a result, quality of the downlink reception signal may be degraded. Generally, the user equipment terminal (UE) includes a Duplexer, which prevents the leakage of the uplink transmission signal into the unit for receiving a downlink signal and performing the demodulation and decoding. However, the leakage cannot be fully prevented. FIG. 13A schematically shows the mechanism of interference in the user equipment terminal (UE). As shown in FIG. 13A, the transmission signal generated in the transmitter is leaked into the receiver without power of the transmission signal being fully reduced in the Duplexer, and the leaked transmission signal may become an interference signal which degrades quality of the reception signal.

The more separated the difference is between the frequency of the uplink transmission signal and the frequency of the downlink reception signal, or the lower the transmission power of the uplink transmission signal is, the smaller the leakage becomes. Further the narrower the uplink transmission bandwidth is, the smaller the leakage becomes. In uplink, the higher the path loss is, the higher the transmission power becomes. Therefore, when path loss is higher, by making the uplink transmission bandwidth narrower, it may become possible to reduce interference of the uplink transmission signal with the downlink reception signal. FIG. 13B schematically shows the effect caused by the interference of the uplink transmission signal with the downlink reception signal. FIG. 13B shows a transmission signal from the user equipment terminal (UE1) with higher path loss and a transmission signal from the user equipment terminal (UE2) with lower path loss. In other words, transmission power of UE1 is high and transmission power of UE2 is low.

In order to further reduce interference of the uplink transmission signal with the downlink reception signal, the RB allocation mode in step S809 is set to Mode-2. In the case of Mode-2, a frequency resource with a lower frequency is allocated to a user equipment terminal (UE) with a higher path loss. As a result, the higher transmission power of the user equipment terminal (UE), the more separated is the difference between the frequency of the uplink transmission signal and the frequency of the downlink reception signal, and thereby interference of the uplink transmission signal with the downlink reception signal can be reduced. For example, in FIG. 13B, since the transmission bandwidth of UE1 is narrow while transmission power of UE1 is high, interference with the downlink band can be reduced. Further, in FIG. 13B, since transmission power of UE2 is low while the transmission bandwidth of UE2 is wide, interference with the downlink band can be reduced.

In this example, it is assumed that the uplink frequency is lower than the downlink frequency. When the uplink frequency is higher than the downlink frequency, Mode-3 rather than Mode-2 may be selected as the RB allocation mode in step S809.

In step S506, a Temporary RB group is determined.

The process of determining the Temporary RB group for each UL RB allocation mode is described below.

(1) If the UL RB allocation mode=Mode-0;

This process is described with reference to FIG. 14.

In step S602, it is determined whether the transmission type is High Fd. The transmission type is calculated in step S728.

When the transmission type is High Fd, RBs are allocated to the user equipment terminal (UE) among the "available RBs to be allocated to the UL-SCH to which dynamic scheduling (hereinafter called "available RBs to be allocated")", which are determined in step S810, beginning from the lowest frequency or the highest frequency until the number of RBs to be allocated to the user equipment terminal (UE) is greater than or equal to $N_{allocated}$. In this case, hopping is not used.

Specifically, in step S604, it is determined that transmission of the UL-SCH in the corresponding sub-frame is initial transmission. When transmission of the UL-SCH is determined as initial transmission (step S604: YES), in step S606, the RB with the highest frequency or the lowest frequency which is far from the center of the system band is allocated among available RBs to be allocated. In other words, when the RB with the lowest frequency is far from the center of the system band, RBs are allocated to the user equipment terminal (UE) beginning from the lowest frequency until the number of RBs to be allocated to the user equipment terminal (UE) is greater than or equal to $N_{allocated}$. On the other hand, when the RB with the highest frequency is far from the center of the system band, RBs are allocated to the user equipment terminal (UE) beginning from the highest frequency until the number of RBs to be allocated to the user equipment terminal (UE) is greater than or equal to $N_{allocated}$. When the RB with the highest frequency and the RB with the lowest frequency have the same distance from the center of the system band, the RB with the lowest frequency may be allocated.

On the other hand, when transmission of the UL-SCH in the corresponding sub-frame is determined as retransmission (step S604: NO), the following process is performed. When the RB with the highest frequency is allocated for previous HARQ transmission, the RB with the lowest frequency is allocated. When the RB with the lowest frequency is allocated for the previous HARQ transmission, the RB with the highest frequency is allocated (step S608). In other words, when the RB with the highest frequency is allocated for the previous HARQ transmission, RBs are allocated to the user equipment terminal (UE) beginning from the lowest frequency until the number of RBs to be allocated to the user equipment terminal (UE) is greater than or equal to $N_{allocated}$. On the other hand, when the RB with the lowest frequency is allocated for the previous HARQ transmission, RBs are allocated to the user equipment terminal (UE) beginning from the highest frequency until the number of RBs to be allocated to the user equipment terminal (UE) is greater than or equal to $N_{allocated}$.

Alternatively, in step S608, upon determining whether RBs are allocated beginning from the lowest frequency or the highest frequency, the base station apparatus may determine as follows based on whether the RBs include RBs allocated to previous HARQ transmission. $N_{small}$ denotes the number of RBs allocated to the previous HARQ transmission, which are included in a set of RBs when the RBs are allocated beginning from the lowest frequency. $N_{large}$ denotes the number of RBs allocated to the previous HARQ transmission, which are included in a set of RBs when the RBs are allocated beginning from the highest frequency. If $N_{small} > N_{large}$, RBs are allocated beginning from the highest frequency. If $N_{small} \leq N_{large}$, RBs are allocated beginning from the lowest frequency.

In this manner, in the case of a higher fading frequency of the user equipment terminal (UE), i.e., when the user equipment terminal (UE) moves fast, the approach in which RBs are allocated beginning from the lowest frequency and the approach in which RBs are allocated beginning from the highest frequency are switched for each HARQ transmission, and thereby frequency diversity is easily achieved. As a result, transmission properties and the system capacity can be improved.

Specifically, when frequency resources (RBs) are allocated to the shared channel used by plural user equipment terminals beginning from the end of the system bandwidth, the base station apparatus may allocate, to the shared channel used by the user equipment terminals, a frequency resource (RB) which is different from a frequency resource (RB) used for previous transmission among frequency resources (RBs) at both ends of the system bandwidth.

When the transmission type is Low Fd (step S602: NO), the process goes to step S610. When the transmission type is Low Fd, RBs are allocated to the user equipment terminal (UE) among the "available RBs to be allocated to the UL-SCH to which dynamic scheduling is applied (hereinafter called "available RBs to be allocated")", which are determined in step S810, beginning from the lowest frequency or the highest frequency until the number of RBs to be allocated to the user equipment terminal (UE) is greater than or equal to $N_{allocated}$. In this case, hopping is not used. Upon determining whether RBs are allocated beginning from the lowest frequency or the highest frequency, the base station apparatus allocates RBs with higher received SIR of the Sounding RS.

Specifically, the base station apparatus determines RBs as follows.

If $SIR_{estimated}$ in the case where RBs are allocated beginning from the lowest frequency is higher than $SIR_{estimated}$ in the case where RBs are allocated beginning from the highest frequency, RBs are allocated beginning from the lowest frequency.

If $SIR_{estimated}$ in the case where RBs are allocated beginning from the lowest frequency is lower than or equal to $SIR_{estimated}$ in the case where RBs are allocated beginning from the highest frequency, RBs are allocated beginning from the highest frequency.

For example, when the base station apparatus allocates frequency resources (RBs) to the shared channel used by plural user equipment terminals, beginning from the end of the system bandwidth, the base station apparatus may allocate, to the shared channel used by the plural user equipment terminals, a frequency resource (RB) with higher radio quality among frequency resources (RBs) at both ends of the system bandwidth.

This process is used for both initial transmission and retransmission.

In this manner, in the case of a lower fading frequency of the user equipment terminal (UE), i.e., when the user equipment terminal (UE) moves slowly, the approach in which RBs are allocated beginning from the lowest frequency and the approach in which RBs are allocated beginning from the highest frequency are switched based on radio quality, and thereby higher quality transmission is easily achieved. As a result, transmission properties and the system capacity can be improved.

(2) If the UL RB allocation mode==Mode-1;

RBs are allocated to the user equipment terminal (UE) among the "available RBs to be allocated to the UL-SCH to which dynamic scheduling is applied (hereinafter called "available RBs to be allocated")", which are calculated in step S410, beginning from the lowest frequency or the highest frequency until the number of RBs to be allocated to the user equipment terminal (UE) is greater than or equal to $N_{allocated}$. In this case, hopping is not used.

Upon determining whether RBs are allocated beginning from the lowest frequency or the highest frequency, the base station apparatus selects RBs far from the center of the system band. When RBs have the same distance from the center of the system band, the base station apparatus allocates RBs beginning from the lowest frequency.

(3) If the UL RB allocation mode==Mode-2;

RBs are allocated to the user equipment terminal (UE) among the "available RBs to be allocated to the UL-SCH to which dynamic scheduling is applied (hereinafter called "available RBs to be allocated")", which are calculated in step S810, beginning from the lowest frequency until the number of RBs to be allocated to the user equipment terminal (UE) is greater than or equal to $N_{allocated}$. In this case, hopping is not used.

(4) If the UL RB allocation mode is anything other than Mode-0, Mode-1, and Mode-2;

RBs are allocated to the user equipment terminal (UE) among the "available RBs to be allocated to the UL-SCH to which dynamic scheduling is applied (hereinafter called "available RBs to be allocated")", which are calculated in step S810, beginning from the highest frequency until the number of RBs to be allocated to the user equipment terminal (UE) is greater than or equal to $N_{allocated}$. In this case, hopping is not used.

In this process (step S506), a set of RBs "to be allocated to the user equipment terminals (UE)" is called a Temporary RB group.

In the following process, it is assumed that $Num_{RB} = N_{allocated}$.

When the user equipment terminal performs retransmission of the UL-SCH and when the Uplink Scheduling Grant for retransmission is not specified, this process is not performed. Instead, the base station apparatus allocates, to the UL-SCH for retransmission, the same RBs as the RBs used for the previous transmission.

In step S508, the base station apparatus determines whether the user equipment terminal (UE) transmits the UL-SCH for initial transmission. When the user equipment terminal (UE) transmits the UL-SCH for initial transmission (step S508: YES), the process goes to step S510. When the user equipment terminal (UE) does not transmit the UL-SCH for initial transmission (step S508: NO), the process goes to step S530.

In step S510, the base station apparatus selects the MCS for the user equipment terminal (UE). For example, the base station apparatus 200 calculates path loss (Pathloss) between the base station apparatus 200 and the user equipment terminal (UE), and then selects the MCS based on the path loss (Pathloss) referring to the look-up table as shown in FIG. 15. In the following descriptions, the selected MCS is defined as $MCS_{tmp}$. It should be noted that FIG. 15 merely shows example values and values other than those shown in FIG. 15 may be used.

Alternatively, the base station apparatus 200 may select the MCS based on "Pathloss+Sounding SIR−Target SIR" rather than the path loss (Pathloss). The Sounding SIR refers to the received SIR of the Sounding Reference Signal and the Target SIR refers to a target SIR of the Sounding Reference Signal. In this manner, in consideration of the received SIR of the Sounding Reference Signal in addition to the path loss (Pathloss), the base station apparatus can select the MCS in accordance with instantaneous fluctuations of the propagation environment, such as fluctuations by Rayleigh fading.

When the base station apparatus cannot calculate the path loss (Pathloss) for the user equipment terminal (UE) at the start of communications or immediately after handover, $MCS_{tmp}$ may be determined as $MCS_{REF}$ ($MCS_{tmp}=MCS_{REF}$). $MCS_{REF}$ may be stored as internal data in the base station apparatus or may be designated via the external server or the like.

For example, the path loss (Pathloss) may be the path loss (Pathloss) reported from the user equipment terminal (UE). The path loss (Pathloss) is calculated as follows based on transmission power of the downlink reference signal and reception power of the downlink reference signal in the user equipment terminal (UE).

Pathloss=(transmission power of the downlink reference signal)−(reception power of the downlink reference signal)

Alternatively, the path loss (Pathloss) may be calculated based on UPH (UE Power Headroom) reported from the user equipment terminal (UE). In this case, the path loss (Pathloss) is calculated as follows. It is assumed that the UPH is calculated based on transmission power of the PUSCH. It should be noted that reception power of the PUSCH may be reception power of the Demodulation Reference Signal via the PUSCH.

Pathloss=maximum transmission power of the UE−UPH−reception power of the PUSCH

Alternatively, the path loss (Pathloss) may be calculated based on transmission power of the Uplink Shared Channel, which is reported by the user equipment terminal (UE). In this case, the path loss (Pathloss) is calculated as follows.

Pathloss=transmission power of the PUSCH−reception power of the PUSCH

Alternatively, the path loss (Pathloss) may be calculated based on the following equations.

UPH=maximum transmission power of the UE−transmission power of the UE

[Equation 21]

$$PL = \frac{Max\_power - UPH - 10 \cdot \log(B_{data,tmp}) - P_{O\_PUSCH} - \Delta_{MCS}(MCS_{tmp}) + f(i)}{\alpha}$$

where MAX_power is the maximum transmission power of the user equipment terminal (UE) and transmission power of the user equipment terminal (UE) corresponds to Txpow in the following equation ([Equation 22]).

Next, in step S512, power offset to be transmitted to the user equipment terminal (UE) is calculated. Typically, transmission power of the Uplink Shared Channel in the E-UTRA system is calculated according to the following equation (see 3GPP 36.213).

$$P_{PUSCH}(i)=\min\{P_{MAX}, 10\log_{10}(M_{PUSCH}(i))+P_{O\_PUSCH}(j)+\alpha \cdot PL+\Delta_{MCS}(MCS(i))+f(i)\}$$ [Equation 22]

$P_{USCH}(i)$: transmission power of the PUSCH in the subframe #i
$P_{MAX}$: maximum transmission power of the UE
$M_{PUSCH}$: the number of RBs
$P_{O\_PUSCH}$: a parameter specified by the network (NW)
$\alpha$: a parameter specified by the network (NW)
PL: path loss (Pathloss)
$\Delta_{MCS}$: an offset value determined for each MCS
f(i): an offset value for adjustment
f(i)=f(i−1)+Δ

In step S512, the value of Δ is calculated. Specifically, the TPC command (Δ) to be transmitted to the user equipment terminal (UE) by means of the UL Scheduling Grant is calculated. In the following, the offset value to be transmitted to the user equipment terminal (UE) is defined as Δ.

In step S512, the value of Δ is determined by means of the offset based on the priority level of the logical channel group with the highest priority level. The subscript LCG refers to the logical channel group.

$$\Delta=\Delta_{LCG}$$

For example, the base station apparatus 200 increases the value of $\Delta_{LCG}$ for the logical channel group to be transmitted with high quality and with the high priority level, thereby increasing the received SIR. As a result, the error rate can be reduced. In this manner, the base station apparatus 200 can adjust the offset value based on the priority level, the logical channel, or the logical channel group to adjust the error rate.

Next, the value of Δ is adjusted as follows, based on SIR_offset which is calculated according to the offset adjustment process in an outer-loop manner.

$$\Delta=\Delta+SIR\_offset$$

SIR_offset is calculated as follows in the outer-loop manner.

SIR_Offset is adjusted in the outer-loop manner based on both the CRC result of the UL-SCH in which the priority level of the logical channel group with the highest priority level is $Z_{adjust}$ and the following equation. SIR_offset is not adjusted in the outer-loop manner, when the priority level of the logical channel group with the highest priority level is different from $Z_{adjust}$.

[Equation 23]

-continued $$SIR\_offset = \begin{cases} SIR\_offset - \Delta_{adj} \times BLER_{target}^{(LCG_Z)} & \text{Input} = \text{``}ACK\text{''} \\ SIR\_offset - \Delta_{adj} \times (1 - BLER_{target}^{(LCG_Z)}) & \text{Input} = \text{``}Nack\text{''} \\ SIR\_offset & \text{Input} = \text{``}DTX\text{''} \end{cases}$$

This equation is explained below in detail. When the CRC result is the ACK, SIR_offset is slightly decreased based on this equation. In other words, increase in the unnecessary received level can be avoided by decreasing transmission power in the user equipment terminal (UE). On the other hand, when the CRC result is the NACK, SIR_offset is increased based on this equation. In other words, the error rate can be reduced by increasing transmission power in the user equipment terminal (UE) and improving the received SIR. In the case of DTX, since the user equipment terminal (UE) cannot successfully receive the UL Scheduling Grant, SIR_offset is not adjusted. In this manner, uplink transmission power is adjusted based on the ACK or the NACK and the range of increase or decrease for setting transmission power is determined according to the target error rate, and thereby the error rate of the UL-SCH can be brought close to the target error rate.

For example, if a required target error rate $BLER_{target}^{(LCG)}$ =0.1 and $\Delta_{adj}$=0.5, then SIR_offset=SIR_offset−0.05 dB in the case of the ACK and SIR_offset=SIR_offset+0.45 dB in the case of the NACK. After a while, the ratio of the ACK becomes equal to 90% and the ratio of the NACK becomes equal to 10%. As a result, the value of SIR_offset does not change. In this manner, adjusting SIR_offset according to this equation allows the error rate to converge on the target error rate $BLER_{target}^{(LCG)}$.

Since the base station apparatus 200 cannot identify the logical channel included in data (MAC PDU) which are mapped to the uplink shared channel until the CRC result is OK, the logical channel group with highest priority in step S730 is used as the "logical channel group with highest priority". It should be noted that SIR_offset is adjusted for each user equipment terminal (UE) and that the priority level $Z_{adjust}$ of the logical channel group in this process is designated via the external interface (I/F) for each user equipment terminal (UE).

In this manner, adjusting the offset in the outer-loop manner with respect to one predetermined logical channel group rather than with respect to all the logical channel groups allows for the reduction of the workload in the base station apparatus. For example, the priority level of a logical channel group with the highest frequency of transmission occurrences (with the largest number of transmission occurrences in a unit of time) is set as the priority level $Z_{adjust}$ of the logical channel group.

It should be noted that $\Delta_{adj}$, $BLER_{target}^{(LGCz)}$ can be designated via the external interface (I/F). The maximum value of SIR_offset is defined as SIR_offset$_{max}$ and the minimum value of SIR_offset is defined as SIR_offset$_{min}$. When SIR_offset is continuously determined as the maximum value or the minimum value, the above-mentioned calculation is not performed.

Then, the base station apparatus compares the final value of Δ with the value of f(i) retained by the user equipment terminal (UE) and transmits to the user equipment terminal (UE) the TPC command which is closest to the value of "Δ−f(i)" by means of the UL Scheduling Grant in the corresponding sub-frame. The base station apparatus 200 may assume that the error rate of the TPC command is equal to zero (0) and estimate the value of f(i) retained by the user equipment terminal (UE).

This example assumes the use of the Accummulated TPC command. However, the Absolute TPC command can be used to calculate the TPC command in a similar manner.

Although the offset adjustment process in the outer-loop manner is performed only when the priority level of the logical channel group with the highest priority level is $Z_{adjust}$, the process of "Δ=Δ+SIR_offset" is performed regardless of whether the priority level of the logical channel group with the highest priority level is $Z_{adjust}$. The adjustment of the error rate based on the logical channel group is performed by the offset process based on the priority level.

Next, in steps S514 and S516, the correction process of the allocation bandwidth based on UPH is performed.

In step S514, the number of RBs in the Temporary RB group is defined as $B_{data,tmp}$. Then, the estimated value of transmission power of the user equipment terminal (UE) is calculated according to the following equation ([Equation 24]).

$$Txpow = 10 * \log_{10} B_{data,tmp} + P_{O\_PUSCH} \alpha \times \Delta_{MCS}(MC\text{-}S_{tmp}) + f(i) \qquad \text{[Equation 24]}$$

$P_{O\_PUSCH}$: a parameter specified by the network (NW) (see 3GPP 36.213)

f(i): the combination (sum) of TPC commands which have been transmitted until the corresponding sub-frame.

PL: path loss (Pathloss), which is estimated based on UPH and the received level of the Demodulation RS.

In step S514, it is determined whether Txpow is higher than $P_{max}$. $P_{max}$ denotes maximum transmission power of the user equipment terminal (UE). When Txpow is higher than $P_{max}$ (step S514: YES), the process goes to step S516. Otherwise (step S514: NO), the process goes to step S518.

In step S516, $B_{data,tmp}$ is defined as follows.

[Equation 25]

$$B_{data,tmp} = \max\left(1, \text{floor}\left(10 \frac{P_{max} - (P_{O\_PUSCH} + \alpha \times PL + \Delta_{MCS}(MCS_{tmp}) + f(i))}{10}\right)\right)$$

Also, $B_{data,tmp}$ is defined as "the number of RBs Num$_{RB}$ to be allocated". Then, RBs in the Temporary RB group are removed, such that the number of RBs to be allocated to the user equipment terminal (UE) is not less than Num$_{RB}$, and the number of subcarriers includes only factors of 2, 3, and 5. In this equation, Maximum Power Reduction in the user equipment terminal (UE) may or may not be taken into consideration.

Upon allocation of the Temporary RB group in step S506, when RBs are allocated beginning from the highest frequency, RBs are removed beginning from the lowest frequency. On the other hand, when RBs are allocated beginning from the lowest frequency, RBs are removed beginning from the highest frequency.

Next, in steps S518 and S520, the correction process of the allocation bandwidth based on $N_{max,bit}$ is performed.

In step S518, the number of RBs (Num$_{RB}$) in the Temporary RB group is calculated and also the MAC PDU size (hereinafter called Size) is calculated. Then, it is determined whether Size is greater than $N_{max,bit}$ (Size>$N_{max,bit}$).

When it is determined that Size is greater than $N_{max,bit}$ (Size>$N_{max,bit}$) (step S518: YES), RBs in the Temporary RB group are removed until Size is less than or equal to $N_{max,bit}$ (Size=<$N_{max,bit}$) in step S520. Upon allocation of the Temporary RB group, when RBs are allocated beginning from the highest frequency, RBs are removed beginning from the lowest frequency. On the other hand, when RBs are allocated beginning from the lowest frequency, RBs are removed beginning from the highest frequency.

On the other hand, when it is determined that Size is less than or equal to $N_{max,bit}$ (Size=<$N_{max,bit}$) (step S518: YES), the process goes to step S522.

In steps S522 and S524, the correction process of the allocation bandwidth based on the amount of data in the buffer is performed. Specifically, the number of RBs to be allocated to the user equipment terminal (UE) is recalculated based on the comparison between the amount of data in the UL Buffer and the Size. Please refer to steps S730 and S732 in step S204 for the process of estimating the amount of data in the UL Buffer.

When the base station apparatus receives from the user equipment terminal (UE) "allocation request for the UL-SCH: REQUESTING" by means of the Scheduling request and uplink resources (resources for the UL-SCH) have not been allocated to the user equipment terminal (UE) since the base station apparatus has received the Scheduling request, the following process "in the case of enough data" (step S522: YES) is performed.

Specifically, in step S522, it is determined whether there are enough data in the RLC Buffer according to the following equation ([Equation 26]). $\alpha_{TFRS}$ is a coefficient input by the external interface (I/F).

[Equation 26]

$$\text{Size} \leq \alpha_{ULTFRS} \cdot \sum_{LCG} \text{Buffer}_{LCG} : \text{in the case of enough data}$$

$$\text{Size} > \alpha_{ULTFRS} \cdot \sum_{LCG} \text{Buffer}_{LCG} : \text{in the case of not enough data}$$

When it is determined that there are enough data in the RLC Buffer (step S522: YES), the process goes to step S526. In this case, all the RBs in the Temporary RB group are to be allocated to the user equipment terminal (UE).

On the other hand, when it is determined that there are not enough data in the RLC Buffer (step S522: NO), the process goes to step S524.

In step S524, the number of RBs $\text{Num}_{RB}$ to be allocated is recalculated based on $$\alpha_{Tfrs} \cdot \sum_{LCG} \text{Buffer}_{LCG}$$

(hereinafter called $\text{Size}_{buffer}$) and $\text{MCS}_{tmp}$.

When the number of subcarriers corresponding to $\text{Num}_{RB}$ includes factors other than 2, 3, and 5, $\text{Num}_{RB}$ is determined as a minimum integer among integers which include only factors of 2, 3, and 5 for the number of subcarriers and which are greater than $\text{Num}_{RB}$. RBs in the Temporary RB group are removed, such that the number of RBs to be allocated to the user equipment terminal (UE) is not less than $\text{Num}_{RB}$. Upon allocation of the Temporary RB group, when RBs are allocated beginning from the highest frequency, RBs are removed beginning from the lowest frequency. On the other hand, when RBs are allocated beginning from the lowest frequency, RBs are removed beginning from the highest frequency.

In step S526, the Temporary RB group after the processes of steps S514-S524 is determined as the RBs to be allocated to the user equipment terminal (UE) in the corresponding sub-frame.

In step S528, the base station apparatus generates the UL Scheduling Grant to be transmitted to the user equipment terminal (UE) based on both $\text{MCS}_{tmp}$ and (the group of) RBs determined in step S526. Specifically, the base station apparatus determines the transmission format of the UL-SCH.

On the other hand, when the user equipment terminal (UE) does not transmit the UL-SCH for initial transmission in step S508, in other words, when the user equipment terminal (UE) transmits the UL-SCH for retransmission (step S508: NO), the process goes to step S530.

In step S530, the number of RBs for retransmission is determined as either the number of RBs for initial transmission or the number of RBs in the Temporary RB group, whichever is smaller. When the number of RBs for initial transmission is less than the number of RBs in the Temporary RB group, RBs in the Temporary RB group are removed until the number of RBs to be allocated to the user equipment terminal (UE) is the same as the number of RBs for initial transmission. Upon allocation of the Temporary RB group, when RBs are allocated beginning from the highest frequency, RBs are removed beginning from the lowest frequency. On the other hand, when RBs are allocated beginning from the lowest frequency, RBs are removed beginning from the highest frequency.

In step S532, the TPC command to be transmitted to the user equipment terminal (UE) by means of the UL Scheduling Grant is determined.

$$\Delta = \Delta_{LCG} + SIR\_\text{offset} + \Delta_{LCG}^{(HARQ)}$$

The offset value $\Delta_{LCG}^{(HARQ)}$ is designated via the external interface (I/F) for each logical channel group. Upon retransmission, "the process in the outer-loop manner", which is described in step S512, is also performed.

In this manner, the base station apparatus notifies the user equipment terminal (UE) of a larger power offset for retransmission, thereby reducing the error rate for retransmission.

In step S534, the base station apparatus generates the UL Scheduling Grant to be transmitted to the user equipment terminal (UE). Regarding frequency resources, the base station apparatus notifies the user equipment terminal (UE) of the resource blocks determined in step S530. The MCS for retransmission may be the same as the MCS for initial transmission. Alternatively, the modulation scheme for retransmission may be the same as the modulation scheme for initial transmission.

Although the UL Scheduling Grant is specified for retransmission in steps S530, S532, and S534, these steps may be omitted when the UL Scheduling Grant is not specified for retransmission. It should be noted that frequency resources to be used by the user equipment terminal (UE) are reserved even when the UL Scheduling Grant is not specified.

In step S816, the value of "j" is incremented by one. In step S818, it is determined whether the value of "j" is less than or equal to $N_{UL-SCH}$. If the value of "j" is less than or equal to $N_{UL-SCH}$ (step S818: YES), the process returns to step S810. Otherwise (step S818: NO), the process comes to an end.

As described above, the base station apparatus transmits the TPC command to the user equipment terminal (UE) by means of the UL Scheduling Grant in steps S512 and S532. The process of transmitting the TPC command by means of the UL Scheduling Grant may be combined with the process of periodically transmitting the TPC command in the sub-frame in which the UL Scheduling Grant is not transmitted.

In the following, an example of periodically transmitting the TPC command in the sub-frame in which the UL Scheduling Grant is not transmitted.

The base station apparatus 200 calculates the TPC command based on the received SIR of the Sounding RS, upon periodically transmitting the TPC command to the user equipment terminal (UE). Specifically, the base station apparatus determines a target SIR (Target_SIR) and calculates $\Delta_{Sounding}$ according to the following equation.

$$\Delta_{Sounding} = \text{Target\_SIR} - \text{SIR}_{Sounding}$$

Then, the base station apparatus transmits the TPC command which is closest to $\Delta_{Sounding}$. The TPC command is transmitted as a part of the PDCCH.

Figure 11B:
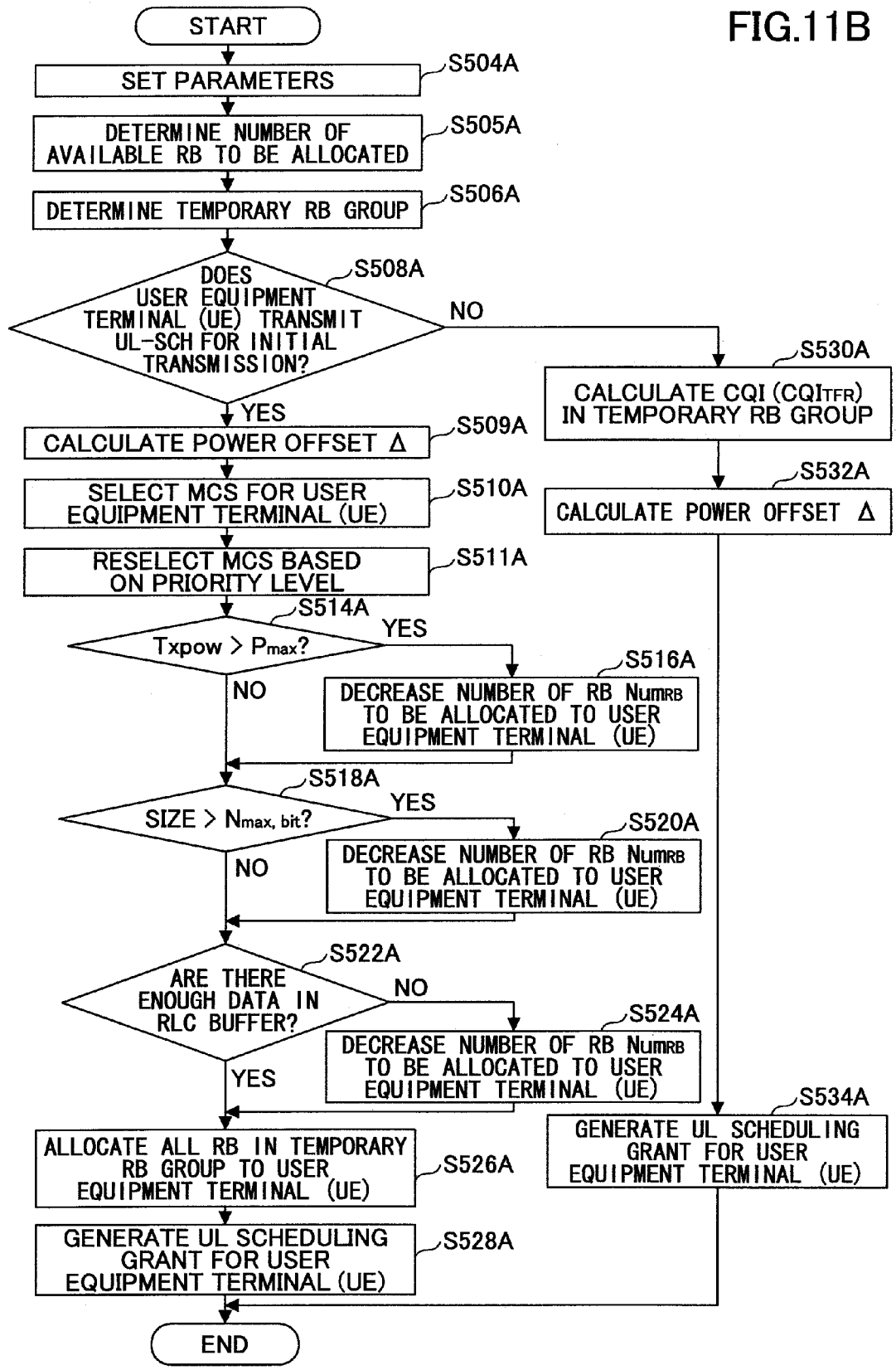
FIG. 11B is another flowchart of a process of UL TFR selection.

With reference to FIG. 11B, another embodiment of the UL TFR selection in step S814 is described below. The embodiment shown in FIG. 11B is the same as the embodiment shown in FIG. 11A except for steps S510, S512, and S532, and thus only these steps are described below. Steps S504A, S505A, S506A, S508A, S514A, S516A, S518A, S520A, S522A, S524A, S526A, S528A, S530A, and S534A in FIG. 11B are the same as steps S504, S505, S506, S508, S514, S516, S518, S520, S522, S524, S526, S528, S530, and S534, respectively, in FIG. 11A. Their discussion is thus omitted.

In step S509A, the value of Δ in the [Equation 22] is calculated. Specifically, the TPC command (Δ) to be transmitted to the user equipment terminal (UE) by means of the UL Scheduling Grant is calculated. In the following, the offset value to be transmitted to the user equipment terminal (UE) is defined as Δ.

Δ is calculated according to the following equation based on the received SIR (R_SIR) of the Sounding RS and the target SIR (T_SIR) of the Sounding RS.

$$\Delta = T\_SIR - R\_SIR$$

Next, in step S510A, the MCS (Modulation and Coding Scheme) for the Uplink Shared Channel to be used for transmission by the user equipment terminal (UE) is selected. For example, an expected SIR (SIR_Expected) for the Uplink Shared Channel may be calculated based on the received SIR of the Sounding Reference Signal, and then the MCS (specifically, the data size, the modulation scheme, and the coding rate) may be calculated based on SIR_Expected and TF_Related_table as shown in FIGS. 12A and 12B. It should be noted that the coding rate is uniquely calculated based on the data size, the modulation scheme, and the number of RBs.

Next, an example of calculating SIR_Expected is described below. Typically, transmission power of the Sounding Reference Signal in the E-UTRA system is calculated according to the following equation ([Equation 28]) (see 3GPP 36.213).

$$P_{SRS}(i) = \min\{P_{MAX}, P_{SRS\_OFFSET} + 10\log_{10}(M_{SRS}) + P_{O\_PUSCH} + \alpha \cdot PL + \Delta_{MCS}(MCS_{REF}) + f(i)\}$$ [Equation 28]

$P_{SRS}(i)$: transmission power of the Sounding Reference Signal in the sub-frame #i $P_{MAX}$: maximum transmission power of the UE $P_{SRS\_OFFSET}$: a power offset between the Uplink Shared Channel and the Sounding Reference Signal $M_{SRS}$: the number of RBs for the Sounding Reference Signal $P_{O\_PUSCH}$: a parameter specified by the network (NW)

α: a parameter specified by the network (NW)

PL: path loss (Pathloss)

$\Delta_{MCS}$: an offset value determined for each MCS $MCS_{REF}$: the MCS for the reference signal f(i): an offset value for adjustment f(i)=f(i−1)+Δ

$P_{O\_PUSCH}$, α, PL, f(i) in the [Equation 28] are the same as those in the [Equation 22].

Assuming that $\Delta_{MCS}$ in the [Equation 22] and [Equation 28] is equal to zero (0), transmission power of the PUSCH for each RB is calculated as follows.

$$P_{PUSCH}(i) = P_{SRS} - P_{SRS\_OFFSET}$$

Assuming that interference power in the Sounding Reference Signal is the same as interference power in the reference signal of the Uplink Shared Channel, SIR_Expected is calculated as follows.

$$SIR\_Expected = R\_SIR - P_{SRS\_OFFSET}$$

As described above, R_SIR is the received SIR of the Sounding Reference Signal.

$P_{SRS\_OFFSET}$, which is defined as a power offset between the Uplink Shared Channel and the Sounding Reference Signal, may be controlled at relatively longer intervals based on path loss between the user equipment terminal and the base station apparatus. For example, as shown in FIG. 11C, the value of $P_{SRS\_OFFSET}$ may be defined based on path loss. According to the change in path loss, the value of $P_{SRS\_OFFSET}$ may be changed with reference to FIG. 11C. The value of $P_{SRS\_OFFSET}$ may be transmitted to the user equipment terminal (UE) by means of RRC signaling. Please refer to step S510 for the calculation of path loss.

SIR_Expected may be further adjusted in the outer-loop manner as follows.

$$SIR\_Expected = SIR\_Expected + SIR\_Offset$$

In this case, the MCS is selected based on SIR_Expected after this adjustment. SIR_Offset may be calculated according to the equation (10) ([Equation 11]).

SIR_offset may be calculated based on the CRC result of the UL-SCH in which the priority level of the logical channel group with the highest priority level is $Z_{adjust}$. When the priority level of the logical channel group with the highest priority level is different from $Z_{adjust}$, SIR_offset may not be adjusted in the outer-loop manner.

The equation (10) ([Equation 11]) is explained below in detail. When the CRC result is the ACK, SIR_offset is slightly increased based on this equation. In other words, throughput can be increased by raising the MCS level. On the other hand, when the CRC result is the NACK, SIR_offset is decreased based on this equation. In other words, the error rate can be reduced by lowering the MCS level and reducing the required SIR. In the case of DTX, since the user equipment terminal (UE) cannot successfully receive the UL Scheduling Grant, SIR_offset is not adjusted. In this manner, radio quality of the Uplink Shared Channel (SIR_Expected), namely, the MCS level is adjusted based on the ACK or the NACK and the range of increase or decrease for setting the MCS level is determined according to the target error rate, and thereby the error rate of the UL-SCH can be brought close to the target error rate.

For example, if a required target error rate $BLER_{target}^{(LCG)}$ =0.1 and $\Delta_{adj}$=0.5, then SIR_offset=SIR_offset+0.05 dB in the case of the ACK and SIR_offset=SIR_offset−0.45 dB in the case of the NACK. After a while, the ratio of the ACK becomes equal to 90% and the ratio of the NACK becomes equal to 10%. As a result, the value of SIR_offset does not change. In this manner, adjusting SIR_offset according to the above-mentioned equation allows the error rate to converge on the target error rate $BLER_{target}^{(LCG)}$.

Since the base station apparatus 200 cannot identify the logical channel included in data (MAC PDU) which are mapped to the Uplink Shared Channel (UL-SCH) until the CRC result is OK, the logical channel group with the highest priority level in step S730 is used as the "logical channel group with the highest priority level". It should be noted that SIR_offset is adjusted for each user equipment terminal (UE) and that the priority level $Z_{adjust}$ of the logical channel group in this process is designated via the external interface (I/F) for each user equipment terminal (UE).

In this manner, adjusting the offset in the outer-loop manner with respect to one predetermined logical channel group rather than with respect to all the logical channel groups allows for the reduction of the workload in the base station apparatus. For example, the priority level of a logical channel group with the highest frequency of transmission occurrences (with the largest number of transmission occurrences in a unit of time) is set as the priority level $Z_{adjust}$ of the logical channel group.

It should be noted that $\Delta_{adj}$, $BLER_{target}^{(LGCz)}$ can be designated via the external interface (I/F). The maximum value of SIR_offset is defined as $SIR\_offset_{max}$ and the minimum value of SIR_offset is defined as $SIR\_offset_{min}$. When SIR_offset is continuously determined as the maximum value or the minimum value, the above-mentioned calculation is not performed.

Alternatively, $P_{SRS\_OFFSET}$ in the [Equation 28] rather than SIR_Expected may be adjusted according to the following equation.

$$P_{SRS\_OFFSET} = P_{SRS\_OFFSET} SIR\_Offset$$

Alternatively, $P_{O\_USCH}(i)$ in the [Equation 22] rather than SIR_Expected may be adjusted according to the following equation.

$$P_{O\_USCH}(i) = P_{O\_USCH}(i) + SIR\_Offset$$

In this case, SIR_offset is adjusted according to the ([Equation 23]).

In step S511A, the MCS is reselected based on the priority level. Specifically, SIR_Expected in step S510A is recalculated by the offset $\Delta_{LCG}$ based on the priority level of the logical channel group with the highest priority level. Then, the MCS is reselected based on the recalculated SIR_Expected with reference to FIGS. 12A and 12B. More specifically, SIR_Expected is recalculated according to the following equation.

$$SIR\_Expected = SIR\_Expected - \Delta_{LCG}$$

The subscript LCG refers to the logical channel group. For example, the base station apparatus 200 increases the value of $\Delta_{LCG}$ for the logical channel group to be transmitted with high quality and with the high priority level, thereby lowering the MCS level. As a result, the error rate can be reduced. In this manner, the base station apparatus 200 can adjust the offset value based on the priority level, the logical channel, or the logical channel group to adjust the error rate.

In step S532A, the TPC command to be transmitted to the user equipment terminal (UE) by means of the UL Scheduling Grant is determined.

$$\Delta = T\_SIR - R\_SIR + \Delta_{LCG}^{(HARQ)}$$

The offset value $\Delta_{LCG}^{(HARQ)}$ is designated via the external interface (I/F) for each logical channel group. In this manner, the base station apparatus notifies the user equipment terminal (UE) of a larger power offset for retransmission, thereby reducing the error rate for retransmission.

Next, the base station apparatus 200 according to an embodiment of the present invention is described with reference to FIG. 16.

As shown in FIG. 16, the base station apparatus 200 according to an embodiment of the present invention includes a layer 1 processing unit 202, a user equipment status management unit 204, a scheduling coefficient calculation unit 206, a UE selection unit 208, a TFR (Transport Format and Resource block) Selection unit 210, an other-CH resource management unit 212, a frequency resource management unit 214, a persistent resource management unit 216, and a UE Buffer estimation unit 218. The UE Buffer estimation unit 218 includes UE $Buff_{1,1}$, UE $Buff_{1,2}$, ..., UE $Buff_{1,k}$, UE $Buff_{2,1}$, UE $Buff_{2,2}$, ..., UE $Buff_{2,k}$, and, UE $Buff_{n,1}$, UE $Buff_{n,2}$, ..., UE $Buff_{n,k}$ corresponding to a logical channel group #1, a logical channel group #2, ..., a logical channel group #k for UE #1, a logical channel group #1, a logical channel group #2, ..., a logical channel group #k for UE #2, a logical channel group #1, a logical channel group #2, ..., a logical channel group #k for UE #n, respectively. The UE $Buff_{n,k}$ estimates the amount of data in the UE buffer based on the Buffer Status Report reported from the user equipment terminal (UE) rather than actually performing data buffering.

In FIG. 16, the base station apparatus 200 includes the UE $Buff_{n,k}$ corresponding to the logical channel group #k for the UE #n with respect to each user equipment terminal and each logical channel group. Alternatively, the base station apparatus 200 may include one UE Buffer estimation unit for all the user equipment terminals (UEs) or plural user equipment terminals (UEs). Alternatively, the base station apparatus 200 may include one UE Buffer estimation unit with respect to each user equipment terminal (UE) and may not include one UE Buffer estimation unit with respect to each logical channel group.

The layer 1 processing unit 202 performs processes related to the layer 1. More specifically, the layer 1 processing unit 202 performs, for example, a channel coding process and an IFFT process on the shared channel transmitted in downlink and a reception process such as an FFT process and a channel decoding process on the shared channel transmitted in uplink.

Further, the layer 1 processing unit 202 performs transmission of the Downlink Scheduling Information and the Uplink Scheduling Grant. The Downlink Scheduling Information is control information for the Downlink Shared Channel (DL-SCH) and the Uplink Scheduling Grant is control information for the Uplink Shared Channel (UL-SCH).

Further, the layer 1 processing unit 202 performs reception of control information transmitted in uplink, i.e., CQI (Channel Quality Information) and acknowledgement information with respect to the Downlink Shared Channel (DL-SCH). The CQI and the acknowledgement information are transmitted to the user equipment status management unit 204.

Further, the layer 1 processing unit 202 detects the uplink synchronization state based on the Sounding Reference Signal transmitted in uplink and the CQI signal and reports the detection result to the user equipment status management unit 204. Further, the layer 1 processing unit 202 measures the SIR of the Sounding Reference Signal transmitted in uplink and reports the measurement result to the user equipment status management unit 204. For example, the SIR of the Sounding Reference Signal is used in step S732.

Further, the layer 1 processing unit 202 may estimate uplink reception timings based on the Sounding Reference Signal transmitted in uplink and the CQI signal.

Further, the layer 1 processing unit 202 may determine whether the Uplink Shared Channel (UL-SCH) is actually transmitted. For example, the determination result is used in step 706.

Further, the layer 1 processing unit 202 may estimate path loss and report the path loss to the user equipment status management unit 204. For example, the path loss may be used in step S814 (UL TFR Selection).

Further, the layer 1 processing unit 202 is connected to a radio interface. More specifically, in downlink, the baseband signal generated in the layer 1 processing unit 202 is converted into a signal in the radio frequency band. Then the converted signal is amplified in the amplifier and transmitted to the user equipment terminal (UE) via an antenna. On the other hand, in uplink, a radio frequency signal received by the antenna is amplified in the amplifier, frequency-converted into a baseband signal, and is input to the layer 1 processing unit 202.

The user equipment status management unit 204 performs status management of each user equipment terminal (UE). For example, the user equipment status management unit 204 performs status management of HARQ Entity in uplink, management and control of mobility of UE, management of the DRX status and uplink synchronization, management of whether Persistent scheduling is to be applied, management of whether a MAC Control Block is to be transmitted, management of the transmission status, and estimation of a buffer status in the user equipment terminal (UE). Further, in step S732, the user equipment status management unit 204 calculates metrics necessary for the calculation of the scheduling coefficients and determines whether the scheduling coefficients are to be calculated. Namely the user equipment status management unit 204 performs the processes in steps S702 through S730 in FIG. 7B.

The mobility of the user equipment terminal (UE) refers to a handover switching a cell in which the user equipment terminal (UE) is to be in communication. The handover includes handover at the same frequency, between different frequencies, and between different systems. In the cases of the handover between different frequencies or between different systems, the management and control of the Measurement Gap is included in the management and control of mobility of the user equipment terminal (UE).

Further, the user equipment status management unit 204 performs the processes of steps S202 and S204. More specifically, the user equipment status management unit 204 sets the maximum multiplexing number per a sub-frame with respect to the UL MAC in the corresponding sub-frame, and counts the number of user equipment terminals (UEs) which perform retransmission in the corresponding sub-frame.

Further, the user equipment status management unit 204 may perform periodic calculation and transmission processes of the TPC command based on the SIR of the Sounding RS.

The scheduling coefficient calculation unit 206 performs the processes of steps S701 and S732 through S740 in FIG. 7B. More specifically, the scheduling coefficient calculation unit 206 calculates the scheduling coefficients of the user equipment terminals (UEs) in the corresponding sub-frame (see [Equation 14]). Then, the UE selection unit 208 selects the user equipment terminals (UEs) (for initial transmission) to which radio resources are to be allocated according to dynamic scheduling based on the calculated scheduling coefficients. The UE selection unit 208 reports the number of the user equipment terminals (UEs) "$N_{UL-SCH}$" to which radio resources are to be allocated according to dynamic scheduling to the TFR (Transport Format and Resource block) Selection unit 210.

The TFR Selection unit 210 performs the processes of steps S809, S810, S812, S814, S816, and S818. More specifically, the TFR Selection unit 210 determines the transmission format related to the Uplink Shared Channel (UL-SCH) to which dynamic scheduling is applied and controls transmission power in uplink. Information about the transmission format and radio resources related to the Uplink Shared Channel (UL-SCH) to which dynamic scheduling is applied determined by the TFR Selection unit 210 is transmitted to the layer 1 processing unit 202 to be used for transmission of the UL Scheduling Grant and reception of the Uplink Shared Channel (UL-SCH) in the layer 1 processing unit 202.

The other-CH resource management unit 212 determines the transmission formats and allocates radio resources for the PRACH, the PUCCH, the Guard RBs, and the RACH Message-3. The other-CH resource management unit 212 reports the frequency resources among the radio resources to the frequency resource management unit 214. Information about the transmission formats and allocated radio resources determined by the other-CH resource management unit 212 is transmitted to the layer 1 processing unit 202 via the frequency resource management unit 214 and the TFR Selection unit 210, so that layer 1 reception processes of the PRACH, the PUCCH, and the PRACH Message-3 and transmission process of the PRACH Message-2 are performed in the layer 1 processing unit 202.

The frequency resource management unit 214 is connected to the TFR Selection unit 210, the other-CH resource management unit 212, and the persistent resource management unit 216 and performs management of frequency resources. More specifically, the frequency resource management unit 214 monitors remaining frequency resources available for the Uplink Shared Channel (UL-SCH) to which dynamic scheduling is applied and provides information necessary for the process of step S810 to the TFR Selection unit 210.

The persistent resource management unit 216 performs status management of the uplink shared channel (UL-SCH) to which persistent scheduling is applied and manages radio resources. More specifically, the persistent resource management unit 216 determines the transmission format related to the Uplink Shared Channel (UL-SCH) to which persistent scheduling is applied and manages the radio resources. Then, the persistent resource management unit 216 reports the frequency resources among the radio resources to the frequency resource management unit 214. Information about the transmission format and allocated radio resources determined by the persistent resource management unit 216 is transmitted to the layer 1 processing unit 202 via the frequency resource management unit 214 and the TFR Selection unit 210, so that the layer 1 reception process of the Uplink Shared Channel (UL-SCH) to which persistent scheduling is applied is performed in the layer 1 processing unit 202.

Further, the persistent resource management unit 216 sends information necessary to perform the processes of steps S702 through S705 to the user equipment status management unit 204.

The UE Buffer estimation unit 218 estimates the buffer status for each logical channel group in the user equipment terminal (UE), i.e., the amount of data in the buffer based on the Buffer Status Report reported from the user equipment terminal (UE). More specifically, the UE Buffer estimation unit 218 performs the processes related to the UE Buffer in steps S730 and S732.

The present invention is described above by referring to specific embodiments. However, it should not be understood that the descriptions and figures constituting the parts of the disclosure limit the present invention. Based on the disclosure, a person skilled in the art may think of examples of various modifications, transformations, alterations, operational technique, and the like.

For example, in the above embodiments, a system is described in which Evolved UTRA and UTRAN (a.k.a. Long term Evolution or Super 3 G) is applied. However, a mobile station (user equipment (UE) terminal), a base station apparatus, a mobile communication system, and communication control method according to an embodiment of the present invention may also be applied to any other system capable of communicating using the shared channel.

Obviously, the present invention includes various embodiments not described herein. Therefore, the technical scope of the present invention is defined only by the invention specifying matters according to adequate scopes of the claims based on the descriptions.

For explanatory purpose, plural embodiments are separately described. However, such separation of the embodiments is not essential to the present invention, and two or more embodiments may be used on an as needed basis. Further, for explanatory purpose, specific values are used to promote understanding the present invention. However, unless otherwise described, the values are for illustrative purpose only and any other suitable values may be used.

The present invention is described above by referring to specific embodiments. However, a person skilled in the art may understand that the above embodiments are described for illustrative purposes and may think of examples of various modifications, transformations, alterations, changes, and the like. For illustrative purposes, the apparatus according to an embodiment of the present invention is described with reference to the functional block diagram. However, such an apparatus may be provided by hardware, software, or a combination thereof. The present invention is not limited to the embodiment described above, and various modifications, transformations, alteration, exchanges, and the like may be made without departing from the scope and spirit from the present invention.

The present international application claims priority from Japanese Patent Applications No. 2007-052111 filed on Mar. 1, 2007, No. 2007-161940 filed on Jun. 19, 2007, and 2007-329028 filed on Dec. 20, 2007, the entire contents of which are hereby incorporated herein by reference.

The invention claimed is:

1. A base station apparatus capable of communicating with user equipment terminals using an uplink shared channel, comprising:
   a selection unit configured to select a user equipment terminal to which the base station apparatus allocates the shared channel among the user equipment terminals other than a user equipment terminal where a time frame in which a control channel for the shared channel is transmitted in downlink, a time frame in which the shared channel is received, or a time frame in which acknowledgement information for the shared channel is transmitted overlaps a time interval for measuring a cell with a different frequency; and
   an allocation unit configured to allocate the shared channel to the user equipment terminal selected by the selection unit.

2. The base station apparatus as claimed in claim 1, wherein:
   the selection unit selects the user equipment terminal to which the base station apparatus allocates the shared channel among the user equipment terminals other than
   a user equipment terminal in a discontinuous reception state;
   a user equipment terminal in an out-of-synchronization state;
   a user equipment terminal from which the base station apparatus does not receive a reference signal; and
   a user equipment terminal which does not have data to be transmitted.

3. The base station apparatus as claimed in claim 1, wherein:
   the time frame in which the control channel for the shared channel is transmitted in downlink, the time frame in which the shared channel is received, or the time frame in which acknowledgement information for the shared channel is transmitted comprises the time frame in which the control channel for the shared channel is transmitted in downlink, the time frame in which the shared channel is received, or the time frame in which acknowledgement information for the shared channel is transmitted with respect to both initial transmission and retransmission of the shared channel.

4. The base station apparatus as claimed in claim 1, wherein:
   the selection unit assumes that there are no data to be transmitted in a buffer of the user equipment terminal, when the base station apparatus instructs the user equipment terminal to perform hand-over.

5. The base station apparatus as claimed in claim 1, wherein:
   the selection unit determines whether there are data to be transmitted based on both a signal for a notification of a buffer status reported from the user equipment terminal and the amount of data which the user equipment terminal has transmitted since the base station apparatus has received the signal for the notification of the buffer status.

6. The base station apparatus as claimed in claim 1, wherein:
   the selection unit assumes that there are data with a highest priority level to be transmitted in a buffer of the user equipment terminal, when the base station apparatus receives a signal for requesting allocation of the uplink shared channel from the user equipment terminal.

7. The base station apparatus as claimed in claim 6, wherein:
   the selection unit assumes that there are data with the highest priority level to be transmitted in the buffer of the user equipment terminal, until the base station apparatus receives a signal for a notification of a buffer status from the user equipment terminal, the signal being associated with the signal for requesting allocation of the uplink shared channel.

8. The base station apparatus as claimed in claim 6, wherein:
   the signal for requesting allocation of the uplink shared channel is a scheduling request.

9. A communication control method in a base station apparatus capable of communicating with user equipment terminals using an uplink shared channel, comprising the steps of:
   selecting a user equipment terminal to which the base station apparatus allocates the shared channel among the user equipment terminals other than
   a user equipment terminal where a time frame in which a control channel for the shared channel is transmitted in downlink, a time frame in which the shared channel is received, or a time frame in which acknowledgement information for the shared channel is transmitted overlaps a time interval for measuring a cell with a different frequency;

a user equipment terminal in a discontinuous reception state;

a user equipment terminal in an out-of-synchronization state;

a user equipment terminal from which the base station apparatus does not receive a reference signal; and a user equipment terminal which does not have data to be transmitted; and allocating the shared channel to the selected user equipment terminal.

10. A base station apparatus capable of communicating with user equipment terminals using an uplink shared channel, comprising:

a selection unit configured to select a user equipment terminal which transmits the uplink shared channel among the user equipment terminals other than a user equipment terminal where a time frame in which the uplink shared channel is transmitted overlaps a time frame in which a downlink common channel is transmitted;

a user equipment terminal where the time frame in which the uplink shared channel is transmitted overlaps a time frame in which acknowledgement information for the uplink shared channel is transmitted;

a user equipment terminal where the time frame in which the uplink shared channel is transmitted overlaps a time frame in which control information for downlink or uplink persistent scheduling is transmitted;

a user equipment terminal where a time frame in which control information for the uplink shared channel is transmitted overlaps the time frame in which the uplink shared channel is transmitted;

a user equipment terminal where the time frame in which control information for the uplink shared channel is transmitted overlaps a time frame in which a sounding reference signal, downlink radio quality information, a scheduling request signal, or a random access channel is transmitted in uplink; and a user equipment terminal where the time frame in which control information for the uplink shared channel is transmitted overlaps a time frame in which acknowledgement information (ACK/NACK) for the downlink shared channel is transmitted; and an allocation unit configured to allocate the shared channel to the user equipment terminal selected by the selection unit.

11. The base station apparatus as claimed in claim 10, wherein:

the user equipment terminal communicates with the base station apparatus according to half duplex.

12. The base station apparatus as claimed in claim 10, wherein:

the user equipment terminal communicates with the base station apparatus according to full duplex, when path loss between the user equipment terminal and the base station apparatus is greater than or equal to a predetermined threshold.

13. The base station apparatus as claimed in claim 10, wherein:

the downlink common channel comprises at least one of a synchronization channel and a broadcast channel.

* * * * *